US009238570B2

(12) United States Patent
Schoonmaker et al.

(10) Patent No.: US 9,238,570 B2
(45) Date of Patent: Jan. 19, 2016

(54) CRANE MANEUVERING ASSISTANCE

(75) Inventors: Stephen J. Schoonmaker, Chambersburg, PA (US); Kurtis L. Maynard, Gainesville, GA (US); Eric Fidler, Chambersburg, PA (US)

(73) Assignee: Trimble Navigation Limited, Sunnyvale, CA (US)

( * ) Notice: Subject to any disclaimer, the term of this patent is extended or adjusted under 35 U.S.C. 154(b) by 790 days.

(21) Appl. No.: 13/541,168

(22) Filed: Jul. 3, 2012

(65) Prior Publication Data

US 2013/0013251 A1 Jan. 10, 2013

Related U.S. Application Data

(60) Provisional application No. 61/504,549, filed on Jul. 5, 2011.

(51) Int. Cl.

| | |
|---|---|
| ***G01C 7/04*** | (2006.01) |
| ***G01C 9/04*** | (2006.01) |
| ***G06F 3/0346*** | (2013.01) |
| ***G06F 3/0354*** | (2013.01) |
| ***B66C 13/46*** | (2006.01) |

(52) U.S. Cl.
CPC .................................... *B66C 13/46* (2013.01)

(58) Field of Classification Search
CPC ........................................................ B66C 13/46
USPC ................... 702/34, 150, 152, 179, 183, 186; 212/274, 330
See application file for complete search history.

(56) References Cited

U.S. PATENT DOCUMENTS

| | | | |
|---|---|---|---|
| 4,408,195 | A | 10/1983 | Tullis et al. |
| 4,649,375 | A | 3/1987 | Duppong et al. |
| 5,438,771 | A | 8/1995 | Sahm et al. |
| 5,729,339 | A | 3/1998 | Park et al. |

(Continued)

FOREIGN PATENT DOCUMENTS

| | | |
|---|---|---|
| DE | 102009016366 | 12/2009 |
| DE | 202008008174 | 12/2009 |

(Continued)

OTHER PUBLICATIONS

"International Search Report PCT/2012/045413", Jan. 30, 2013, 9 pages.

(Continued)

*Primary Examiner* — Eliseo Ramos Feliciano
*Assistant Examiner* — Felix Suarez

(57) ABSTRACT

A system for tracking movable crane components to assist maneuvering the crane within a jobsite includes a computing device having a processor which calculates a 3D geospatial location and orientation of a 3D coordinate system for an upperworks that has an origin chosen along an axis of rotation between the upperworks and a lowerworks. The processor calculates a 3D position of the origin of the upperworks based on local coordinates and transforms the 3D position of the origin of the upperworks from the local coordinates to global 3D coordinates using absolute position sensing data from first and second positioning sensors attached to the crane (for instance on the upperworks and the hook, respectively) and using global 3D coordinates specific to the jobsite where the crane is located. The upperworks 3D coordinate system is useable to determine line segments in the upperworks 3D coordinate system for various movable components.

61 Claims, 31 Drawing Sheets

(56) References Cited

U.S. PATENT DOCUMENTS

| | | | | |
|---|---|---|---|---|
| 5,925,081 | A | 7/1999 | Hawkins et al. | |
| 5,956,250 | A | 9/1999 | Gudat et al. | |
| 6,064,335 | A | 5/2000 | Eschenbach | |
| 6,191,733 | B1 | 2/2001 | Dizchavez | |
| 6,246,932 | B1 | 6/2001 | Kageyama et al. | |
| 6,276,488 | B1 | 8/2001 | Divine et al. | |
| 6,439,407 | B1 * | 8/2002 | Jacoff et al. | 212/274 |
| 6,459,988 | B1 | 10/2002 | Fan et al. | |
| 6,484,078 | B1 | 11/2002 | Kageyama | |
| 6,711,838 | B2 | 3/2004 | Staub et al. | |
| 6,799,100 | B2 | 9/2004 | Burns et al. | |
| 6,826,452 | B1 * | 11/2004 | Holland et al. | 700/245 |
| 6,894,621 | B2 | 5/2005 | Shaw | |
| 7,032,763 | B1 | 4/2006 | Zakula et al. | |
| 7,139,651 | B2 | 11/2006 | Knowlton et al. | |
| 7,367,464 | B1 | 5/2008 | Agostini et al. | |
| 7,461,229 | B2 | 12/2008 | Caulkins et al. | |
| 7,578,079 | B2 | 8/2009 | Furem | |
| 7,640,683 | B2 | 1/2010 | McCain | |
| 7,734,397 | B2 | 6/2010 | Peterson et al. | |
| 7,850,024 | B2 | 12/2010 | Schneider et al. | |
| 8,025,167 | B2 | 9/2011 | Schneider et al. | |
| 8,144,000 | B2 | 3/2012 | Darby, Jr. et al. | |
| 2005/0033514 | A1 | 2/2005 | Lu | |
| 2005/0080559 | A1 | 4/2005 | Ishibashi et al. | |
| 2005/0197756 | A1 | 9/2005 | Taylor et al. | |
| 2006/0085118 | A1 | 4/2006 | Baldwin | |
| 2007/0093925 | A1 | 4/2007 | Moughler | |
| 2007/0142928 | A1 | 6/2007 | Moughler et al. | |
| 2007/0150149 | A1 | 6/2007 | Peterson et al. | |
| 2007/0221600 | A1 * | 9/2007 | Davis | 212/270 |
| 2007/0255494 | A1 | 11/2007 | Politick et al. | |
| 2008/0047170 | A1 | 2/2008 | Nichols | |
| 2008/0097693 | A1 | 4/2008 | McCain | |
| 2008/0156761 | A1 | 7/2008 | Schneider et al. | |
| 2009/0008351 | A1 * | 1/2009 | Schneider et al. | 212/272 |
| 2009/0083100 | A1 | 3/2009 | Darby, Jr. et al. | |
| 2009/0182537 | A1 | 7/2009 | Kang et al. | |
| 2010/0034421 | A1 | 2/2010 | Roberts et al. | |
| 2010/0070179 | A1 | 3/2010 | Cameron | |
| 2012/0308354 | A1 * | 12/2012 | Tafazoli Bilandi et al. | 414/685 |

FOREIGN PATENT DOCUMENTS

| | | |
|---|---|---|
| EP | 2135834 | 12/2009 |
| JP | 8-133678 | 5/1996 |
| JP | 8133678 | 5/1996 |
| JP | 2008/245166 | 9/1996 |
| JP | 8-319022 | 12/1996 |
| JP | 2001-163578 | 6/2001 |
| JP | 2002-310652 | 10/2002 |
| JP | 2005-29338 | 2/2005 |
| JP | 2006044932 | 2/2006 |
| JP | 2006-219246 | 8/2006 |
| JP | 2007/276996 | 10/2007 |

OTHER PUBLICATIONS

Schoonmaker, Stephen J., "Construction Jobsite 4-D Real-Time Modeling Data and Methods for Standardized Crane Motion Simulation and Study", Thesis, Lehigh University, (May 2010), 122 pages.

* cited by examiner

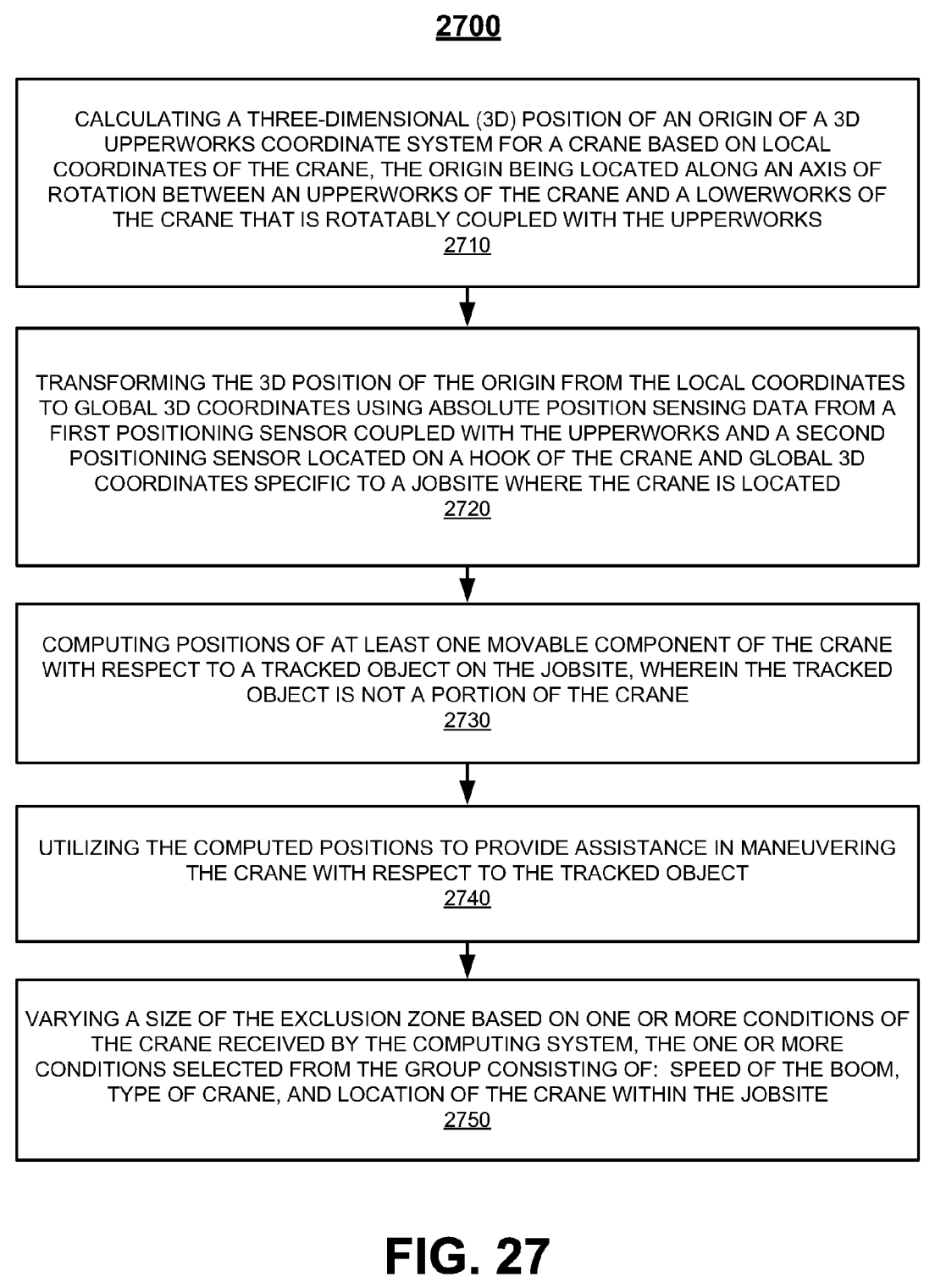

2700

CALCULATING A THREE-DIMENSIONAL (3D) POSITION OF AN ORIGIN OF A 3D UPPERWORKS COORDINATE SYSTEM FOR A CRANE BASED ON LOCAL COORDINATES OF THE CRANE, THE ORIGIN BEING LOCATED ALONG AN AXIS OF ROTATION BETWEEN AN UPPERWORKS OF THE CRANE AND A LOWERWORKS OF THE CRANE THAT IS ROTATABLY COUPLED WITH THE UPPERWORKS
2710

↓

TRANSFORMING THE 3D POSITION OF THE ORIGIN FROM THE LOCAL COORDINATES TO GLOBAL 3D COORDINATES USING ABSOLUTE POSITION SENSING DATA FROM A FIRST POSITIONING SENSOR COUPLED WITH THE UPPERWORKS AND A SECOND POSITIONING SENSOR LOCATED ON A HOOK OF THE CRANE AND GLOBAL 3D COORDINATES SPECIFIC TO A JOBSITE WHERE THE CRANE IS LOCATED
2720

↓

COMPUTING POSITIONS OF AT LEAST ONE MOVABLE COMPONENT OF THE CRANE WITH RESPECT TO A TRACKED OBJECT ON THE JOBSITE, WHEREIN THE TRACKED OBJECT IS NOT A PORTION OF THE CRANE
2730

↓

UTILIZING THE COMPUTED POSITIONS TO PROVIDE ASSISTANCE IN MANEUVERING THE CRANE WITH RESPECT TO THE TRACKED OBJECT
2740

↓

VARYING A SIZE OF THE EXCLUSION ZONE BASED ON ONE OR MORE CONDITIONS OF THE CRANE RECEIVED BY THE COMPUTING SYSTEM, THE ONE OR MORE CONDITIONS SELECTED FROM THE GROUP CONSISTING OF: SPEED OF THE BOOM, TYPE OF CRANE, AND LOCATION OF THE CRANE WITHIN THE JOBSITE
2750

FIG. 27

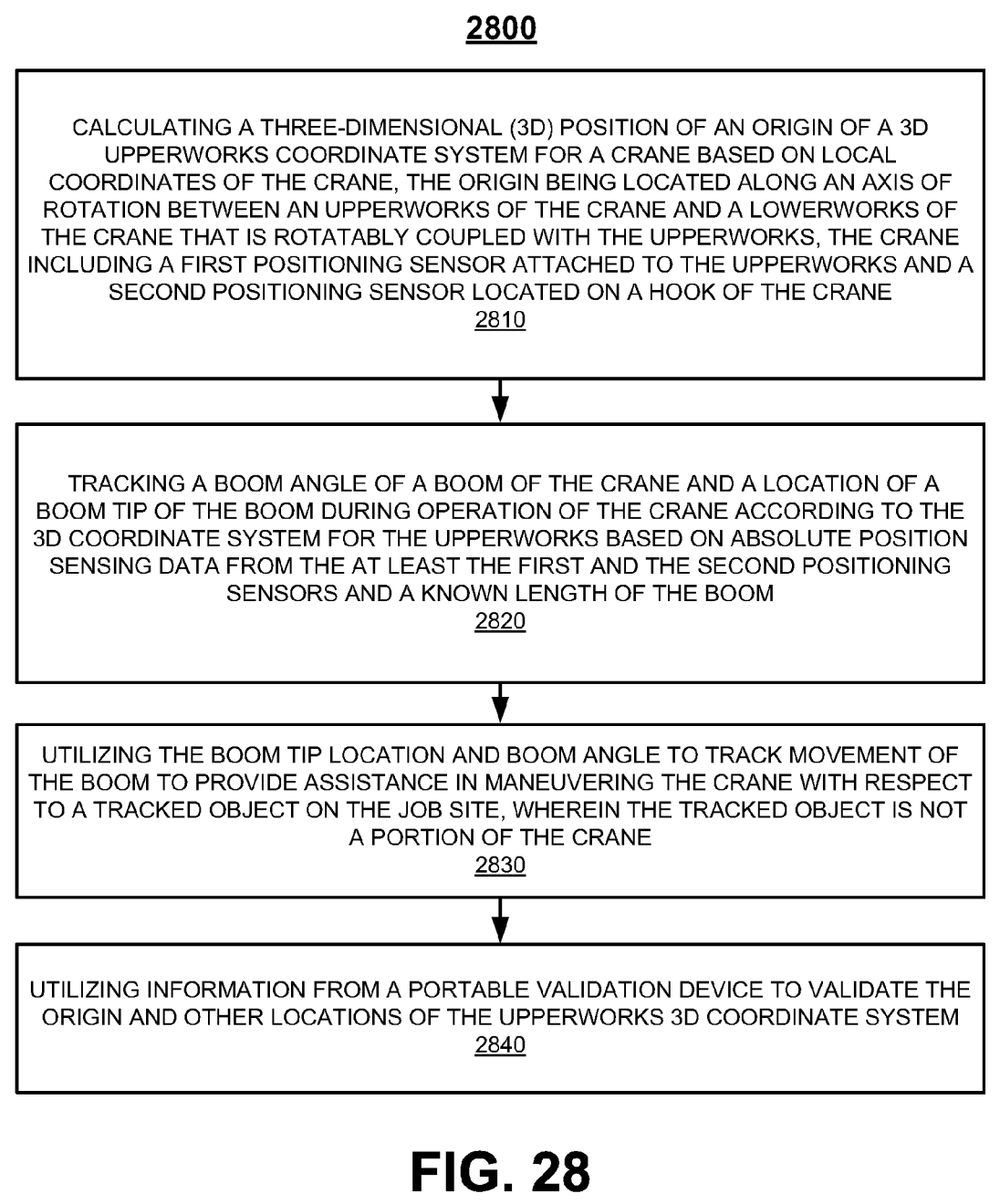

2800

CALCULATING A THREE-DIMENSIONAL (3D) POSITION OF AN ORIGIN OF A 3D UPPERWORKS COORDINATE SYSTEM FOR A CRANE BASED ON LOCAL COORDINATES OF THE CRANE, THE ORIGIN BEING LOCATED ALONG AN AXIS OF ROTATION BETWEEN AN UPPERWORKS OF THE CRANE AND A LOWERWORKS OF THE CRANE THAT IS ROTATABLY COUPLED WITH THE UPPERWORKS, THE CRANE INCLUDING A FIRST POSITIONING SENSOR ATTACHED TO THE UPPERWORKS AND A SECOND POSITIONING SENSOR LOCATED ON A HOOK OF THE CRANE
2810

↓

TRACKING A BOOM ANGLE OF A BOOM OF THE CRANE AND A LOCATION OF A BOOM TIP OF THE BOOM DURING OPERATION OF THE CRANE ACCORDING TO THE 3D COORDINATE SYSTEM FOR THE UPPERWORKS BASED ON ABSOLUTE POSITION SENSING DATA FROM THE AT LEAST THE FIRST AND THE SECOND POSITIONING SENSORS AND A KNOWN LENGTH OF THE BOOM
2820

↓

UTILIZING THE BOOM TIP LOCATION AND BOOM ANGLE TO TRACK MOVEMENT OF THE BOOM TO PROVIDE ASSISTANCE IN MANEUVERING THE CRANE WITH RESPECT TO A TRACKED OBJECT ON THE JOB SITE, WHEREIN THE TRACKED OBJECT IS NOT A PORTION OF THE CRANE
2830

↓

UTILIZING INFORMATION FROM A PORTABLE VALIDATION DEVICE TO VALIDATE THE ORIGIN AND OTHER LOCATIONS OF THE UPPERWORKS 3D COORDINATE SYSTEM
2840

FIG. 28

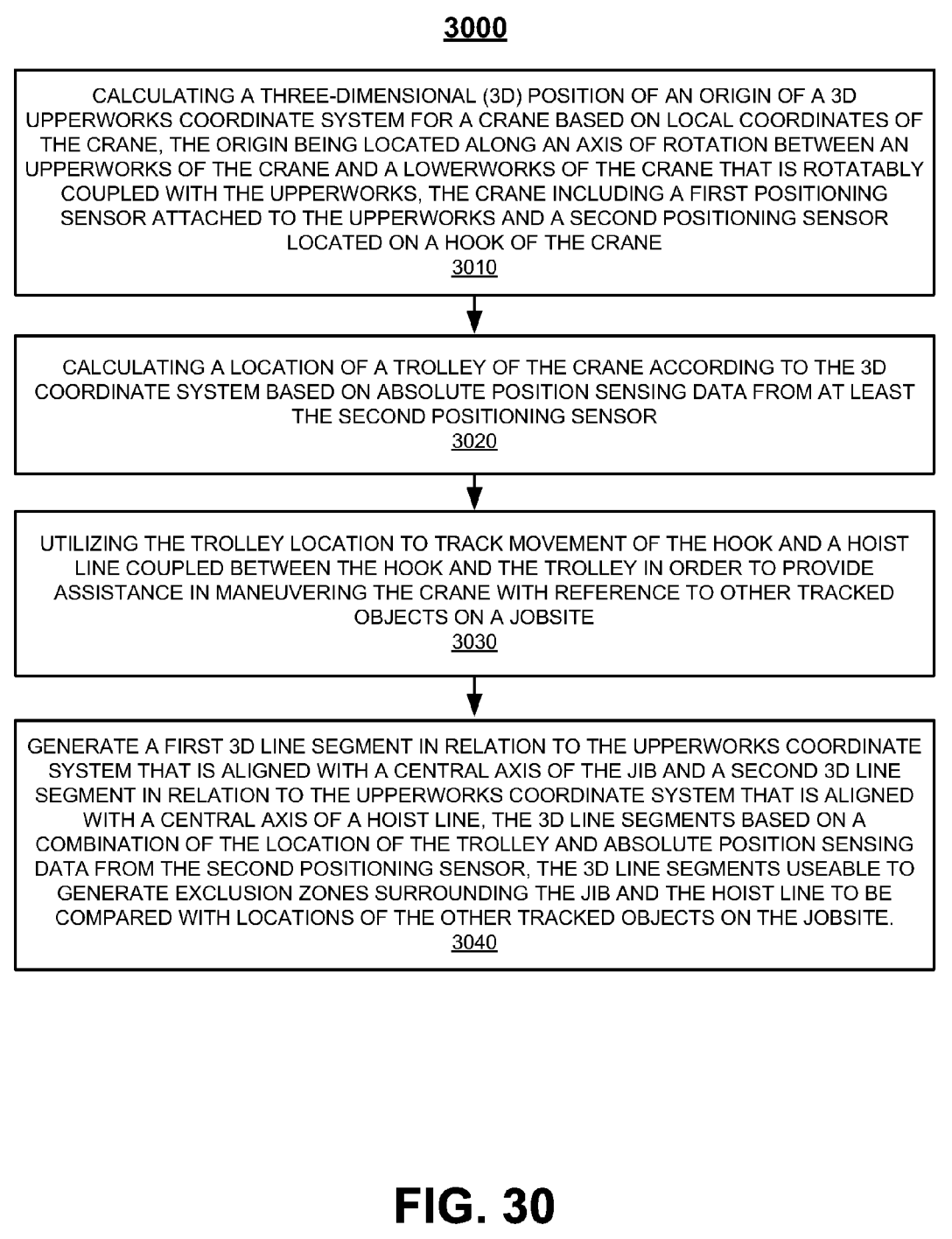

3000

CALCULATING A THREE-DIMENSIONAL (3D) POSITION OF AN ORIGIN OF A 3D UPPERWORKS COORDINATE SYSTEM FOR A CRANE BASED ON LOCAL COORDINATES OF THE CRANE, THE ORIGIN BEING LOCATED ALONG AN AXIS OF ROTATION BETWEEN AN UPPERWORKS OF THE CRANE AND A LOWERWORKS OF THE CRANE THAT IS ROTATABLY COUPLED WITH THE UPPERWORKS, THE CRANE INCLUDING A FIRST POSITIONING SENSOR ATTACHED TO THE UPPERWORKS AND A SECOND POSITIONING SENSOR LOCATED ON A HOOK OF THE CRANE
3010

↓

CALCULATING A LOCATION OF A TROLLEY OF THE CRANE ACCORDING TO THE 3D COORDINATE SYSTEM BASED ON ABSOLUTE POSITION SENSING DATA FROM AT LEAST THE SECOND POSITIONING SENSOR
3020

↓

UTILIZING THE TROLLEY LOCATION TO TRACK MOVEMENT OF THE HOOK AND A HOIST LINE COUPLED BETWEEN THE HOOK AND THE TROLLEY IN ORDER TO PROVIDE ASSISTANCE IN MANEUVERING THE CRANE WITH REFERENCE TO OTHER TRACKED OBJECTS ON A JOBSITE
3030

↓

GENERATE A FIRST 3D LINE SEGMENT IN RELATION TO THE UPPERWORKS COORDINATE SYSTEM THAT IS ALIGNED WITH A CENTRAL AXIS OF THE JIB AND A SECOND 3D LINE SEGMENT IN RELATION TO THE UPPERWORKS COORDINATE SYSTEM THAT IS ALIGNED WITH A CENTRAL AXIS OF A HOIST LINE, THE 3D LINE SEGMENTS BASED ON A COMBINATION OF THE LOCATION OF THE TROLLEY AND ABSOLUTE POSITION SENSING DATA FROM THE SECOND POSITIONING SENSOR, THE 3D LINE SEGMENTS USEABLE TO GENERATE EXCLUSION ZONES SURROUNDING THE JIB AND THE HOIST LINE TO BE COMPARED WITH LOCATIONS OF THE OTHER TRACKED OBJECTS ON THE JOBSITE.
3040

FIG. 30

CRANE MANEUVERING ASSISTANCE

CROSS-REFERENCE TO RELATED U.S. APPLICATION (PROVISIONAL)

This application claims priority to and benefit of co-pending U.S. Provisional Patent Application No. 61/504,549 filed on 5 Jul. 2011 entitled "System for Determining 3D Geospatial Coordinates for a Crane to Track Movable Components and Assist with Maneuvering" by Stephen J. Schoonmaker et al., and assigned to the assignee of the present application.

BACKGROUND

The present disclosure relates generally to the modeling and tracking of equipment at a construction jobsite. More specifically, the disclosure relates to determining three-dimensional (3D) geospatial coordinates of a crane that enables the tracking of moveable components of a crane, which assists with safely maneuvering the crane within a jobsite.

Construction jobsites typically contain a variety of elements such as equipment, power lines, structures, building materials, and personnel. Depending on the phase of a project, there are changing arrangements of these elements while the building project itself progresses toward completion. For instance, earth-moving equipment and personnel from one contractor may be at the jobsite in an early part of the project. Subsequently, raw material and another set of personnel from another contractor generally arrive; perhaps in a concurrent manner, or perhaps in a completely serial manner. Next, erection equipment such as cranes and work platforms arrive and most likely another set of personnel to run the cranes and construct the work platforms. Prior to a particular execution phase, construction processes are usually planned, simulated, and documented during a design phase, which is intended to optimize operations for various parameters such as schedule, resources, costs, and profits. A part of planning for execution may include safety considerations in regards to equipment maneuvering on a jobsite that avoids collisions with static or dynamic obstacles.

BRIEF DESCRIPTION OF THE DRAWINGS

The accompanying drawings, which are incorporated in and form a part of this application, illustrate embodiments of the subject matter described herein and together with the description, serve to explain the principles of the subject matter. Unless noted, the drawings referred to this description should be understood as not being drawn to scale.

FIG. 27 illustrates a flow diagram 2700 of an example method of crane maneuvering assistance.

FIG. 28 illustrates a flow diagram 2800 of an example method of crane maneuvering assistance.

FIG. 30 illustrates a flow diagram 3000 of an example method of crane maneuvering assistance.

DESCRIPTION OF EMBODIMENTS

Figure 1:
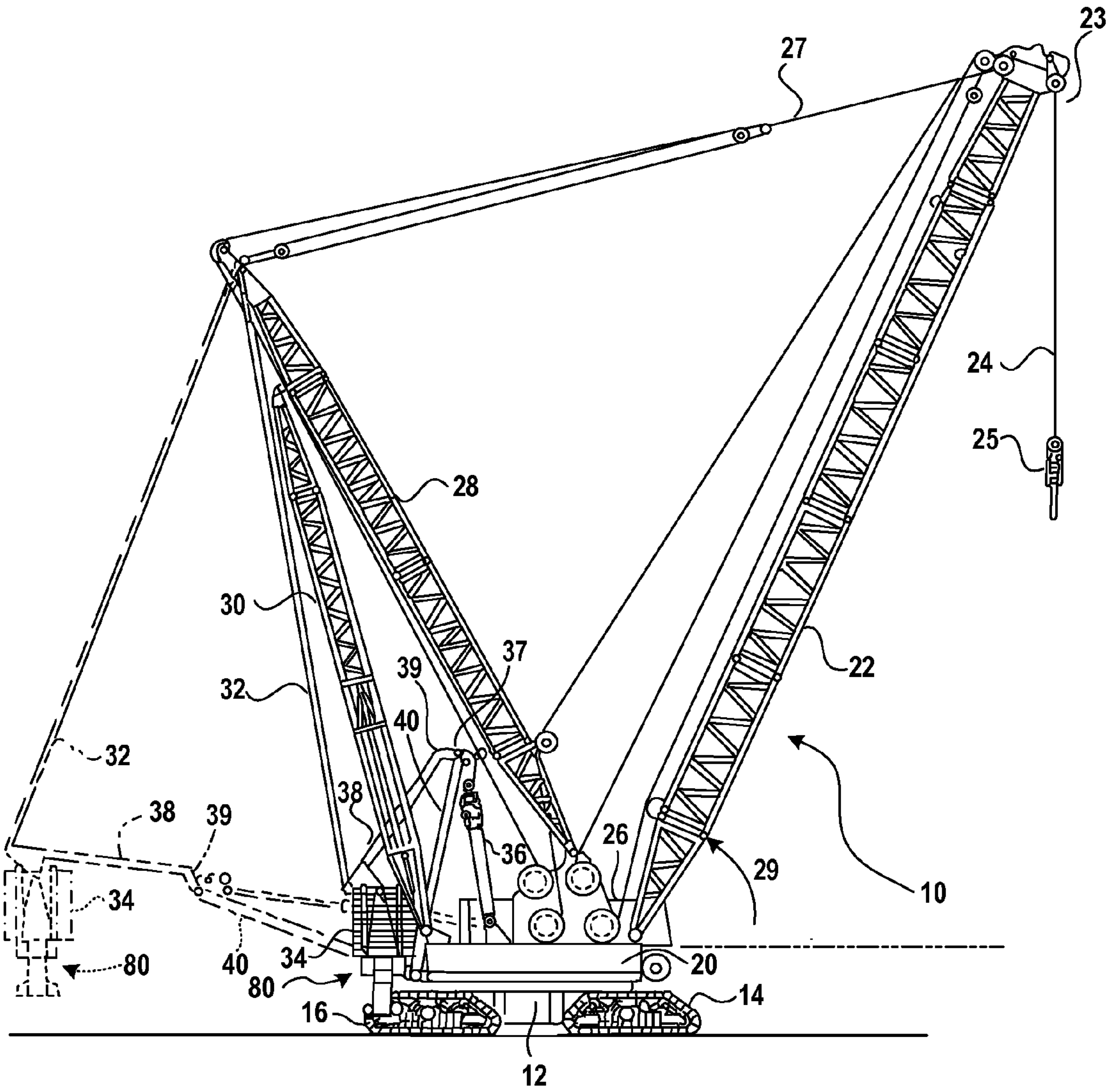
FIG. 1 is a side elevational view of a mobile lift crane with moveable components according to the present disclosure.

The present embodiments will now be further described. In the following passages, different aspects of the embodiments are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

One of the benefits of the present embodiments is that they provide a consistent approach to modeling of the basic elements at a construction jobsite that accounts for the dynamic and uncertain nature of the jobsite. Such a modeling approach may be used during design and optimization phases to improve planning, as well as improve the communication of planned construction activities to personnel at the jobsite. The modeling approach disclosed herein could then be applied directly to the tracking and monitoring of the construction processes in the execution phase. Subsequently, future design and optimization may be improved based on observation of the execution results within that same modeling approach.

The monitoring and tracking of construction equipment should address the different elements of the jobsite and the time-dependent or dynamic nature of the building project and personnel. The present disclosure focuses on these aspects by providing a modeling approach and technical means to consistently handle the construction equipment that is movable, and to simultaneously handle static elements such as natural and homemade structures, and by specifically addressing the need to easily install, configure, and reposition devices on a variety of equipment.

The embodiments of the methods disclosed herein will have applicability to moveable components of construction equipment used on a construction jobsite, especially those of a mobile lift crane 10 (FIG. 1), a mobile telescopic boom crane 100 (FIG. 2A), a tower crane 300 (FIG. 3) and of other cranes not specifically depicted, such as truck-mounted, rough-terrain, and overhead cranes. The mobile lift, mobile telescopic boom, and tower cranes will be disclosed as representative of cranes to which the present disclosure applies, although this disclosure is further applicable to other construction equipment as well, such as a back-hoe and other earth movers. Cranes are among the most complex and often used on jobsite, e.g., to assemble a building project.

The mobile lift crane 10 includes a carbody 12, also referred to as a lowerworks (LW) 12, and moveable ground engaging members in the form of crawlers 14 and 16. There are two front crawlers 14 and two rear crawlers 16, only one each of which can be seen from the side view of FIG. 1. In the crane 10, the ground engaging members could be just one set of crawlers, one crawler on each side.

A rotating bed 20 also known as an upperworks (UW) 20 is rotatably connected to the lowerworks 12 such that the rotating bed can swing with respect to the ground engaging members. The upperworks 20 is mounted to the lowerworks 12 with a slewing ring, such that the upperworks 20 can swing about an axis with respect to the ground engaging members 14, 16. The mounting location between the lowerworks 12 and the upperworks 20 defines an axis of origin of coordinate axes of the upperworks that will be referenced later. The upperworks supports a boom 22 rotatably mounted on a front portion of the upperworks; a sheave block 23 at the boom top including sheaves; a mast 28 mounted at its first end on the upperworks 20; a backhitch 30 connected between the mast and a rear portion of the rotating bed; and a moveable counterweight unit 34 having counterweights on a support member.

Boom hoist rigging 27 between the top of mast 28 and boom 22 is used to control a boom angle and transfers load so that the counterweight can be used to balance a load lifted by the crane 10. A load hoist line 24, typically made of wire rope, extends from the boom 22, supporting a hook book 25 designed for lifting heavy loads. In some cases the hook block 25 consists of no more than a hook and so, for simplicity, the hook block 25 may also be referred to as, simply, the hook block 25. As used hereinafter, and in the claims, the term “hook,” when reference the location of a sensor, includes a hook and any hook block through which the load hoist line is reeved and other items that move with the hook, such as a load attached to the hook. For example, if a GPS sensor is located on a hook block or on a load, that may still be referred to herein as being located on the hook. The boom 22 on some cranes—such as the mobile telescopic boom crane 100—may be telescopic and therefore may be adjustable in length. The hook block may include one or more sheaves over which the hoist line is extended.

The load hoist line 24 passes through the sheave block 23 at the top of the boom 22, and then through the hook block 25. As the hoist line 24 is eventually connected to the rotating bed 20, when the boom 22 booms down (or is lowered), the hook block 25 will be pulled towards the boom end as the hoist line 24 effectively shortens. A “two-block condition” may occur if the hook block 25 runs into the sheave block 23, snapping the hoist line 24, and causing the load to drop. This can be prevented by spooling out hoist line (or cable) fast enough to match the lowering boom 22. The crane 10 may include mechanical sensors that alert the operator if the two-block condition is imminent, referred to as anti-two-block. The hook block or hook often sways where attached to the hoist line in various directions during operation, which causes the hook 25 to change in absolute location on a jobsite.

The rotating bed 20 may also include other elements commonly found on a mobile lift crane, such as an operator’s cab 26 and hoist drums for the boom hoist rigging 27 and hoist line 24. If desired, the boom 22 may include a luffing jib (not shown) pivotally mounted to the top of the main boom, or other boom configurations. The backhitch 30 is connected adjacent the top of the mast 28, but down the mast far enough that it does not interfere with other items connected to the mast. The backhitch 30 may include a lattice member designed to carry both compression and tension loads. In the crane 10, the mast 28 is held at a fixed angle with respect to the rotating bed during crane operations, such as a pick, move and set operation. A boom angle 29 may change during these crane operations such that the angle between the boom and a horizontal line extended from a hinge of the boom 22 changes.

The counterweight unit 34 is moveable with respect to the rest of the upperworks 20. A tension member 32 connected adjacent the top of the mast supports the counterweight unit in a suspended mode. A counterweight movement structure is connected between the upperworks 20 and the counterweight unit 34 such that the counterweight unit 34 may be moved to and held at a first position in front of the top of the mast, and moved to and held at a second position rearward of the top of the mast.

At least one linear actuation device, in this embodiment a rack and pinion assembly 36, and at least one arm pivotally connected at a first end to the rotating bed and at a second end to the a rack and pinion assembly 36, are used in the counterweight movement structure of crane 10 to change the position of the counterweight unit 34. The arm and a rack and pinion assembly 36 are connected between the rotating bed and the counterweight unit 34 such that extension and retraction of the rack and pinion assembly 36 changes the position of the counterweight unit 34 compared to the rotating bed 20. FIG. 1 shows the counterweight unit 34 in its most forward position in solid lines and at its farthest back position in dotted lines. The rack and pinion assembly 36 moves the counterweight unit 34 to a mid position, such as when a load is suspended from the hook block 25.

A pivot frame 40, a solid welded plate structure, is connected between the upperworks 20 and the second end of the rack and pinion assembly 36. The rear arm 38 is connected between the pivot frame 40 and the counterweight unit 34. A set of pins 37 are used to connect the rear arm 38 and the pivot frame 40. A rear arm 38 is also a welded plate structure with an angled portion 39 at the end that connects to the pivot frame 40. This allows the arm 38 to connect directly in line with the pivot frame 40.

The crane 10 is equipped with a counterweight support system 80, which may be required to comply with crane regulations in some countries. Because the counterweight unit 34 can move far forward with respect to the front of the rotating bed, the counterweight supports on the support system 80 may interfere with swing operations unless they are sufficiently spaced apart. This, however, makes the support structure itself very wide. The crane 10 thus uses a counterweight support structure attached to the counterweight unit 34 that includes a telescoping counterweight support system 80. The counterweight unit 34 is constructed so that the counterweight support system 80 can be removed and the crane can function both with and without it. Some of the cranes as will be discussed include counterweights that are static and thus not movable. The crane 10 is more fully described in U.S. Pat. No. 7,967,158, "Mobile Lift Crane With Variable Position Counterweight,", which is hereby incorporated by reference.

Figure 2A:
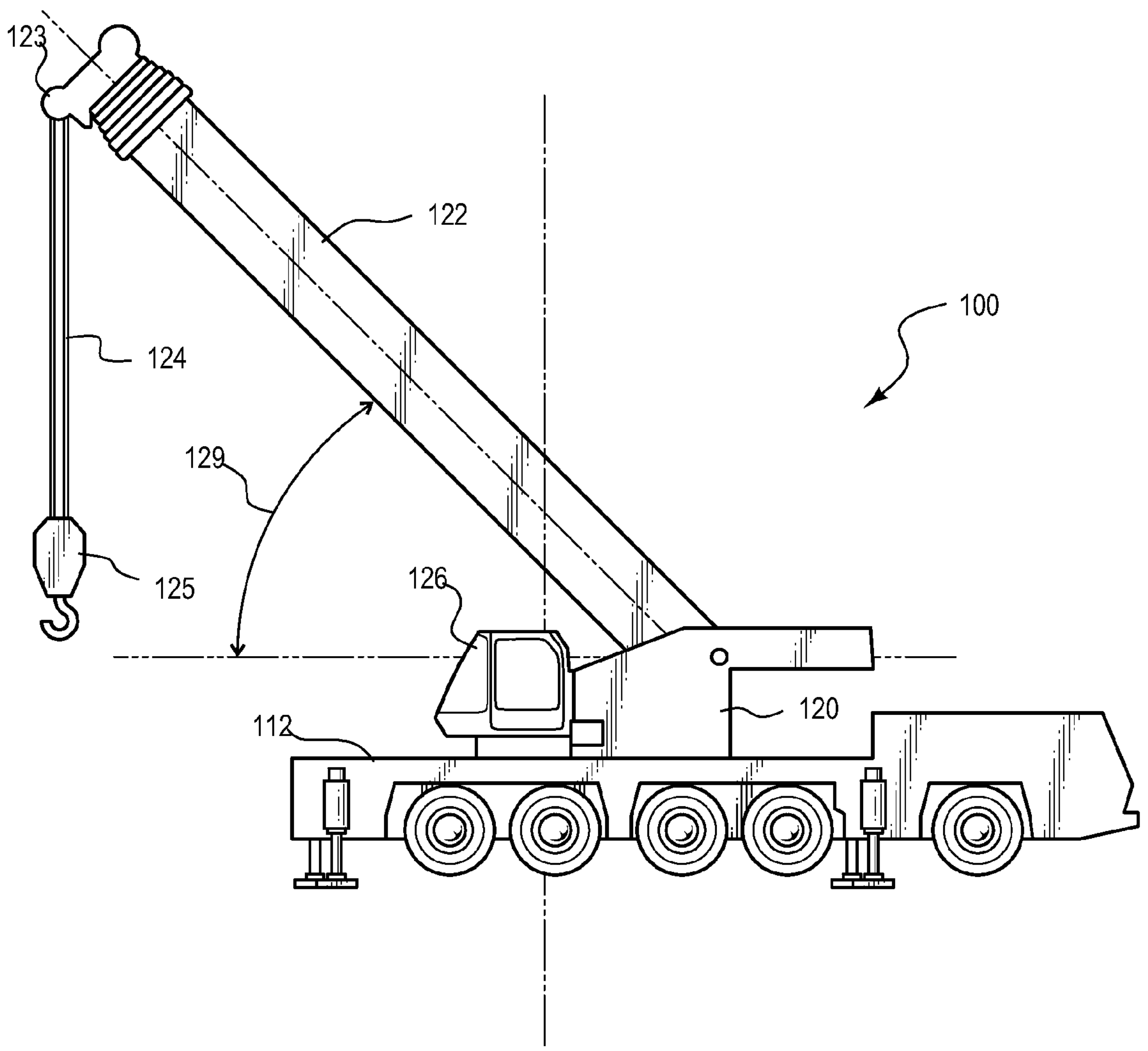
FIG. 2A is a side elevational view of a mobile telescopic boom crane according to the present disclosure.

The mobile telescopic boom crane 100 of FIG. 2A shows some of the same components as the mobile lift crane 10 of FIG. 1, and because of its simplicity, will be the crane depicted in the majority of the drawings, although the invention relates to any kind of crane. The crane 100 also includes a lowerworks 112, an upperworks 120, a boom 122, a sheave block 123, a hoist line 124, a hook 125, an operator's cab 126, and a boom angle 129. Various parts of the crane are movable and thus susceptible to tracking and control according to the current disclosure. The boom 22, 122 is movable and may be in a relatively fixed horizontal arrangement (such as on a tower crane) or able to lift up and down (known as lulling). In addition, the boom may be telescopic and able to change length. At the tip of the boom, the sheave block 23, 123 is used to allow a hoist line to be extended from the boom tip down to the crane hook. Other crane components may also move with respect to the upperworks, such as the adjustable counterweight unit 34.

Figure 2B:
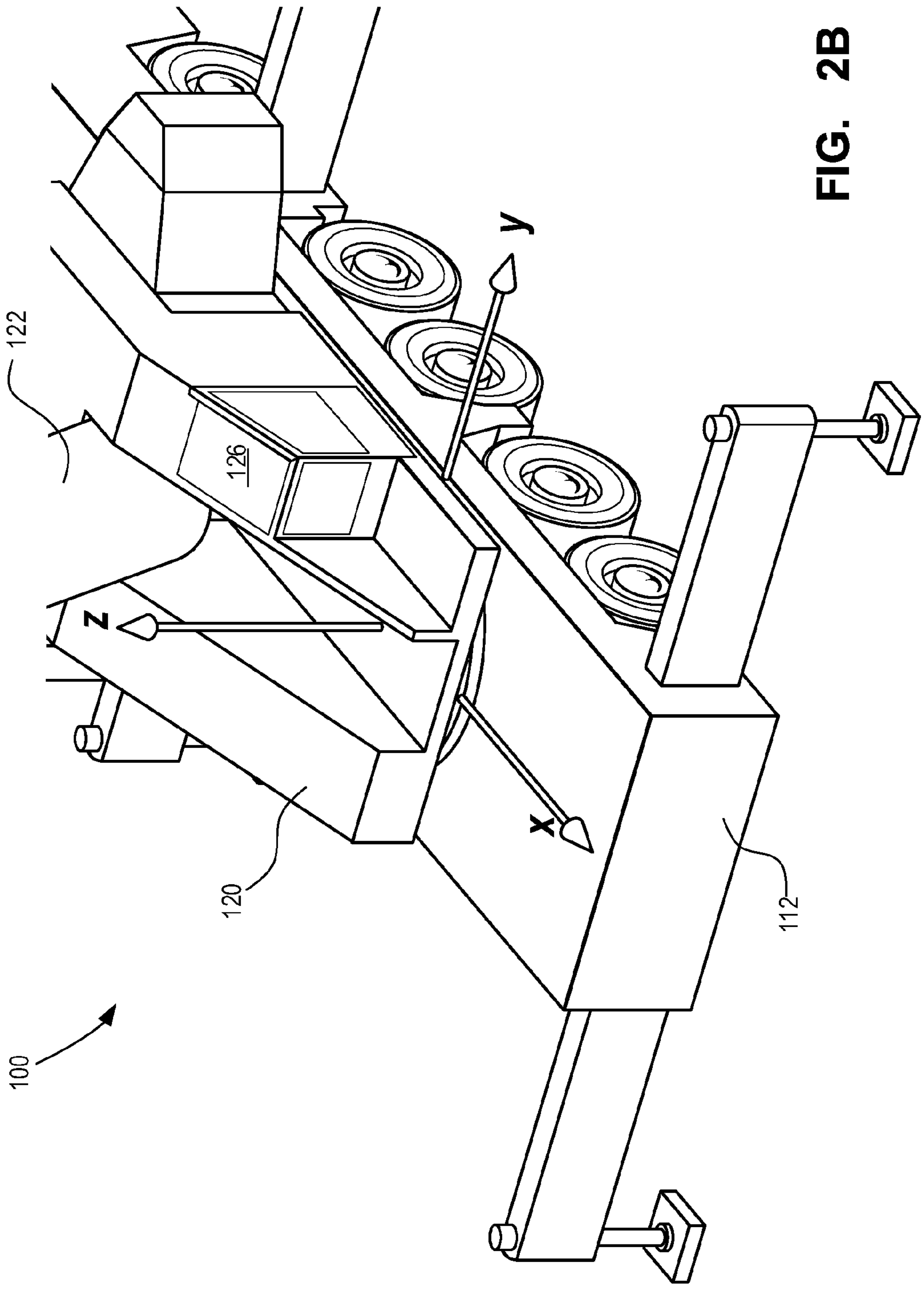
FIG. 2B is a perspective view of the crane of FIG. 2A showing an origin of an axis of an upperworks coordinate system.

With further reference to FIG. 2B, the upperworks 120 rotates on top of the lowerworks 112 and an origin of the upperworks coordinate system of the crane may be considered as the location of attachment therebetween. The upperworks coordinate system may therefore be oriented in a plane between the upperworks and the lowerworks. For example, the plane between the upperworks and the lowerworks may be defined by a roller path on which the upperworks rests. The upperworks coordinate system may be expressed in local coordinates specific to the jobsite from which 3D geospatial (or absolute) location and orientation of a global 3D coordinate system may be determined with the help of absolute position sensing data from one or more positioning sensors located arbitrarily on the upperworks 20, 120 and possibly on the hook 25 as well. As will be shown beginning with FIG. 10, the X, Y, and Z-axis identifiers will signify the global 3D coordinates where the X and Y axes are generally within the plane between the upperworks and lowerworks and the Z axis is generally orthogonal to the X and Y axes counter to gravity. Coordinates within the global 3D coordinate system may also be referred to herein more simply as global coordinates when they have been transformed to GPS-based or other absolute positioning coordinates. The positive X-axis of the 3D coordinate system will point towards the location of the boom with the positive Y-axis pointing to the left as shown. The crane model disclosed herein is based on practical design parameters. The boom, therefore, is expected to lift or luff from the horizontal plane to some height less than perfectly vertical. In other words, the boom angle 29, 129 can practically go from zero degrees to something less than 90 degrees.

Figure 3:
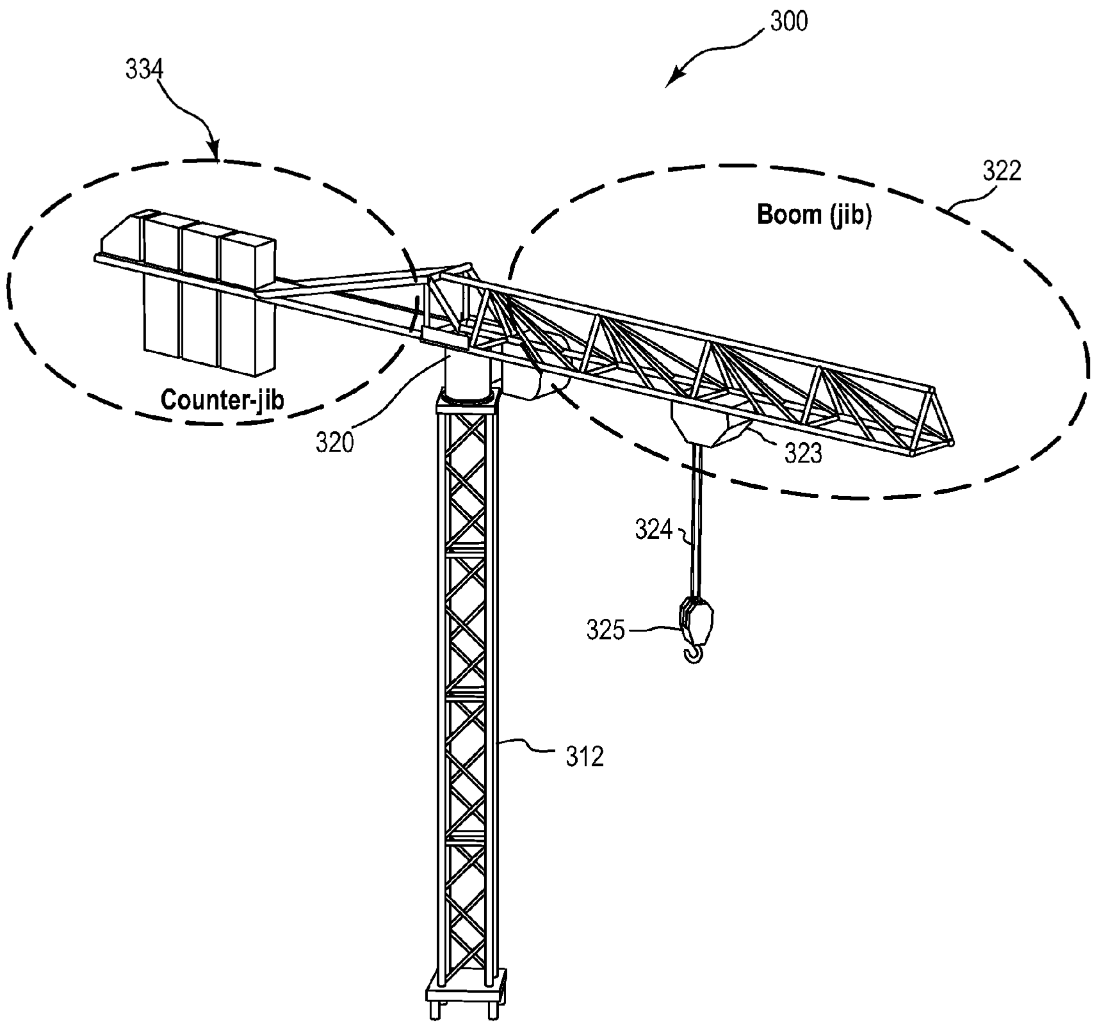
FIG. 3 is a side perspective view of a tower crane according to the present disclosure.

FIG. 3 illustrates a side perspective view of a tower crane 300, according to one embodiment. Tower crane 300 may include many similar components to those of mobile crane 10 and mobile telescopic boom crane 100, but with some differences as well. Instead of a lowerworks, the tower crane 300 has a tower 312 on which is rotatably attached an upperworks 320. On top of the upperworks 320 is attached a combination boom (commonly referred to as a jib) 322 and a counter-jib 334. The counter-jib 334 balances the boom or jib 322 side of the combination during operation, functioning as the counterweight unit 34 did in FIG. 1, but without the complexity of the crane 10 of FIG. 1. To the boom 322 is attached a trolley 323 that may slide from side to side to allow lifting at various positions along the boom 322. A hoist line 324 is reeved through the trolley 323 and from the hoist line is attached a hook 325 for attachment to loads.

Accordingly, the present embodiments may model the absolute 3D coordinate system based on the prevailing global positioning system (GPS) standards. The Universal Transverse Mercator (UTM) Easting and Northing for the jobsite are the X and Y dimensions. The UTM standard has sequences of grids on the Earth that always have positive X and Y values (always in the "first quadrant"). The relative locations of objects on the jobsite in the UTM coordinate system are accurate. In addition, the WGS84 ellipsoidal height is utilized as the jobsite Z dimension. Although such a 3D coordinate system is not purely orthogonal due to the curvature of the earth, it is sufficiently orthogonal across the size of a practical jobsite to be adequate as a jobsite modeling system. Buildings and other static objects, as well as mobile construction equipment, located in this absolute jobsite 3D coordinate system may be correctly positioned and tracked relative to each other. And, if tracked in real-time according to such an absolute global positioning system, valuable information and capabilities may be realized. In addition, geospatial data or a jobsite CAD model—also referred to as Building Information Model (BIM)—data can be included in the UTM-based absolute 3D coordinate system.

Figure 4A:
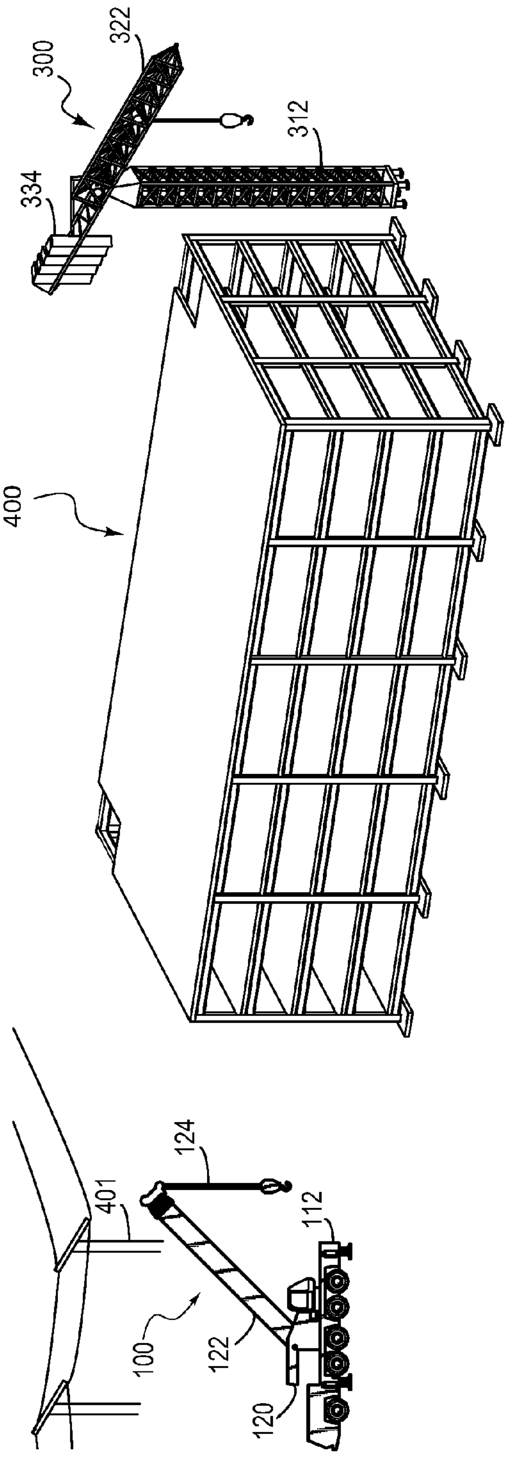
FIG. 4A is a perspective view of two cranes in operation near a building at a jobsite.

FIG. 4A is a perspective view of two cranes, 100 and 300 in operation near a building 400 at a jobsite.

Figure 4B:
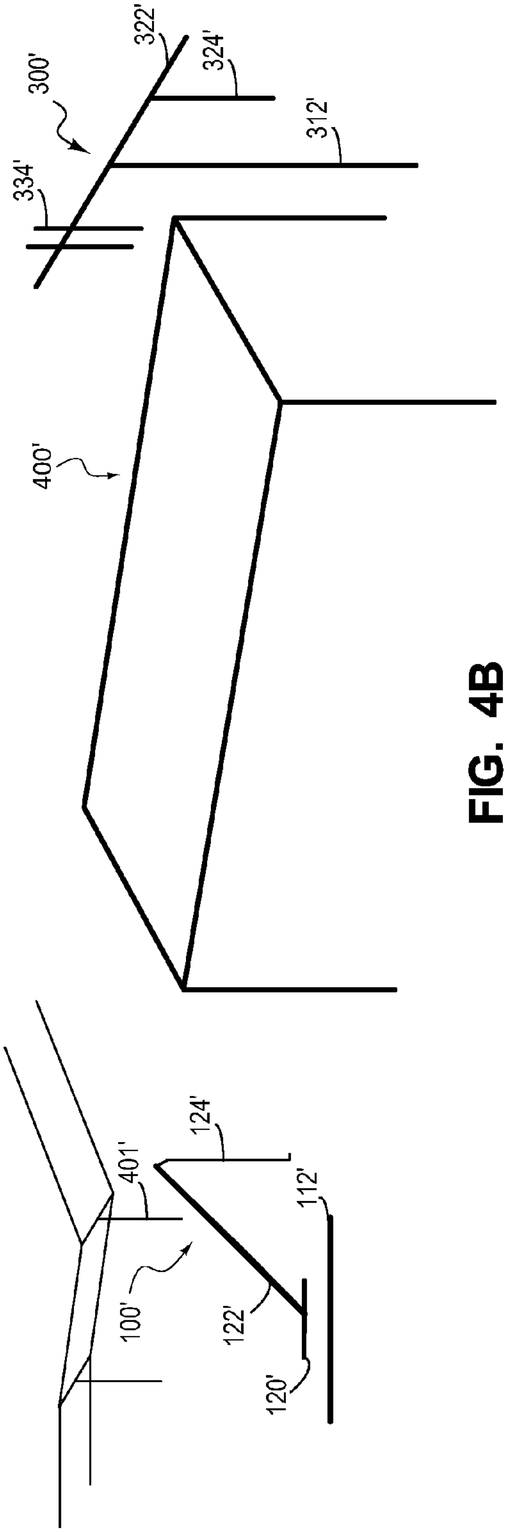
FIG. 4B is a perspective view of line segment equivalents of the two cranes and the building depicted in FIG. 4A.

FIG. 4B is a perspective view of line segment equivalents of the two cranes and the building depicted in FIG. 4A. For example, crane 100 is represented by line segment equivalent crane 100', crane 300 is represented by line segment equivalent crane 300', and building 400 is represented by line segment equivalent building 400'. With respect to line segment equivalent crane 100': 112 of crane 100 is represented by line segment 112', 120 of crane 100 is represented by line segment 120', 122 of crane 100 is represented by line segment 122', and 124 of crane 100 is represented by line segment 124'. With respect to line segment equivalent crane 300': 312 of crane 300 is represented by line segment 312', 322 of crane 300 is represented by line segment 322', and 334 of crane 100 is represented by line segment 334'. It should be appreciated that additional or fewer portions of crane 100, crane 200, and/or building 400 can be represented by equivalent line segments in line segment equivalent crane 100', line segment equivalent crane 300', and line segment equivalent building 400'. It should be further appreciated that locations of other objects such as other cranes, vehicles, structures, and items on or near a jobsite can be tracked and similarly represented by line segment equivalents. For example, in one embodiment, power pole 401 is an example of an "other tracked object" on the jobsite illustrated in FIG. 4A, and in FIG. 4B it is abstracted as line segment 401'

The present modeling approach disclosed herein includes geometric abstraction, which may be based on line segments (as illustrated by comparison of FIGS. 4A and 4B) within the absolute space surrounding a piece of construction equipment such as a crane. Hereinafter, such line segments will be referred to as "3D line segments" to emphasize their creation within the absolute 3D (or global) coordinate system. The boom may therefore be modeled as a 3D line segment. Additionally, the mast, hoist line, and upperworks of the crane may also be modeled with 3D line segments. A tower crane 300 is also depicted in FIGS. 4A and 4B along with a building on the jobsite, both of which may be outlined with line segments highlighting outer limits of structure and movable components. The 3D line segment of the boom may be aligned with the central axis of the boom, which will be discussed in more detail later. A beam or column of the building is another possible 3D line segment (as seen in FIG. 4B). The line segment model shown in FIG. 4B may also include a line segment for any other object, static or dynamic that may be present at the jobsite.

Figure 5:
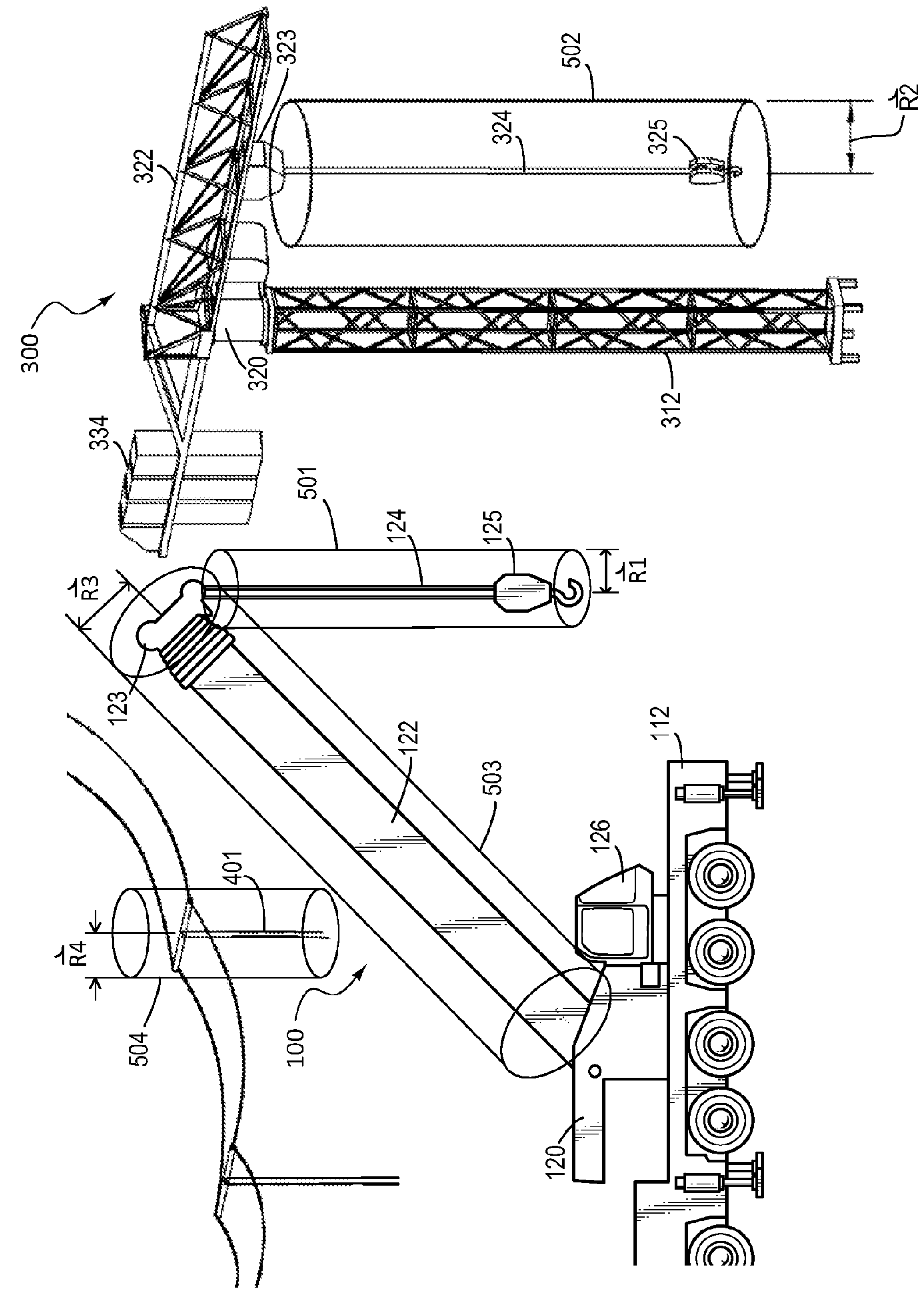
FIG. 5 is a perspective view of the cranes of FIG. 4A, additionally showing exclusion zones about movable components that are sizable according to specific criteria.

With further reference to FIG. 5, 3D volume abstractions 501, 502, 503 may be derived from radius applied to various tracked portions of a crane. For instance, a radius would create a cylindrical volume with flat, circular ends as shown, or with spherical ends, if desired. Such a cylindrical volume can form exclusion zones for use during construction planning and simulations, or for preventing undesirable equipment interactions and range limiting when applied in real-time to the construction execution phase. Similarly, a 3D volume abstraction 504 can be applied to another tracked object on a construction site, such as power pole 401. In FIG. 5, radius R1 is utilized to create cylindrical volume 501, radius R2 is utilized to create cylindrical volume 502, radius R3 is utilized to create cylindrical volume 503, and radius R4 is utilized to create cylindrical volume 504. Cylindrical volumes can similarly be created about 3D line segments 122', 124', 324', and 401' that are illustrated in FIG. 4B.

Another embodiment of the geometric abstraction includes developing virtual faces, e.g., planar surface abstractions, based on the 3D line segments. In one case, three 3D line segments share endpoints to form a triangular shape. In another case, the four 3D line segments are used to form a four-sided shape (such as the roof of building 400 seen in FIG. 4B). Surface normals can then be associated with patches to provide a logical "side" for a patch, and the patches may be associated with each other to form virtual solid models. For instance, building 400 could be abstracted as a rectangular solid. A larger version of the rectangular solid could be abstracted as an exclusion zone surrounding building 400.

These and other geometric abstractions as disclosed herein are chosen to allow fast processing of absolute position data and thus process the model, which aids automating the optimization of the construction planning, as well as allowing practical real-time computations at the jobsite. Detailed, three-dimensional models of the elements on a jobsite which attempt to include surface models would be more difficult for which to provide real-time computations, particularly if the algorithms are trying to handle range limiting amongst dozens or hundreds of the elements.

Figure 6:
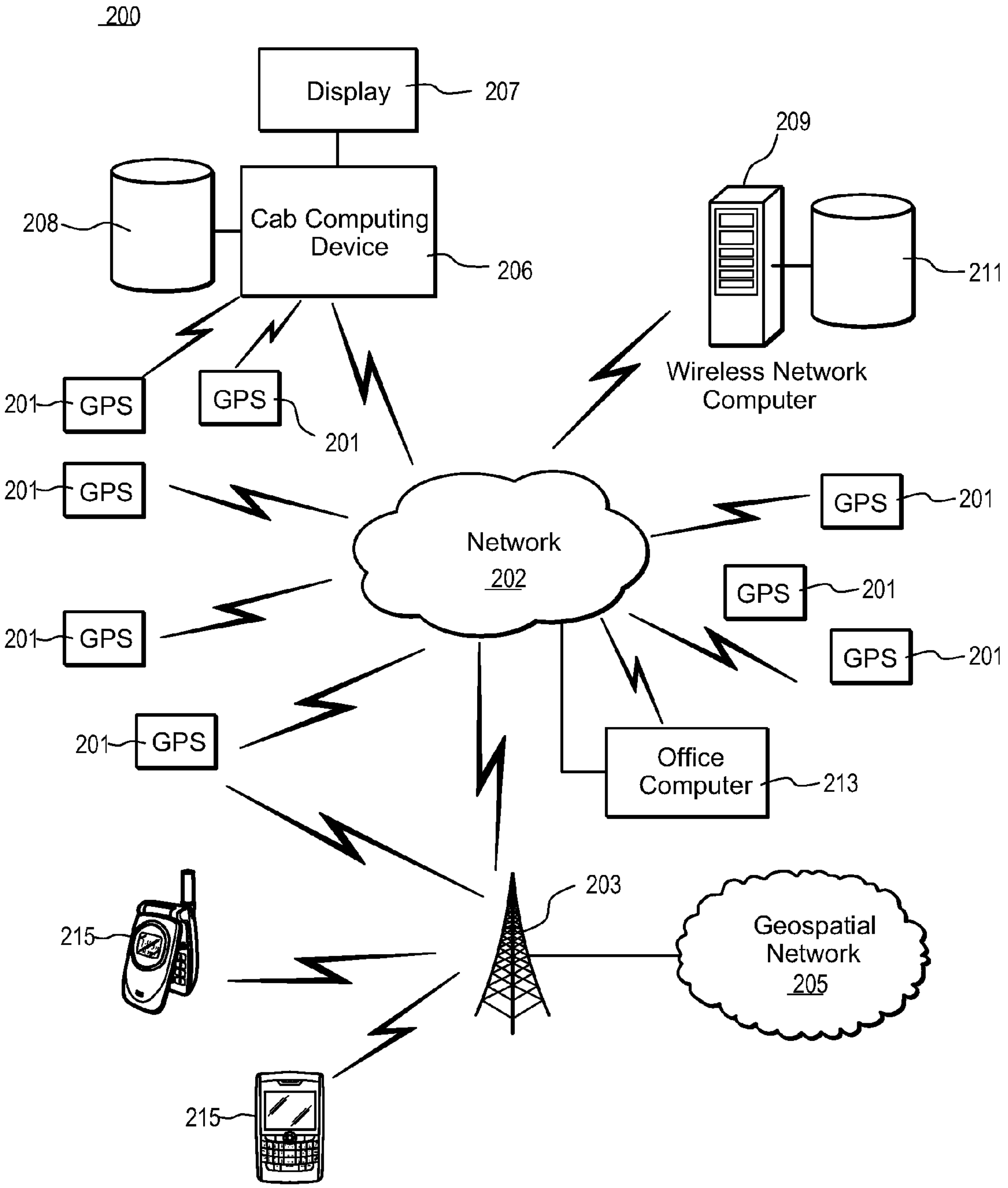
FIG. 6 is diagram of a distributed wireless network that communicates with positioning sensors, a cab computing device, and a base station computer of a jobsite such as that of FIG. 4A.

With further reference to FIG. 6, a system 200 includes a plurality of positioning (or GPS) sensors 201 interconnected through a network 202 such as a local wireless network. The network 202 may be coupled with a base station 203 or other networking structure through which to connect to a geospatial network 205 such as those discussed herein. Furthermore, the phrase "coupled with" is herein defined to mean directly connected to or indirectly connected through one or more intermediate components, including a network. The local wireless network 202 may not be required if the positioning sensors 201 communicate directly with the base station 203, and thus bypass the network 202. The GPS sensors 201 are positionable on components of construction equipment (or other dynamic objects) that one desires to track with the system 200 and also on static objects such as buildings, poles, and boulders. The GPS sensors 201 of FIG. 6 may also signify absolute positions supplied to the system 200 through a computing device of known locations of such static objects. Absolute (or global) positions of the static objects may be entered manually or pulled in from a database or other source of known geo-positions for such objects.

The geospatial network 205 may be built on any kind of global navigation satellite system (GNSS) such as a global positioning system (GPS) and/or a real-time kinematic (RTK) system. An advantageous aspect of building the disclosed modeling approach on absolute positioning technology of GNSS, GPS, and/or RTK is that no local jobsite calibration is required. All positioning sensors immediately (or nearly immediately) detect their location accurately with respect to each other. And, virtual jobsite elements such as buildings or raw material are also immediately correctly located without need for local calibration. Another advantageous aspect of the GNSS approach is that it handles the dynamic nature of the construction equipment. As the equipment moves around the jobsite, the GNSS approach continuously tracks their location.

The system 200 may also include a cab computing device 206 for one or more pieces of construction equipment. The computing device 206 may be coupled with a display 207 and system storage 208 for storing geo-positions in relation to various components and objects that will be displayed in mutual relation in the display according to the upperworks 3D coordinate system. The line segments may be used to display in real time the components of the crane (or other construction equipment) in relation to line segments of other static objects on the jobsite such that the crane operator may safely maneuver movable parts such as the boom and the mast. Furthermore, simulated movement developed during the planning phase may be followed in a step-by-step manner by the crane operator as guided on the display 207 of the computing device 206 during execution of the building phase.

The system 200 may further include a wireless network computer 209 and system storage 211 optionally for aiding in the gathering of positioning data from the jobsite and computing location-based line segments and/or exclusion zones that may be sent to the cab computing device 208 of construction equipment. Positioning sensors 201 of one piece of construction equipment or on static objects may send positioning data through the network 202 to other pieces of construction equipment, or if in close enough range, directly to the other pieces of construction equipment. The wireless network computer 209 may also accumulate positioning data from the GPS devices 201 (directly or through the network 202) and perform location-based processing steps on their behalf as will be described. Alternatively or in addition, the construction equipment may accumulate data from positioning sensors on respective pieces of construction equipment and send the data via the cab computing device 206 to other cab computing devices 206 of other construction equipment. Additionally, positioning data or computed line segments and/or exclusion zones may be sent to an office computer 213, cell phone 215, or other smart phone 215 or handheld device through the networks 202 and/or 205 for viewing and monitoring by off-site supervisors. The wireless network computer 209 may also be configured to track more than one jobsite at a time and be used to coordinate efforts by the same construction company between multiple jobsites through the planning and execution stages of construction.

Accordingly, the system 200 may enable the equipment operators and supervisors to observe on a display (of the computing device available to them) the real-time model built in advance for planning purposes or tracked in real-time for execution purposes. In addition, planned construction activities may be downloaded to the cab computing device 206 and observed on the display 207 in a format of the model (such as in a proprietary CAD program) with geometric abstractions such as the line segments and/or the exclusion zones. Furthermore, the line segments may be rendered in a more detailed 3D image with some additional post-processing as may be helpful to an operator in maneuvering movable parts of the crane within the jobsite. The display may also show jobsite-assigned unique ID's for the elements such as unique numbers for particular crane booms, raw materials, or items to be lifted. These planned construction activities may assist the operator with understanding the sequence of activities and their potential impact on the jobsite.

Figure 7:
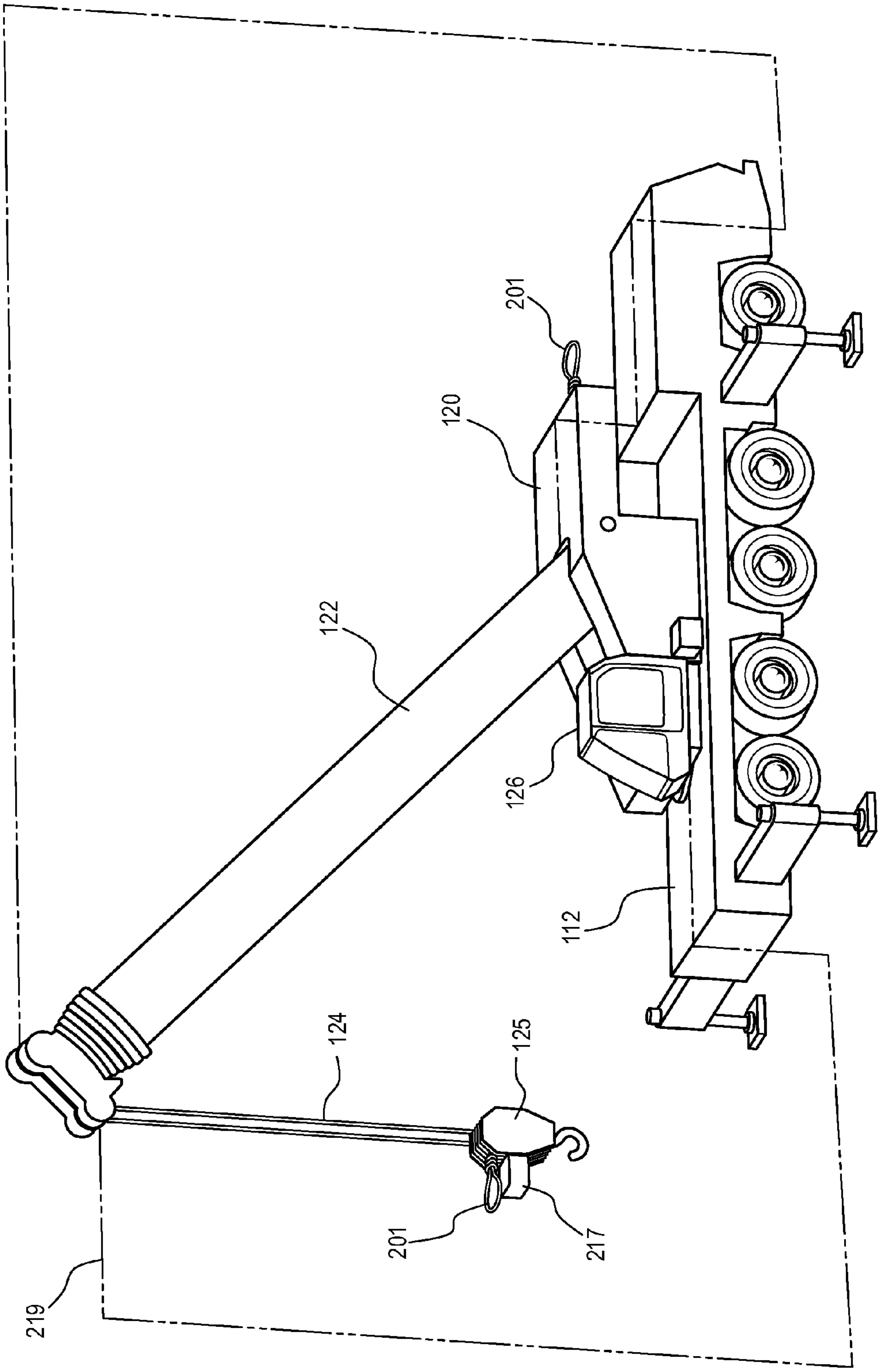
FIG. 7 is a perspective view of the crane of FIGS. 2A and 2B showing a mid-plane of the crane and two positioning sensors, one attached to a crane upperworks and one to a crane hook.

With reference to FIG. 7, the positioning sensors 201 may rely on battery power. A battery pack 217 containing one or more batteries may be located along with respective positioning sensors 201 in a combined package, as on the crane hook 125. Or, the battery pack 217 may be located separately from the sensors. GPS antennae on or near the top of the upperworks 120 may be at a significant distance from the ground. In this case, it would be difficult to regularly replace the batteries. Using a separate battery package near the ground level may resolve this challenge.

The positioning sensors 201 may be attached to the upperworks 120 in generally arbitrary positions with temporary attachment systems such as magnetic devices. In the case of a single upperworks positioning sensor, the sensor could be attached any distance from the axis of rotation of the upperworks and at any height needed to have GNSS signal acquisition. Such a positioning sensor could be at a crane midplane 219 or it could be some distance away from this midplane 219. In keeping with the consideration of practical crane design, it is assumed that the boom base hinge point forms the front of the upperworks 120 and the positioning sensor of the upperworks may be assumed to be behind this location (or toward the counterweight unit 34). In the case of multiple positioning sensors 201 on the upperworks, the swaying of the crane hook 125 or the pitch/roll of the upperworks 120 may be determined and considered in calculating the line segments and/or exclusion zones. The positioning sensors may still be placed arbitrarily, but are assumed to not be stacked on top of each other.

Calculations by the system 200 may be extended to the static objects on the jobsite (such as buildings or power lines). In one embodiment, positioning sensors may be placed on these objects, especially helpful when the objects may have some motion such as beams or columns being moved or placed by the crane. In another embodiment, absolute position sensors or geospatial information may be used on a one-time basis to initially locate the static objects in the geospatial or global coordinate system. In either case, the relatively static object technical means could be used over time to reflect the changing status of the jobsite.

The processing steps described below may be employed to determine the origin for the global 3D coordinate system of an upperworks of a crane and the axes of the same. The processing steps may also be adapted to track the tip of the boom given positioning data from positioning sensor(s) on the upperworks and hook of a crane with either a known length of the boom or a known boom angle. In practice, it is difficult to locate a positioning sensor such as a GPS device on the boom tip (particularly on a telescopic boom) without extensive redesign and/or retrofit efforts. The sensors may need to be provided with power from the crane through power cables. However, additional wiring that would be required for wired GPS devices for an ad hoc and changing mixture of cranes present at the jobsite is impractical. Thus, the sensors may be battery-powered. Also, the boom tip may not have space for the devices or the required counterweight mechanism needed to keep the GPS device antennae at a proper horizon-based orientation. Although it may be contemplated to provide battery power to the GPS device on the boom tip, the batteries would have to be refreshed on a regular basis and the boom tip—particularly on lattice crawler cranes like that of FIG. 1—may only be readily accessible when the crane is initially setup at the jobsite. Furthermore, these cranes may not bring the boom tip to the ground without first being disassembled. Accordingly, the ability to track the boom tip in changing circumstances of different types of cranes or construction equipment is difficult. By tracking the location of the hook and position(s) on the upperworks, the present methods enable accurate determination of the boom tip without a sensor thereon, enabling the determination of a line segment for the boom and for the hoist line extended from the boom. These line segments may then be employed in assisting a crane operator with safe maneuvering and collision avoidance.

These various processing steps may be executed by algorithms programmed in computer software of the cab computing device 206 of the crane. Alternatively or in addition, the processing steps may be executed in computer software of the base station 209 and/or the office computer 213 and results thereof sent back to the cab computing device 206 of the crane for use in maneuvering assistance. The latter may be referred to as cloud computing and may become more realistic in terms of speed and reliability as this technology develops and matures. Whatever technical means are employed for execution of these processing steps, they should be robustly configured and able to handle the variable quality of absolute position data, sensor availability, and have sufficient computation resources. The cab computing (or other) device may then generate the line segments of the movable or other components of the crane and compute distances from these line segments to line segments of other construction equipment or objects on the jobsite. The cab computing (or other) device may also develop exclusion zones (FIG. 5) around the line segments for help in maneuvering the movable components of the crane such that it avoids collision with other construction equipment and obstacles on the jobsite.

The exclusion zones may be created as virtual cylindrical volumes about the line segments (FIG. 5). These volumes are created by applying a radius value to the line segments. The radius value, and thus the exclusion zone size, can be adjusted for various characteristics of the crane or construction equipment, static object, or jobsite. For instance, the radius value may have a separate standard value for static objects of one type versus another type (such as building versus powerline). The radius value may have another standard value based on geographic location or jurisdiction. Different sizes of cylindrical exclusion zones can also be set depending on the speed or motion of the jobsite elements. For instance, the tower crane hook is presumed to be moving more quickly than the hook of the lattice crane, so the zones are sized accordingly. This can be done in real-time as the absolute positioning sensors provide speed and heading information. When the boom is moving with a slower motion, a smaller radius, R1, may be generated to create a small exclusion zone. When the boom is at a higher speed or heading toward critical jobsite objects, the radius value may be increased, respectively R2 and R3, to create larger exclusion zones.

In another case, when the quality of the data from the GNSS system 200 is reduced, the radius value may be increased. Furthermore, a different zone size can be used when a jobsite element is in a critical area. The critical area may be defined in a 3D manner (a critical volume) or in a 2D manner (a critical area of the jobsite). The exclusion zone may also be adjusted in size by crane (or equipment) type, by moving versus static object, or by elevation where moving components may be near ground level where personnel are located.

Global coordinates are absolute coordinates with respect to the geospatial 3D coordinate system described previously. Vectors in global space use $\vec{T}$. Absolute positioning sensors 201 detect position in global space. Unit vectors (which are indicators of just direction, not distance) in global space use lower case, as in $\hat{t}$. Local coordinates are coordinates relative to the upperworks (UW) coordinate system. Vectors in local space use $\vec{R}$. Unit vectors in local space also use lower case, as in $\hat{r}$.

In the following eight sections, various embodiments of the invention are explained with reference to one or more of the Figures. In each section, the disclose explains the variables that are known and assumed as inputs to the system, the variables sought as outputs to the system, and the algorithmic steps required to obtain the outputs from the known inputs. The first three sections (I, II, and III) disclose the determination of a geospatial, 3D upperworks (UW) coordinate system based on, respectively: (1) tracking locations of the crane hook and an arbitrary location of the UW; (2) tracking two arbitrary locations of the UW; and (3) tracking three arbitrary locations of the UW.

Section IV describes the determination of a 3D geospatial abstraction that results in a global vector to an endpoint of a crane component that is static with respect to the UW. Section V continues work with 3D geospatial abstraction in tracking a boom tip endpoint of a boom based on the location of the crane hook and a known boom length. Section VI, like Section V, describes tracking the boom tip endpoint, but in this section, based on tracking the location of the crane hook and a known boom angle. In Section V, a global vector to the boom tip endpoint and a boom angle are calculated. In Section VI, a global vector to the boom tip end point and a boom length are calculated. Section VII also contains an exemplary geospatial abstraction calculation, this one to determine a boom central axis of a crane and a global vector to a boom tip central axis endpoint of the crane. In Section VIII, geospatial abstractions on a trolley crane are calculated, especially with reference to a global vector to a trolley location of on the trolley crane. Sections V through VIII presume that one of Sections I through III have been used to determine a global 3D coordinate system on which to base the various calculations.

I. Determine Geospatial UW Coordinate System Based on Tracking Crane Hook and Tracking UW at an Arbitrary Location on the UW The following variables and information are considered known inputs into the system 200 for Section I beginning with reference to FIG. 8. When reference is made to an absolute tracking location it is with reference to a location of a positioning sensor 201 such as a GPS device that provides an absolute (or global) position.

Figure 8:
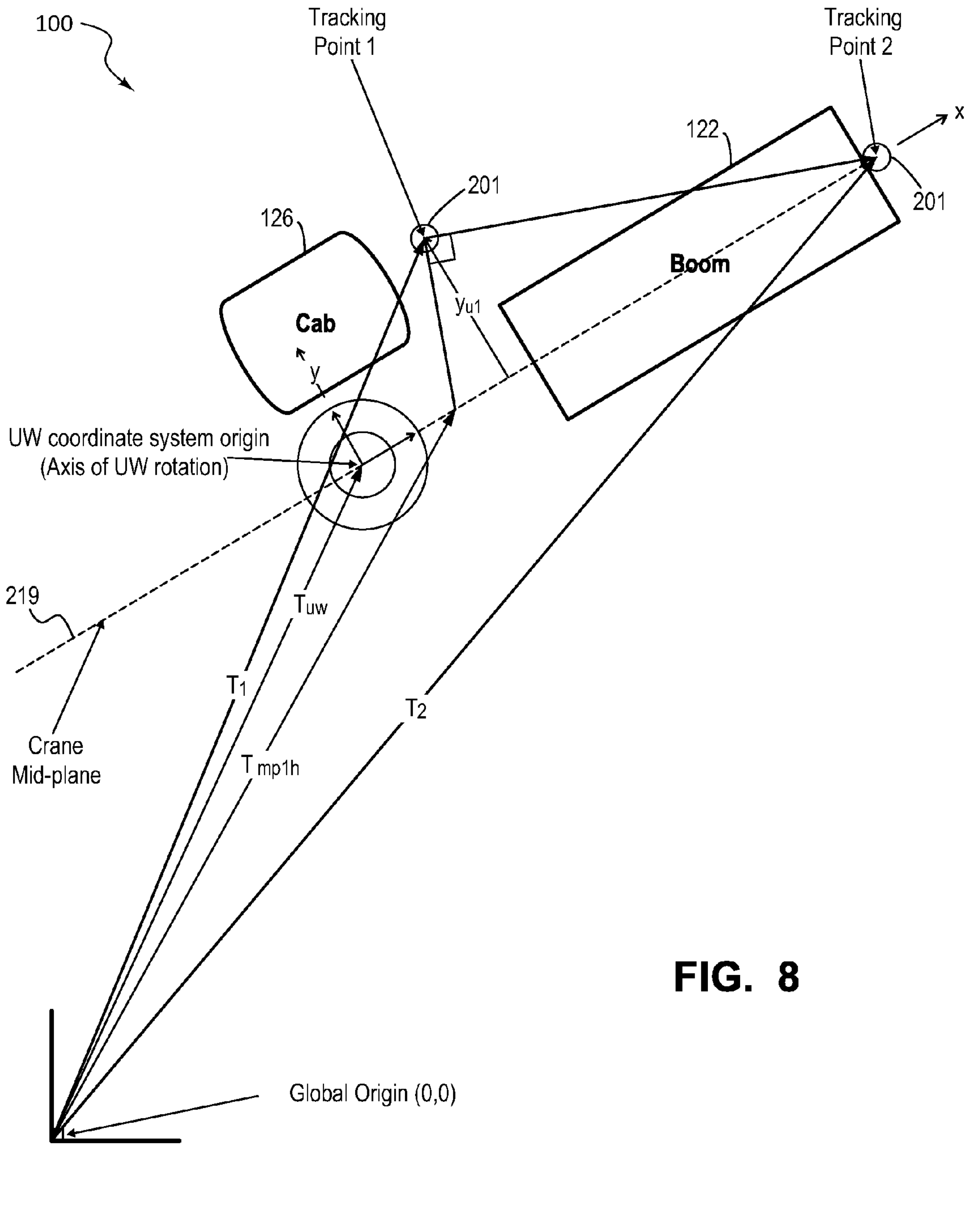
FIG. 8 is an abbreviated, plan view of a crane such as those in FIGS. 1 and 2, showing positioning sensor tracking points (one on the upperworks and one on the crane hook) from which is determined a 3D upperworks coordinate system origin in global coordinates from local coordinates of the upperworks, and showing intermediate dimensional vectors, used to assist maneuvering the crane.
Figure 10:
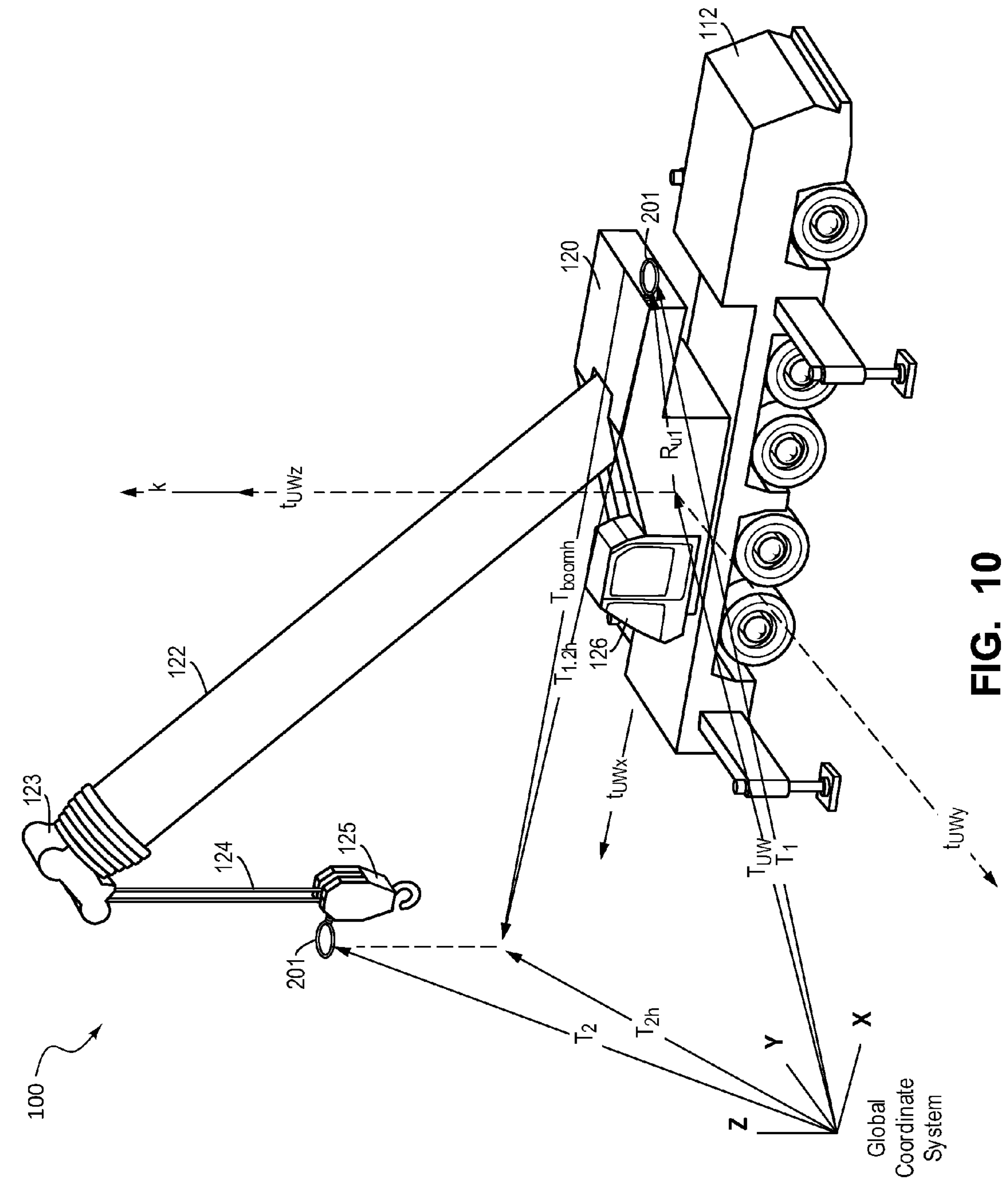
FIG. 10 is a perspective view for better viewing of the dimensions shown in the plan view of FIG. 8 with global coordinate vectors and a derived upperworks coordinate vector.

(1) $\vec{T}_1$—Global vector to absolute tracking location on the upperworks. Refer to FIG. 8 for a 2D view. Refer to FIG. 10 for a 3D view. Note that in FIG. 8, the UW tracking location is in the area of the cab near the base of the boom. In FIG. 10, however, the UW tracking location is at the rear of the UW near a location where the counterweights would be installed. The present disclosure considers the UW tracking location as functionally arbitrary except for limited exceptions as discussed.

(2) $\vec{T}_2$—Global vector to absolute tracking location on the crane hook. Refer to FIG. 8 for a 2D view. Refer to FIG. 10 for a 3D view.

(3) $x_{u1}$, $y_{u1}$, $z_{u1}$—Local coordinates of the tracking location on the UW. This is a fixed location with respect to the UW based on the crane configuration and sensor installation. For example, $y_{u1}$ is shown in FIG. 8.

(4) $\vec{R}_{u1}$—Vector form of $x_{u1}$, $y_{u1}$, $z_{u1}$, the location in local UW coordinate system (FIG. 10).

The following variables are to be determined as outputs by the system 200 with reference Section I:

(1) $\vec{T}_{UW}$—Global vector to UW coordinate system origin. Refer to FIG. 8 for a 2D view. Refer to FIG. 10 for a 3D view.

(2) $\hat{t}_{UWx}$—Unit vector in global coordinate system for x-axis of the UW coordinate system.

(3) $\hat{t}_{UWx}$—Unit vector in global coordinate system for y-axis of the UW coordinate system.

(4) $\hat{t}_{UWz}$—Unit vector in global coordinate system for z-axis of the UW coordinate system.

The processing steps of Section I apply to any crane type or piece of construction equipment with an upperworks (UW) and boom, including a lattice boom; a telescopic boom; or a jib on a tower crane. The UW absolute location sensor is assumed to be installed sufficiently aft of the boom such that the direction pointing from the UW tracking location to the crane hook tracking location will not cause the value of $y_{u1}$ to be equal to $d_{12h}$ (as seen in Equation 1-6 and FIG. 9). This would happen if the boom lifting or luffing motion went so far as to have the hook hanging right above the UW. But, according to typical crane design, the boom luffing motion is realistically expected to approach the vertical direction, but not attain or exceed it. And, the hook would not be realistically tracked with the hook right above or on the UW. According to typical crane design, the boom is assumed to be symmetrical with respect to the crane mid-plane 219 (refer to FIG. 7 for a 2D view of the crane mid-plane; the plane is "into" and "out of" the page). The lateral swaying of the hook into and out of the crane mid-plane 219 will change the direction of the x axis of the UW coordinate system. Pitch and roll effects are not considered. This method also applies to cases where the positioning sensor on the hook is attached to any other location on the boom at the crane mid-plane (such as attached to the hoist line, located at the boom tip, or located on top of the boom structure).

The calculation is executed by the system 200 to determine a global position vector for the hook tracking location, $\vec{T}_{2h}$, in a horizontal plane—which is at an elevation of the UW tracking location—by setting each scalar component as follows (FIG. 10):

$$\vec{T}_{2h,x}=\vec{T}_{2,x}$$

$$\vec{T}_{2h,y}=\vec{T}_{2,y}$$

$$\vec{T}_{2h,z}=\vec{T}_{2,z} \quad \text{(Equations 1-1)}$$

Determine a vector and unit vector from the UW tracking location to the hook tracking location in this horizontal plane as follows, where these vectors are not restricted to the crane mid-plane (FIG. 10 and FIG. 9, respectively):

$$\vec{T}_{1.2h}=\vec{T}_{2h}-\vec{T}_1 \quad \text{(Equation 1-2)}$$

$$\hat{t}_{1.2h}=\frac{\vec{T}_{1.2h}}{|\vec{T}_{1.2h}|}$$

Figure 9:
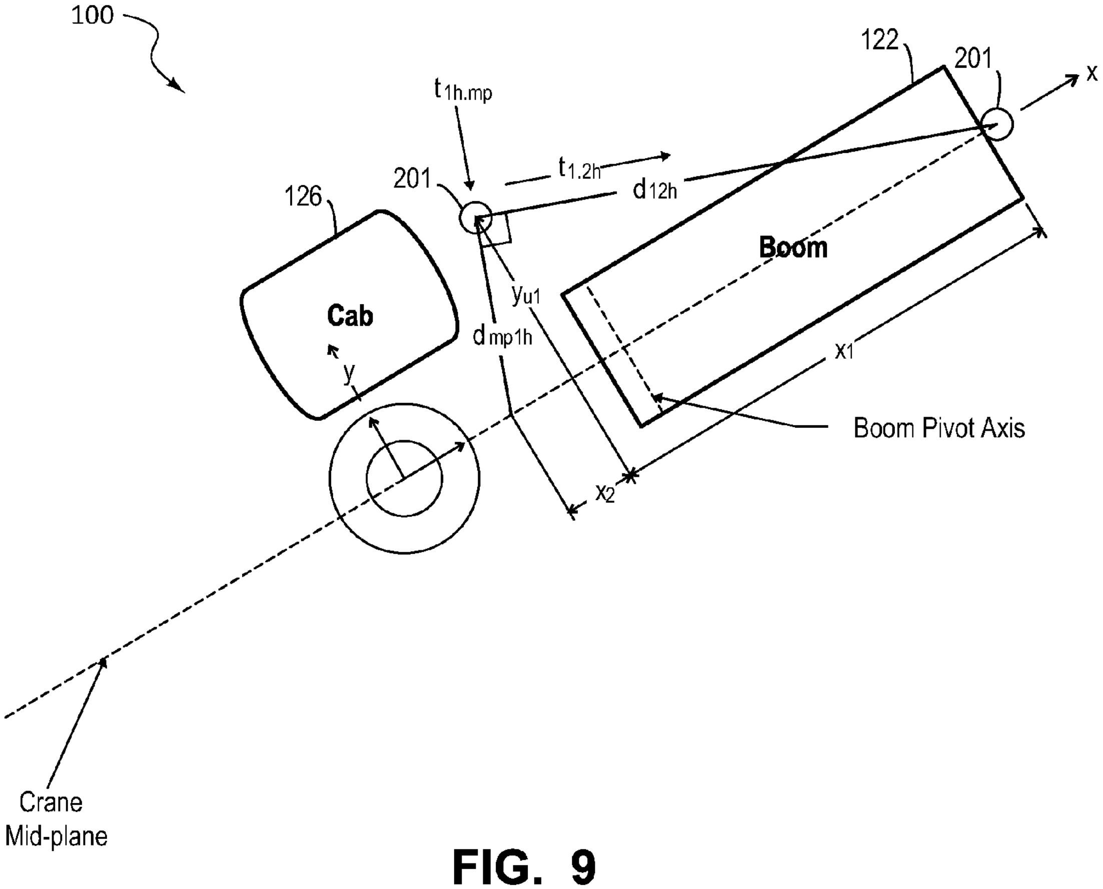
FIG. 9 is the plan view of FIG. 8, showing additional derived dimensions with reference to the crane boom.

Determine a unit vector that points from the UW tracking location towards the mid-plane of the crane in the horizontal plane as follows, where this direction corresponds to distance $d_{mp1h}$ as shown in FIG. 9:

$$\hat{t}_{1h.mp}=\hat{t}_{1.2h}\times\hat{k} \quad \text{(Equation 1-3)}$$

If $y_{u1}<0.0$, where the value of $y_{u1}$ in FIG. 9 is positive:

$$\hat{t}_{1h.mp}=-1\cdot\hat{t}_{1h.mp} \quad \text{(Equation 1-4)}$$

Calculate the distance from the UW tracking location to hook tracking location in the horizontal plane (FIG. 9) as follows:

$$d_{12h}=|\vec{T}_{1.2h}| \quad \text{(Equation 1-5)}$$

Calculate the distance from the UW tracking location toward the mid-plane (FIG. 9) as follows:

$$d_{mp1h}=\frac{|y_{u1}|\cdot d_{12h}}{\sqrt{d_{12h}^2-y_{u1}^2}} \quad \text{(Equation 1-6)}$$

As seen in FIG. 9, configuration of the boom and the positioning sensors is such that the value of $y_{u1}$ will not be equal to $d_{12h}$ to avoid a divide by zero failure of Equation 1-6. For instance, the boom is not expected to pivot to a vertical direction or beyond, and the UW tracking location should remain aft of the hook, even when the hook is at its closest point from the origin of the UW coordinate system. The absolute value of $y_{u1}$ is used since the direction of $\hat{t}_{1h.mp}$ was reversed for negative $y_{u1}$ value earlier (Equation 1-4). This reversing is not necessarily required, but it does allow this vector to retain the meaning of pointing towards the crane mid-plane regardless of the side of the UW where the UW sensor is located.

Determine a global position vector for the intersection of the $d_{mp1h}$ direction and the crane mid-plane in the horizontal plane (thus creating an absolute position on the mid-plane as in FIG. 8) as follows:

$$\vec{T}_{mp1h}=\vec{T}_1+d_{mp1h}\cdot\hat{t}_{1h.mp} \quad \text{(Equation 1-7)}$$

Determine a global vector that points in the positive x-direction for the UW coordinate system as follows (FIG. 10):

$$\vec{T}_{boomh}=\vec{T}_{2h}-\vec{T}_{mp1h} \quad \text{(Equation 1-8)}$$

Accordingly, $\vec{T}_{boomh}$ points in the direction of the boom in the horizontal plane at the crane mid-plane, e.g., it is the boom heading (FIGS. 8 and 10).

Determine a unit vector (in global coordinate system) for x direction of the UW coordinate system as follows (FIG. 10):

$$\hat{t}_{UWx}=\frac{\vec{T}_{boomh}}{|\vec{T}_{boomh}|} \quad \text{(Equation 1-9)}$$

Determine a unit vector in the global coordinate system for y-direction of the UW coordinate system as follows (FIG. 10):

$$\hat{t}_{UWy}=\hat{k}\times\hat{t}_{UWx} \quad \text{(Equation 1-10)}$$

Set the unit vector (in global coordinate system) for z direction of the UW coordinate system as follows (FIG. 10):

$$\hat{t}_{UWz}=\hat{k} \quad \text{(Equation 1-11)}$$

Determine local vector pointing from the UW tracking location to the UW coordinate system origin location by reversing direction of $\vec{R}_{u1}$ as follows (FIG. 10):

$$\vec{R}_{UWorigin}=-1\cdot\vec{R}_{u1} \quad \text{(Equation 1-12)}$$

Determine global position vector of the UW coordinate system origin using a transformation of the UW tracking location, $\vec{R}_{UWorigin}$ from local to global coordinates starting from the UW global location ($\vec{T}_1$) as follows, determining each scalar component separately:

$$\vec{T}_{UW,x}=\vec{T}_{1,x}+\vec{R}_{UWorigin,x}\cdot(\hat{i}\cdot\hat{t}_{UWx})+\vec{R}_{UWorigin,y}\cdot(\hat{i}\cdot\hat{t}_{UWy})+\vec{R}_{UWorigin,z}\cdot(\hat{i}\cdot\hat{t}_{UWz})$$

$$\vec{T}_{UW,y}=\vec{T}_{1,y}+\vec{R}_{UWorigin,x}\cdot(\hat{j}\cdot\hat{t}_{UWx})+\vec{R}_{UWorigin,y}\cdot(\hat{j}\cdot\hat{t}_{UWy})+\vec{R}_{UWorigin,z}\cdot(\hat{j}\cdot\hat{t}_{UWz})$$

$$\vec{T}_{UW,z}=\vec{T}_{1,z}+\vec{R}_{UWorigin,x}\cdot(\hat{k}\cdot\hat{t}_{UWx})+\vec{R}_{UWorigin,y}\cdot(\hat{k}\cdot\hat{t}_{UWy})+\vec{R}_{UWorigin,z}\cdot(\hat{k}\cdot\hat{t}_{UWz}) \quad \text{(Equations 1-13)}$$

Simplification and improved real-time computational performance can be realized as needed by applying Equation 1-11.

Figure 11:
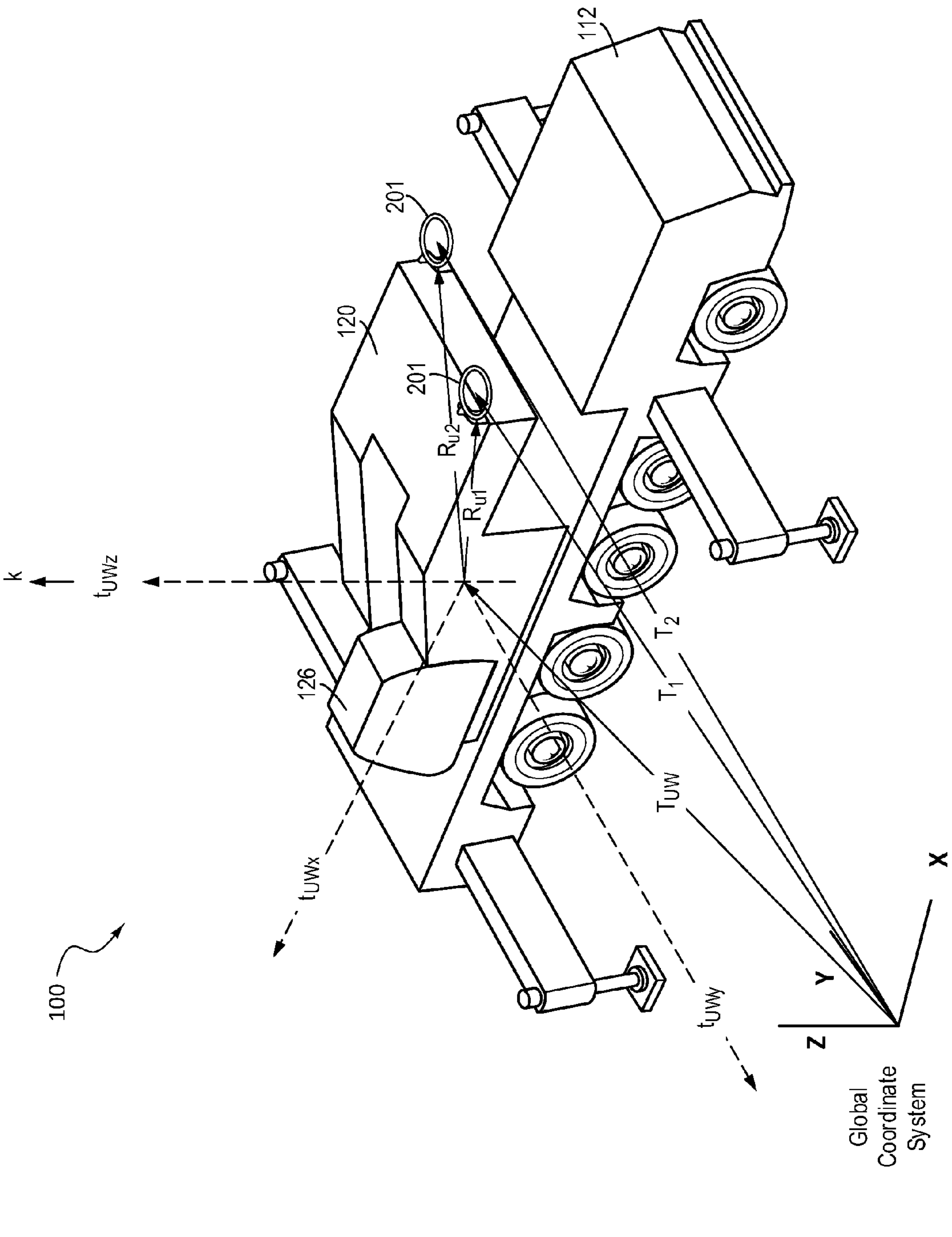
FIG. 11 is a perspective view of the crane of FIGS. 2A and 2B showing global coordinate vectors and derived upperworks coordinate vectors using two positioning sensors at arbitrary locations of the upperworks.

II. Determine 3D Geospatial UW Coordinate System Based on Two Arbitrary Tracking Locations on UW The following variables and information are considered known inputs into the system 200 for Section II beginning with reference to FIG. 11. When reference is made to an absolute tracking location it is with reference to a location of a positioning sensor such as a GPS device that provides an absolute (or global) position.

(1) $\vec{T}_1$—Global vector to absolute tracking location 1 on the UW.

(2) $\vec{T}_2$—Global vector to absolute tracking location 2 on UW.

(3) $x_{u1}$, $y_{u1}$, $z_{u1}$—Local coordinates of tracking location 1 on the UW. This is a fixed location with respect to the UW based on the crane configuration and sensor installation.

(4) $x_{u2}$, $y_{u2}$, $z_{u2}$—Local coordinates of tracking location 2 on the UW. This is a fixed location with respect to the UW based on the crane configuration and sensor installation.

(5) $\vec{R}_{u1}$—Vector form of $x_{u1}$, $y_{u1}$, $z_{u1}$ location in the UW coordinate system.

(6) $\vec{R}_{u2}$—Vector form of $x_{u2}$, $y_{u2}$, $z_{u2}$ location in the UW coordinate system.

(7) $\hat{i}_u$—Unit vector for x direction in the UW coordinate system, which is the same value as $\hat{i}$ in global coordinate system—"1,0,0"—but documented specifically for clarity.

The following variables are to be determined as outputs by the system 200 with reference to Section II:

(1) $\vec{T}_{UW}$—Global vector to UW coordinate system origin.

(2) $\hat{t}_{UWx}$—Unit vector in global coordinate system for x axis of the UW coordinate system.

(3) $\hat{t}_{UWy}$—Unit vector in global coordinate system for y axis of the UW coordinate system.

(4) $\hat{t}_{UWz}$—Unit vector in global coordinate system for z axis of the UW coordinate system.

The processing steps of Section II apply to any crane type with an upperworks (UW) and that include a lattice boom, telescopic boom, or a jib of a tower crane. The positioning sensors are not located at the same x and y location in the UW coordinate system. In other words, the positioning sensors are not stacked vertically on top of each other. Otherwise, the sensors can be located anywhere on the UW. Unlike Section I, the lateral swaying of the hook (into and out of the crane mid-plane) will not change the direction of the x-axis of the UW coordinate system. Pitch and roll effects are not considered.

Calculations through Equations 2-3 of Section II may be executed by the system 200 offline, without necessarily performing them in real-time. The remainder of the calculations may be executed by the system 200 in real-time.

Figure 12:
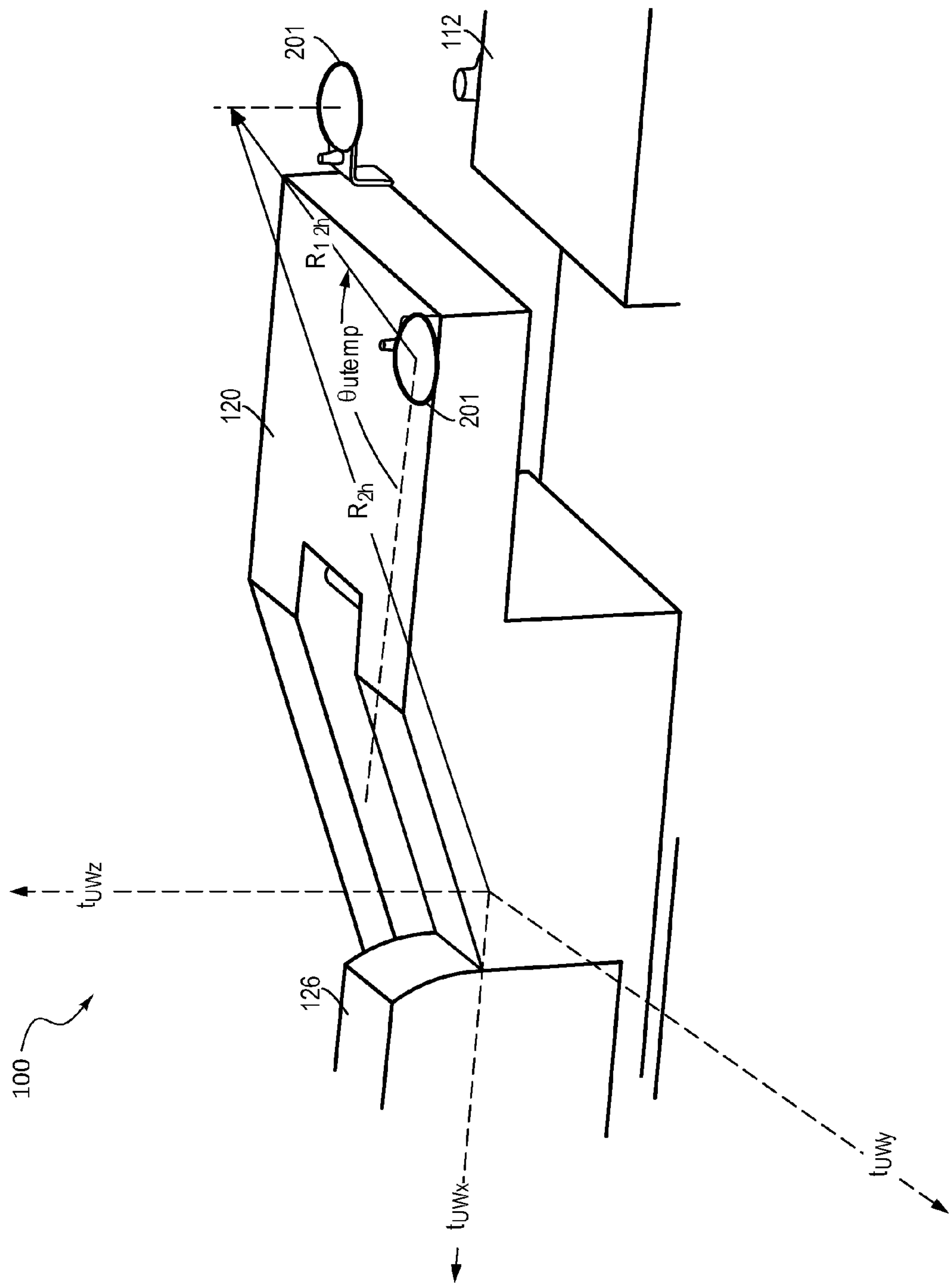
FIG. 12 is a perspective view of the crane of FIG. 11 showing determination of a local vector and unit vector pointing from a first tracking location to a second tracking location.

With further reference to FIG. 12, determine a local position vector in the UW coordinate system for the tracking location 2 in the horizontal plane (at the same elevation as tracking location 1) by setting each scalar component as follows:

$$\vec{R}_{2h,x}=\vec{R}_{u2,x}$$

$$\vec{R}_{2h,y}=\vec{R}_{u2,y}$$

$$\vec{R}_{2h,z}=\vec{R}_{u2,z} \quad \text{(Equations 2-1)}$$

Determine a local vector and unit vector pointing from tracking location 1 to tracking location 2 in the horizontal plane as follows:

$$\vec{R}_{1.2h}=\vec{R}_{2h}-\vec{R}_{u1} \quad \text{(Equations 2-2)}$$

$$\hat{r}_{1.2h}=\frac{\vec{R}_{1.2h}}{|\vec{R}_{1.2h}|}$$

Determine the angle (in the horizontal or x-y plane of the UW coordinate system) between $\hat{r}_{1.2h}$ and the x-axis of the UW coordinate system, $\theta_{utemp}$, as well as an angular rotation value, $\theta_u$, for use later as follows:

$$\theta_{utemp}=\cos^{-1}(\hat{i}_u\cdot\hat{r}_{1.2h}) \quad \text{(Equations 2-3)}$$

If $y_{u1}<y_{u2}$:

$$\theta_u=-\theta_{utemp}$$

If $y_{u1}>y_{u2}$:

$$\theta_u=\theta_{utemp}$$

If $y_{u2}=y_{u1}$ and $x_{u1}<x_{u1}$ $$\theta_u=0$$

If $y_{u2}=y_{u1}$ and $x_{u1}>x_{u2}$ $$\theta_u=\pi.$$

To this point in the method, the previous calculations can be performed once for a given crane configuration and sensor installation. The remainder of the calculations may be done in real-time using the absolute tracking sensor data.

Figure 13:
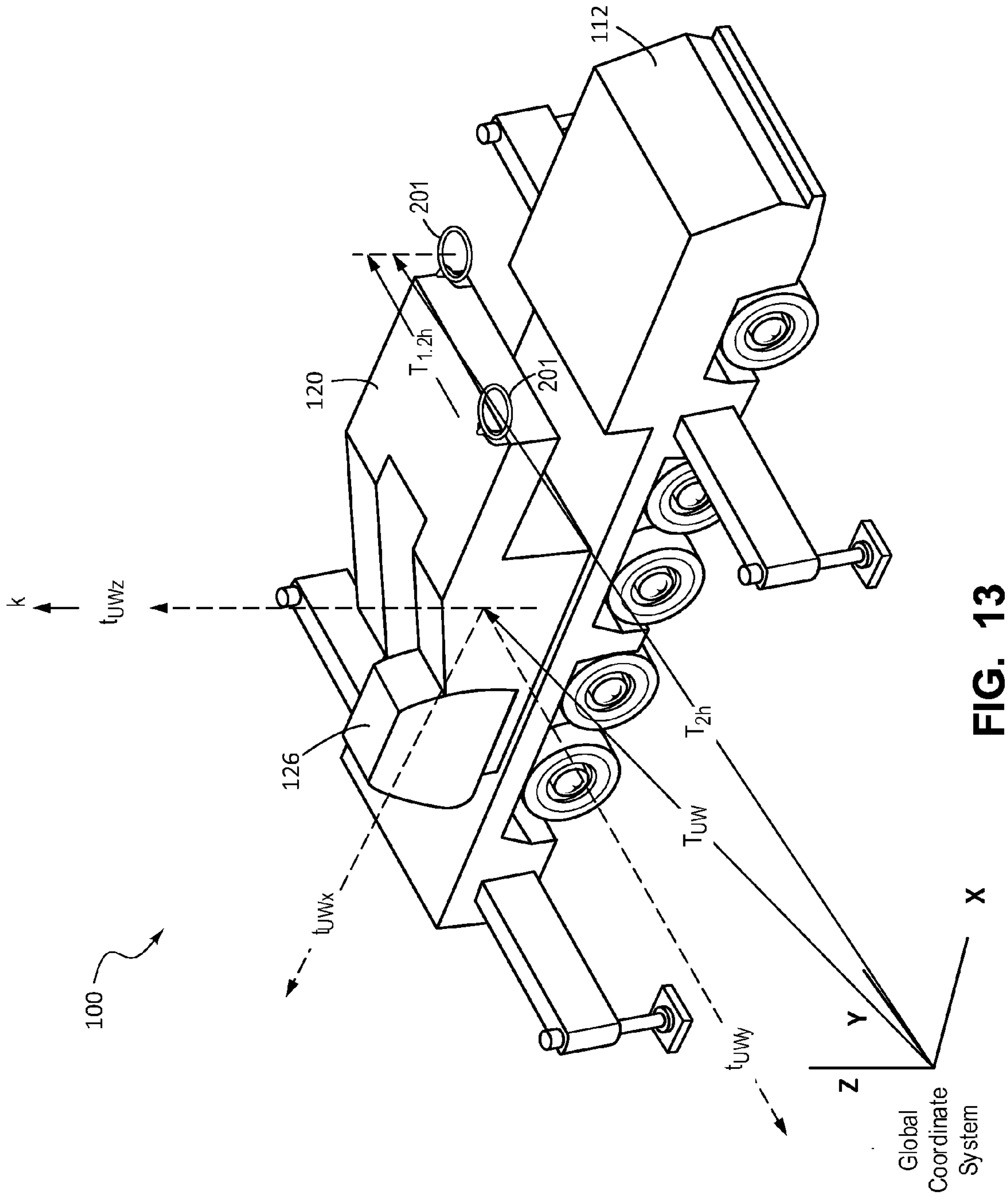
FIG. 13 is the perspective view of the crane of FIG. 11, displaying global position vectors and vectors of the upperworks coordinate system.

With further reference to FIG. 13, determine a global position vector for UW tracking location 2 in a horizontal plane, which is at the elevation of the UW tracking location 1 as follows:

$$\vec{T}_{2h,x}=\vec{T}_{2,x}$$

$$\vec{T}_{2h,y}=\vec{T}_{2,y}$$

$$\vec{T}_{2h,z}=\vec{T}_{2,z} \quad \text{(Equations 2-4)}$$

Determine a vector and a unit vector from UW tracking location 1 to UW tracking location 2 in this horizontal plane as follows:

$$\vec{T}_{1.2h} = \vec{T}_{2h} - \vec{T}_1$$

$$\hat{t}_{1.2h} = \frac{\vec{T}_{1.2h}}{|\vec{T}_{1.2h}|} \quad \text{(Equations 2-5)}$$

Rotate the $\hat{t}_{1.2h}$ unit vector about the $\hat{k}$ unit vector (global z axis) by $\theta_u$ to arrive at $\hat{t}_{UWx}$, the x axis direction for the UW coordinate system. Determine the y-direction of the UW coordinate system as follows:

$$\hat{t}_{UWy} = \hat{k} \times \hat{t}_{UWx} \quad \text{(Equation 2-6)}$$

Set the unit vector in global coordinate system for the z-direction of the UW coordinate system as follows:

$$\hat{t}_{UWz} = \hat{k} \quad \text{(Equation 2-7)}$$

Determine a local vector pointing from the UW tracking location 1 to the UW coordinate system origin location by reversing direction of $\vec{R}_{u1}$ as follows:

$$\vec{R}_{UWorigin} = -1 \cdot \vec{R}_{u1} \quad \text{(Equation 2-8)}$$

Determine a global position vector of the UW coordinate system origin using a transformation of the UW tracking location 1, $\vec{R}_{UWorigin}$ from local to global coordinates starting from the UW global location 1 ($\vec{T}_1$) as follows, determining each component separately:

$$\vec{T}_{UW,x} = \vec{T}_{1,x} + \vec{R}_{UWorigin,x} \cdot (\hat{i} \cdot \hat{t}_{UWx}) + \vec{R}_{UWorigin,y} \cdot (\hat{i} \cdot \hat{t}_{UWy}) + \vec{R}_{UWorigin,z} \cdot (\hat{i} \cdot \hat{t}_{UWz})$$

$$\vec{T}_{UW,y} = \vec{T}_{1,y} + \vec{R}_{UWorigin,x} \cdot (\hat{j} \cdot \hat{t}_{UWx}) + \vec{R}_{UWorigin,y} \cdot (\hat{j} \cdot \hat{t}_{UWy}) + \vec{R}_{UWorigin,z} \cdot (\hat{j} \cdot \hat{t}_{UWz})$$

$$\vec{T}_{UW,z} = \vec{T}_{1,z} + \vec{R}_{UWorigin,x} \cdot (\hat{k} \cdot \hat{t}_{UWx}) + \vec{R}_{UWorigin,y} \cdot (\hat{k} \cdot \hat{t}_{UWy}) + \vec{R}_{UWorigin,z} \cdot (\hat{k} \cdot \hat{t}_{UWz}) \quad \text{(Equations 2-9)}$$

Simplification and improved real-time computational performance can be realized as needed by applying Equation 2-7.

III. Determine 3D Geospatial UW Coordinate System Based on Three Arbitrary Tracking Locations on UW The following variables and information are considered known inputs into the system 200 for Section III with initial reference to FIG. 14. When reference is made to an absolute tracking location it is with reference to a location of a positioning sensor such as a GPS device that provides an absolute (or global) position.

(1) $\vec{T}_1$—Global vector to absolute tracking location 1 on the UW.

(2) $\vec{T}_2$—Global vector to absolute tracking location 2 on the UW.

(3) $\vec{T}_3$—Global vector to absolute tracking location 3 on the UW.

(4) $x_{u1}$, $y_{u1}$, $z_{u1}$—Local coordinates of tracking location 1 on the UW.

(5) $x_{u2}$, $y_{u2}$, $z_{u2}$—Local coordinates of tracking location 2 on the UW.

(6) $x_{u3}$, $y_{u3}$, $z_{u3}$—Local coordinates of tracking location 3 on the UW. The locations of (4), (5), and (6) are fixed locations with respect to the UW based on the crane configuration and sensor installation.

(7) $\vec{R}_{u1}$—Vector form of $x_{u1}$, $y_{u1}$, $z_{u1}$ location in the UW coordinate system.

(8) $\vec{R}_{u2}$—Vector form of $x_{u2}$, $y_{u2}$, $z_{u2}$ location in the UW coordinate system.

(9) $\vec{R}_{u3}$—Vector form of $x_{u3}$, $y_{u3}$, $z_{u3}$ location in the UW coordinate system.

(10) $\hat{i}_u$—Unit vector for x-direction in UW coordinate system (same value as $\hat{i}$ with component scalar values 1,0,0, but documented specifically for clarity).

(11) $\hat{j}_u$—Unit vector for y direction in UW coordinate system (same value as $\hat{j}$ with component scalar values 0,1,0, but documented specifically for clarity).

(12) $\hat{k}_u$—Unit vector for x direction in UW coordinate system (same value as $\hat{k}$ with component scalar values 0,0,1, but documented specifically for clarity).

The following variables are to be determined as outputs by the system 200 with reference to Section III, as follows:

(1) $\vec{T}_{UW}$—Global vector to the UW coordinate system origin.

(2) $\hat{t}_{UWx}$—Unit vector in global coordinate system for x axis of the UW coordinate system.

(3) $\hat{t}_{UWy}$—Unit vector in global coordinate system for y axis of the UW coordinate system.

(4) $\hat{t}_{UWz}$—Unit vector in global coordinate system for z axis of the UW coordinate system.

Figure 14:
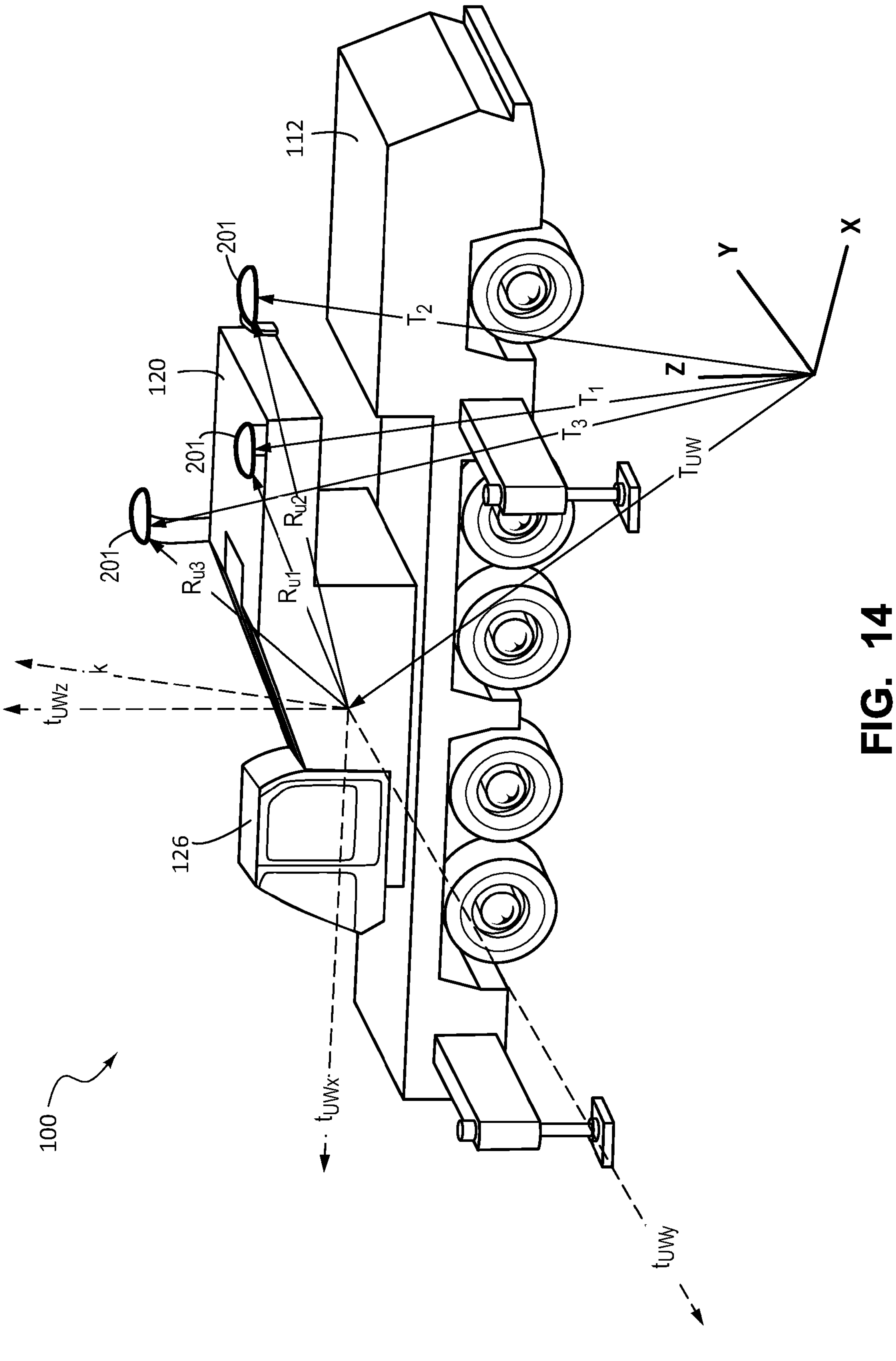
FIG. 14 is a perspective view of the crane of FIGS. 2A and 2B showing positioning sensor tracking points from which is determined an upperworks coordinate system origin in global coordinates from local coordinates of the upperworks, and showing intermediate dimensional vectors.

The processing steps of Section III apply to any crane type with an upperworks (UW) such as cranes that include a lattice boom, telescopic boom, or a jib of a tower crane. The positioning sensors are not located at the same x and y location in the UW coordinate system. In other words, the positioning sensors are not stacked vertically on top of each other. Otherwise, the sensors can be located anywhere on the UW. Unlike in Section I, the lateral swaying of the hook (into and out of the crane mid-plane) will not change the direction of the x-axis of the UW coordinate system. Unlike Sections I and II, pitch and roll effects are considered. In FIG. 14, note that the $\hat{k}$ vector is no longer collinear with $\hat{t}_{UWz}$.

Calculations through Equations 3-8 of Section III may be executed by the system 200 offline, without necessarily performing them in real-time. The remainder of the calculations may be executed by the system 200 in real-time.

Figure 15:
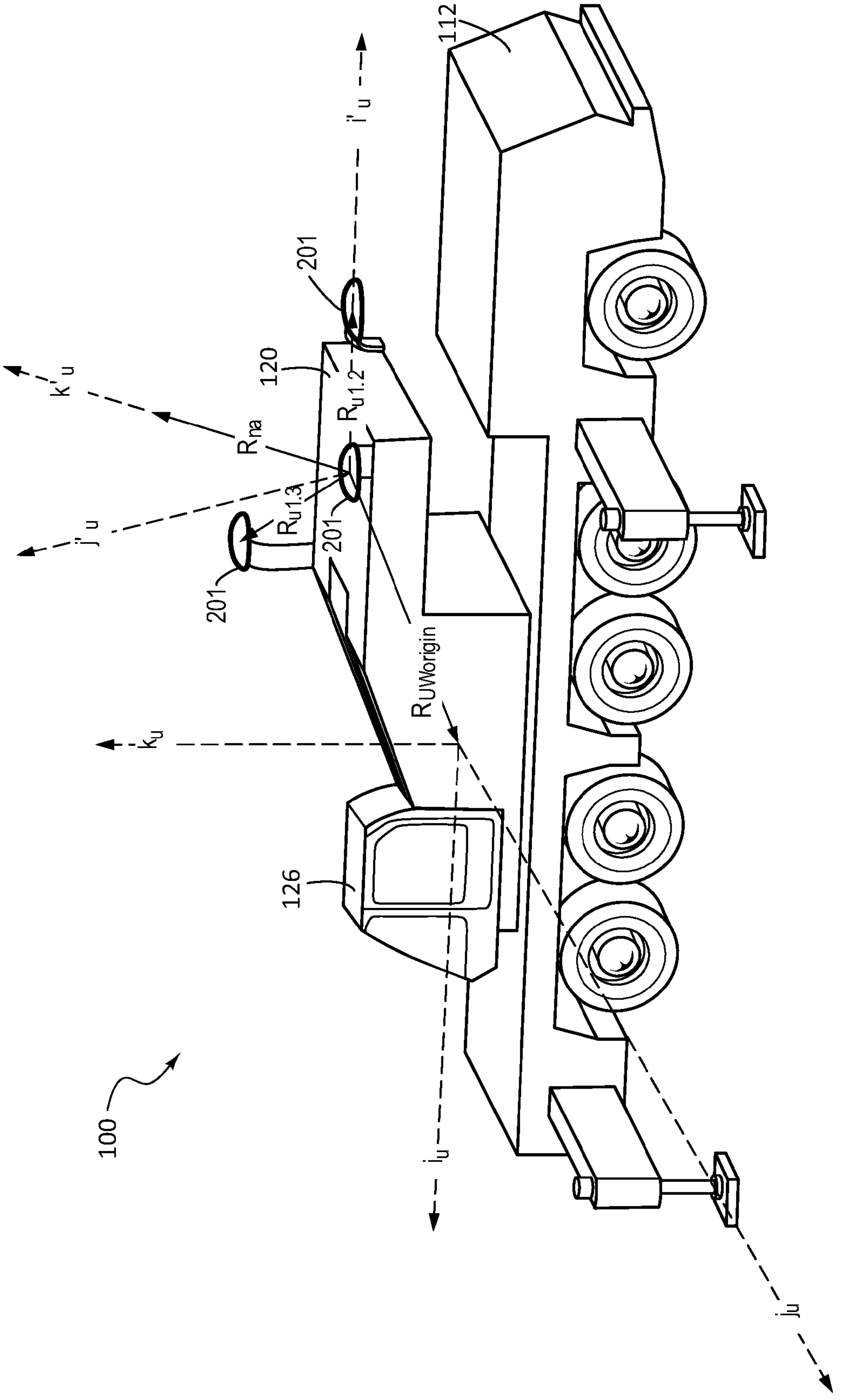
FIG. 15 is the perspective view of the crane of FIG. 14 showing the local vectors of the upperworks coordinate system and related dimensional vectors from one of the positioning sensors on the upperworks.

With further reference to FIG. 15, determine a local vector in the UW coordinate system pointing from tracking location 1 to tracking location 2:

$$\vec{R}_{u1.2} = \vec{R}_{u2} - \vec{R}_{u1} \quad \text{(Equation 3-1)}$$

Determine a local vector in the UW coordinate system pointing from tracking location 1 to tracking location 3:

$$\vec{R}_{u1.3} = \vec{R}_{u3} - \vec{R}_{u1} \quad \text{(Equation 3-2)}$$

Determine a local vector normal to the plane formed by these two vectors:

$$\vec{R}_{na} = \vec{R}_{u1.2} - \vec{R}_{u1.3} \quad \text{(Equation 3-3)}$$

Based on this plane, determine a set of unit vectors that model a coordinate system within the UW coordinate system that is aligned with this plane (or can be thought of as aligning with the 3 tracking locations) as follows:

$$\hat{i}'_u = \frac{\vec{R}_{u1.2}}{|\vec{R}_{u1.2}|} \quad \text{(Equation 3-4)}$$

$$\hat{k}'_u = \frac{\vec{R}_{na}}{|\vec{R}_{na}|} \quad \text{(Equation 3-5)}$$

$$\hat{j}'_u = \hat{k}'_u \times \hat{i}'_u \quad \text{(Equation 3-6)}$$

Determine a local vector pointing from the UW tracking location 1 to the UW coordinate system origin location by reversing direction of $\vec{R}_{u1}$ (within the UW coordinate system) as follows:

$$\vec{R}_{UWorigin}=-1\cdot\vec{R}_{u1} \quad \text{(Equation 3-7)}$$

Transform this location of the origin of the UW coordinate system to the new aligned coordinate system formed by $\hat{i}'_u$, $\hat{j}'_u$, and $\hat{k}'_u$ as follows:

$$\vec{R}'_{UWorigin,x}=\vec{R}_{UWorigin,x}\cdot(\hat{i}_u\cdot\hat{i}'_u)+\vec{R}_{UWorigin,y}\cdot(\hat{i}_u\cdot\hat{j}'_u)+\vec{R}_{UWorigin,z}\cdot(\hat{i}_u\cdot\hat{k}'_u)$$

$$\vec{R}'_{UWorigin,y}=\vec{R}_{UWorigin,x}\cdot(\hat{j}_u\cdot\hat{i}'_u)+\vec{R}_{UWorigin,y}\cdot(\hat{j}_u\cdot\hat{j}'_u)+\vec{R}_{UWorigin,z}\cdot(\hat{j}_u\cdot\hat{k}'_u)$$

$$\vec{R}'_{UWorigin,z}=\vec{R}_{UWorigin,x}\cdot(\hat{k}_u\cdot\hat{i}'_u)+\vec{R}_{UWorigin,y}\cdot(\hat{k}_u\cdot\hat{j}'_u)+\vec{R}_{UWorigin,z}\cdot(\hat{k}_u\cdot\hat{k}'_u) \quad \text{(Equation 3-8)}$$

To this point in the method, the previous calculations can be performed once for a given crane configuration and sensor installation. The remainder of the calculations may be executed in real-time using the absolute tracking sensor data.

Figure 16:
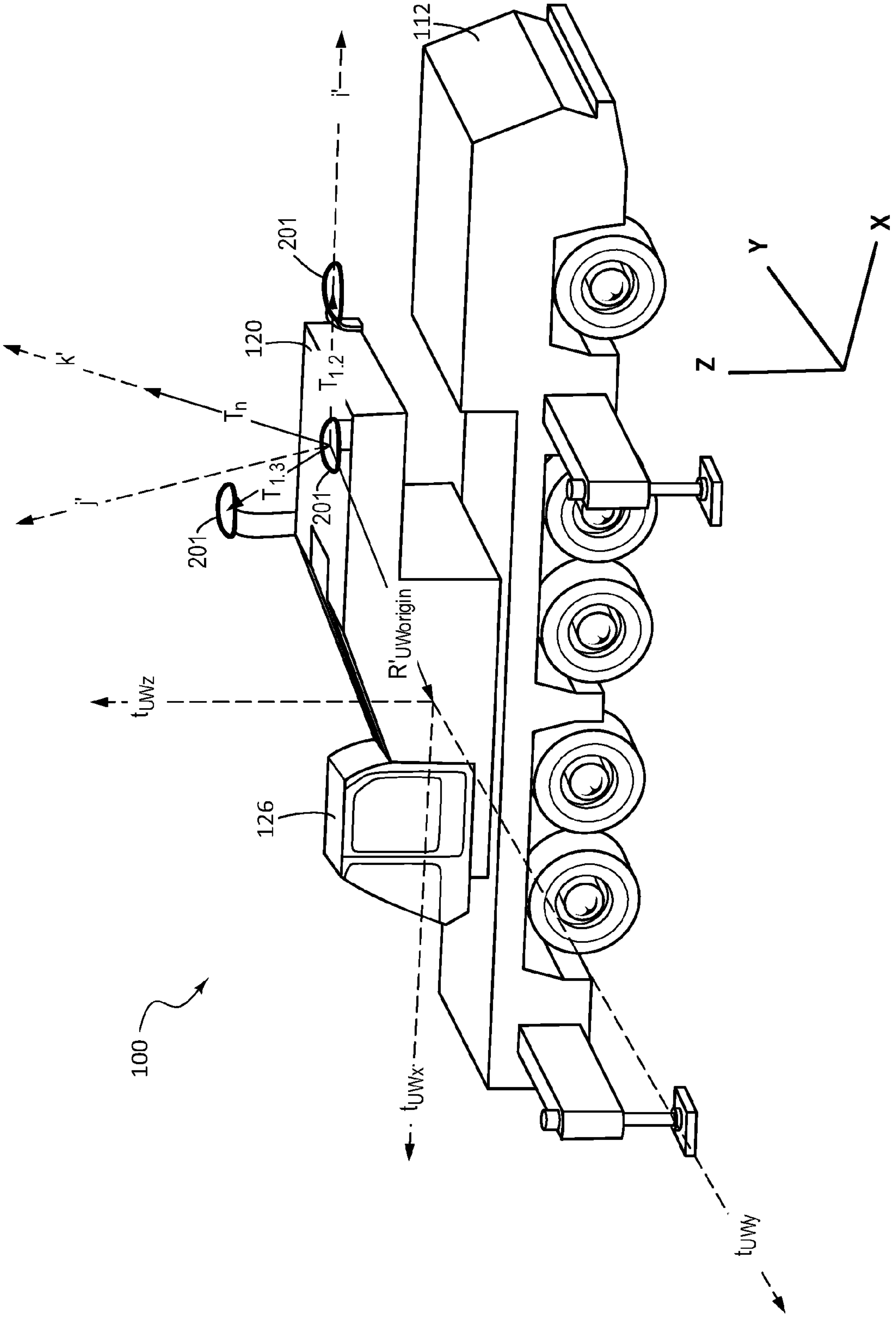
FIG. 16 is the perspective view of the crane of FIG. 15 showing global position vectors derived from the local vectors and from the three positioning sensors.

With further reference to FIG. 16, determine a global position vector pointing from UW tracking location 1 to UW tracking location 2 as follows:

$$\vec{T}_{1,2}=\vec{T}_2-\vec{T}_1 \quad \text{(Equation 3-9)}$$

Determine a global position vector pointing from UW tracking location 1 to UW tracking location 3 as follows:

$$\vec{T}_{1,3}=\vec{T}_3-\vec{T}_1 \quad \text{(Equation 3-10)}$$

Determine a vector normal to the plane formed by these 2 vectors:

$$\vec{T}_n=\vec{T}_{1,2}\times\vec{T}_{1,3} \quad \text{(Equation 3-11)}$$

Based on this plane, determine a set of unit vectors that model a coordinate system within the global coordinate system that is aligned with this plane (or can be thought of as aligning with the 3 tracking locations) as follows:

$$\hat{i}'=\frac{\vec{T}_{1,2}}{|\vec{T}_{1,2}|} \quad \text{(Equation 3-12)}$$

$$\hat{k}'=\frac{\vec{T}_n}{|\vec{T}_n|} \quad \text{(Equation 3-13)}$$

$$\hat{j}'=\hat{k}'\times\hat{i}' \quad \text{(Equation 3-14)}$$

Determine the orientation of the UW coordinate system in the global coordinate system by transformation of the earlier determined local unit vector directions as follows:

$$\hat{t}_{UWx,x}=\hat{i}'_{u,x}\cdot(\hat{i}\cdot\hat{i}')+\hat{i}'_{u,y}\cdot(\hat{i}\cdot\hat{j}')+\hat{i}'_{u,z}\cdot(\hat{i}\cdot\hat{k}')$$

$$\hat{t}_{UWx,y}=\hat{i}'_{u,x}\cdot(\hat{j}\cdot\hat{i}')+\hat{i}'_{u,y}\cdot(\hat{j}\cdot\hat{j}')+\hat{i}'_{u,z}\cdot(\hat{j}\cdot\hat{k}')$$

$$\hat{t}_{UWx,z}=\hat{i}'_{u,x}\cdot(\hat{k}\cdot\hat{i}')+\hat{i}'_{u,y}\cdot(\hat{k}\cdot\hat{j}')+\hat{i}'_{u,z}\cdot(\hat{k}\cdot\hat{k}') \quad \text{(Equations 3-15)}$$

$$\hat{t}_{UWy,x}=\hat{j}'_{u,x}\cdot(\hat{i}\cdot\hat{i}')+\hat{j}'_{u,y}\cdot(\hat{i}\cdot\hat{j}')+\hat{j}'_{u,z}\cdot(\hat{i}\cdot\hat{k}')$$

$$\hat{t}_{UWy,y}=\hat{j}'_{u,x}\cdot(\hat{j}\cdot\hat{i}')+\hat{j}'_{u,y}\cdot(\hat{j}\cdot\hat{j}')+\hat{j}'_{u,z}\cdot(\hat{j}\cdot\hat{k}')$$

$$\hat{t}_{UWy,z}=\hat{j}'_{u,x}\cdot(\hat{k}\cdot\hat{i}')+\hat{j}'_{u,y}\cdot(\hat{k}\cdot\hat{j}')+\hat{j}'_{u,z}\cdot(\hat{k}\cdot\hat{k}') \quad \text{(Equations 3-16)}$$

$$\hat{t}_{UWz,x}=\hat{k}'_{u,x}\cdot(\hat{i}\cdot\hat{i}')+\hat{j}'_{u,y}\cdot(\hat{i}\cdot\hat{j}')+\hat{j}'_{u,z}\cdot(\hat{i}\cdot\hat{k}')$$

$$\hat{t}_{UWz,y}=\hat{k}'_{u,x}\cdot(\hat{j}\cdot\hat{i}')+\hat{j}'_{u,y}\cdot(\hat{j}\cdot\hat{j}')+\hat{j}'_{u,z}\cdot(\hat{j}\cdot\hat{k}')$$

$$\hat{t}_{UWz,z}=\hat{k}'_{u,x}\cdot(\hat{k}\cdot\hat{i}')+\hat{j}'_{u,y}\cdot(\hat{k}\cdot\hat{j}')+\hat{j}'_{u,z}\cdot(\hat{k}\cdot\hat{k}') \quad \text{(Equations 3-17)}$$

Determine global position vector of the UW coordinate system origin using a transformation of the UW tracking location 1 from local to global coordinates starting from the UW global location 1 (as follows, determining each component separately:

$$\vec{T}_{UW,x}=\vec{T}_{1,x}+\vec{R}'_{UWorigin,x}\cdot(\hat{i}\cdot\hat{t}_{UWx})+\vec{R}'_{UWorigin,y}\cdot(\hat{i}\cdot\hat{t}_{UWy})+\vec{R}'_{UWorgin,z}\cdot(\hat{i}\cdot\hat{t}_{UWz})$$

$$\vec{T}_{UW,y}=\vec{T}_{1,y}+\vec{R}'_{UWorigin,x}\cdot(\hat{j}\cdot\hat{t}_{UWx})+\vec{R}'_{UWorigin,y}\cdot(\hat{j}\cdot\hat{t}_{UWy})+\vec{R}'_{UWorgin,z}\cdot(\hat{j}\cdot\hat{t}_{UWz})$$

$$\vec{T}_{UW,z}=\vec{T}_{1,z}+\vec{R}'_{UWorigin,x}\cdot(\hat{k}\cdot\hat{t}_{UWx})+\vec{R}'_{UWorigin,y}\cdot(\hat{k}\cdot\hat{t}_{UWy})+\vec{R}'_{UWorgin,z}\cdot(\hat{k}\cdot\hat{t}_{UWz}) \quad \text{(Equations 3-18)}$$

IV. 3D Geospatial Abstraction—Static UW Components

A static component within the upperworks (UW) does not move with respect to the UW coordinate system, and thus a relative location of such a static component may be determined with respect to the global coordinate system. For instance, a stack of standard counterweights for a crane would not be moving with respect to the UW coordinate system as the crane is swinging or lifting unless the counterweight is a variable-position counterweight. In this case, a 3D geospatial abstraction for the counterweights can be formed by a 3D line segment or a set of 3D line segments. The 3D line segment(s) can be formed by two endpoints within the global coordinate system. These endpoints may be calculated from the known location of the counterweights within the UW coordinate system. As the UW coordinate system moves in the model, then these static components also automatically move at the same rate.

Figure 17:
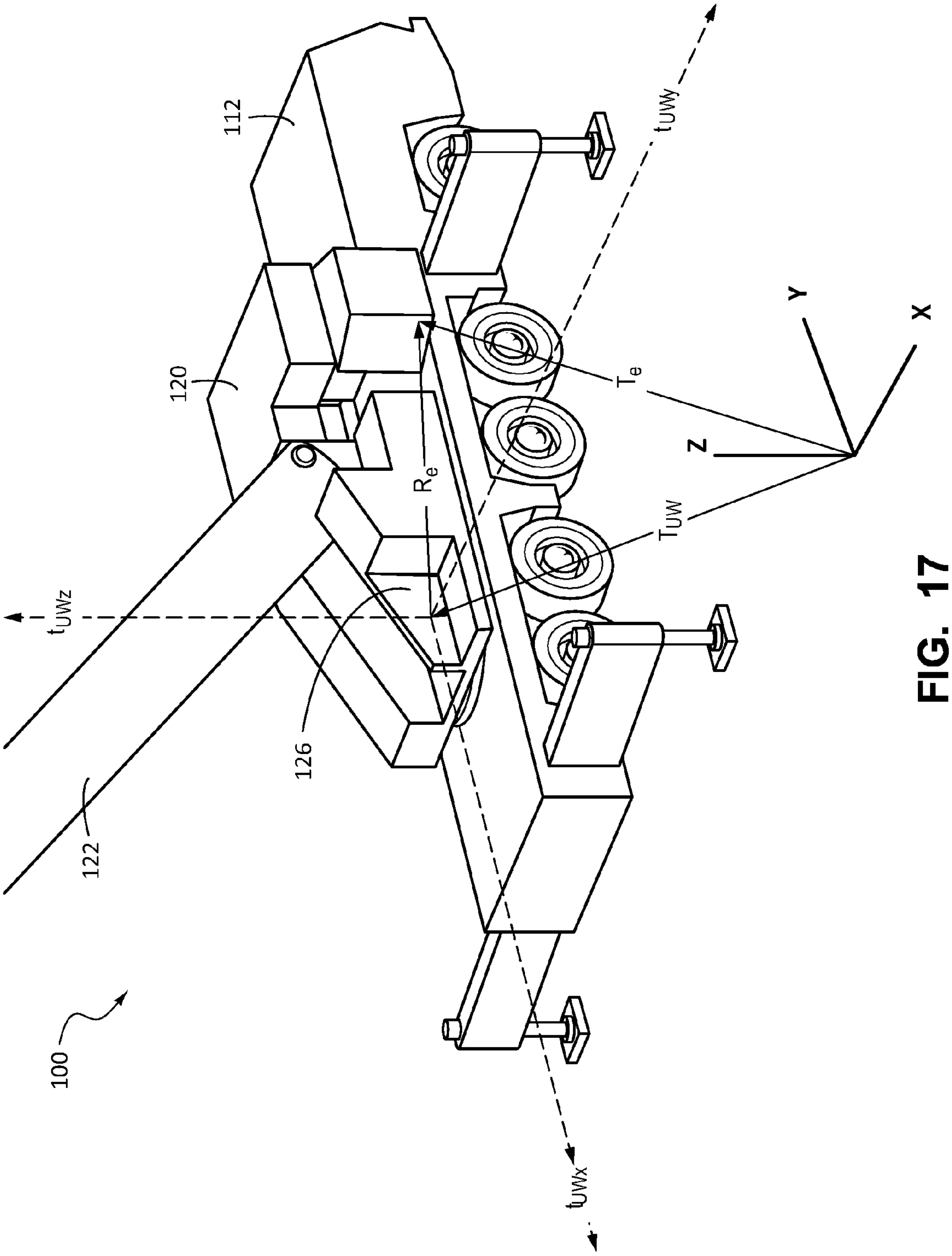
FIG. 17 is a perspective view of the crane of FIGS. 2A and 2B showing global vectors of the upperworks coordinate system based on a local coordinate system with reference to static upperworks components.

The following variables and information are considered known inputs into the system 200 for Section IV with initial reference to FIG. 17 and with reference to earlier Sections for calculation methods:

(1) $\vec{T}_{UW}$—Global vector to UW coordinate system origin.

(2) $\hat{t}_{UWx}$—Unit vector in global coordinate system for x-axis of the UW coordinate system.

(3) $\hat{t}_{UWy}$—Unit vector in global coordinate system for y-axis of the UW coordinate system.

(4) $\hat{t}_{UWz}$—Unit vector in global coordinate system for z-axis of the UW coordinate system.

(5) $x_e$, $y_e$, $z_e$—Local coordinates of an endpoint of the static UW component line segment abstraction, for instance, the location of a position of counterweight on the UW.

The following variable is to be determined as an output by the system 200 with reference to Section IV: $\vec{T}_e$—Global vector to an endpoint (FIG. 17). The system may calculate the global vector to an endpoint as follows.

Determine a local position vector (in UW coordinate system) for the endpoint as follows:

$$\vec{R}_{e,x}=x_e$$

$$\vec{R}_{e,y}=y_e$$

$$\vec{R}_{e,z}=z_e \quad \text{(Equations 4-1)}$$

Determine the corresponding global position vector using a transformation of the endpoint from local to global coordinates as follows, determining each component separately:

$$\vec{T}_{e,x}=\vec{T}_{UW,x}+\vec{R}_{e,x}\cdot(\hat{i}\cdot\hat{t}_{UWx})+\vec{R}_{e,y}\cdot(\hat{i}\cdot\hat{t}_{UWy})+\vec{R}_{e,z}\cdot(\hat{i}\cdot\hat{t}_{UWz})$$

$$\vec{T}_{e,y}=\vec{T}_{UW,y}+\vec{R}_{e,x}\cdot(\hat{j}\cdot\hat{t}_{UWx})+\vec{R}_{e,y}\cdot(\hat{j}\cdot\hat{t}_{UWy})+\vec{R}_{e,z}\cdot(\hat{j}\cdot\hat{t}_{UWz})$$

$$\vec{T}_{e,z}=\vec{T}_{UW,z}+\vec{R}_{e,x}\cdot(\hat{k}\cdot\hat{t}_{UWx})+\vec{R}_{e,y}\cdot(\hat{k}\cdot\hat{t}_{UWy})+\vec{R}_{e,z}\cdot(\hat{k}\cdot\hat{t}_{UWz}) \quad \text{(Equations 4-2)}$$

Figure 19:
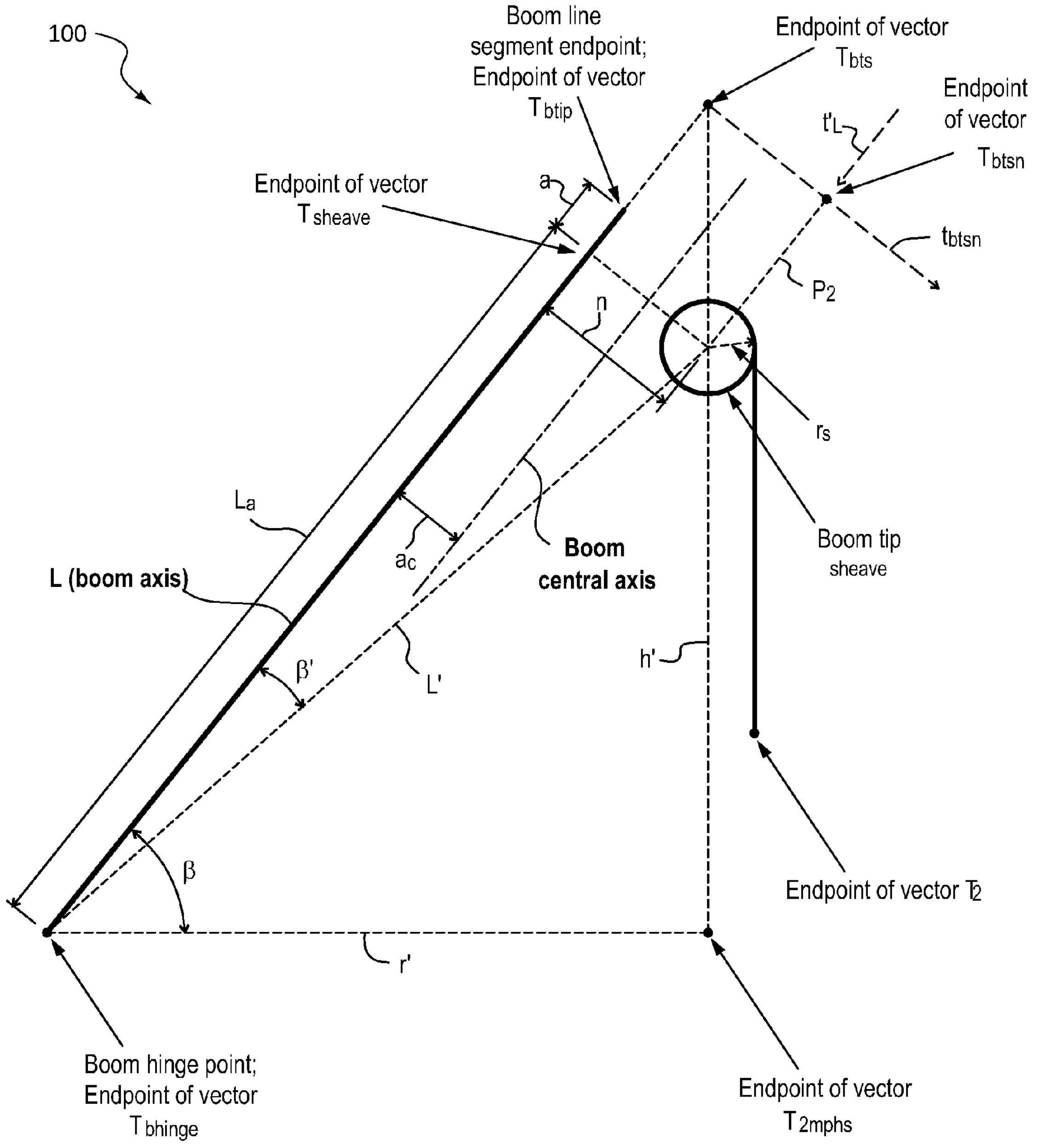
FIG. 19 is a side view of the dimensions and vectors employed in tracking the boom tip in the crane of FIG. 18.

V. 3D Geospatial Abstraction—Moving Boom Tip Endpoint Based on Tracking Crane Hook and a Known Boom Length For dynamic components of the UW, the motion of the 3D geospatial abstraction such as a 3D line segment can be modeled by methods that combine static endpoints within the UW (as in Section IV) and dynamic endpoints within the UW. For instance, a crane boom has a hinge point at the base of the boom (to FIG. 1) that is static within the UW. The boom tip, however, is dynamic within the crane UW. In this section, the boom tip endpoint is determined in the global coordinate system using the absolute location sensor at the crane hook and a known boom length. A boom axis is defined as a line that is parallel to a boom central axis and intersects the boom hinge point. In most cranes with lattice booms, the boom axis will be collinear with the boom central axis. Accordingly, the boom axis is not necessarily the boom central axis in the center of the boom as shown in FIG. 19: in FIG. 2A, it can be seen that the boom hinge point may not be on the boom central axis. The boom hinge point is defined as a mid-point between the extremities of the connection of the boom to the lowerworks, which may be located along a boom hinge axis line.

Figure 18:
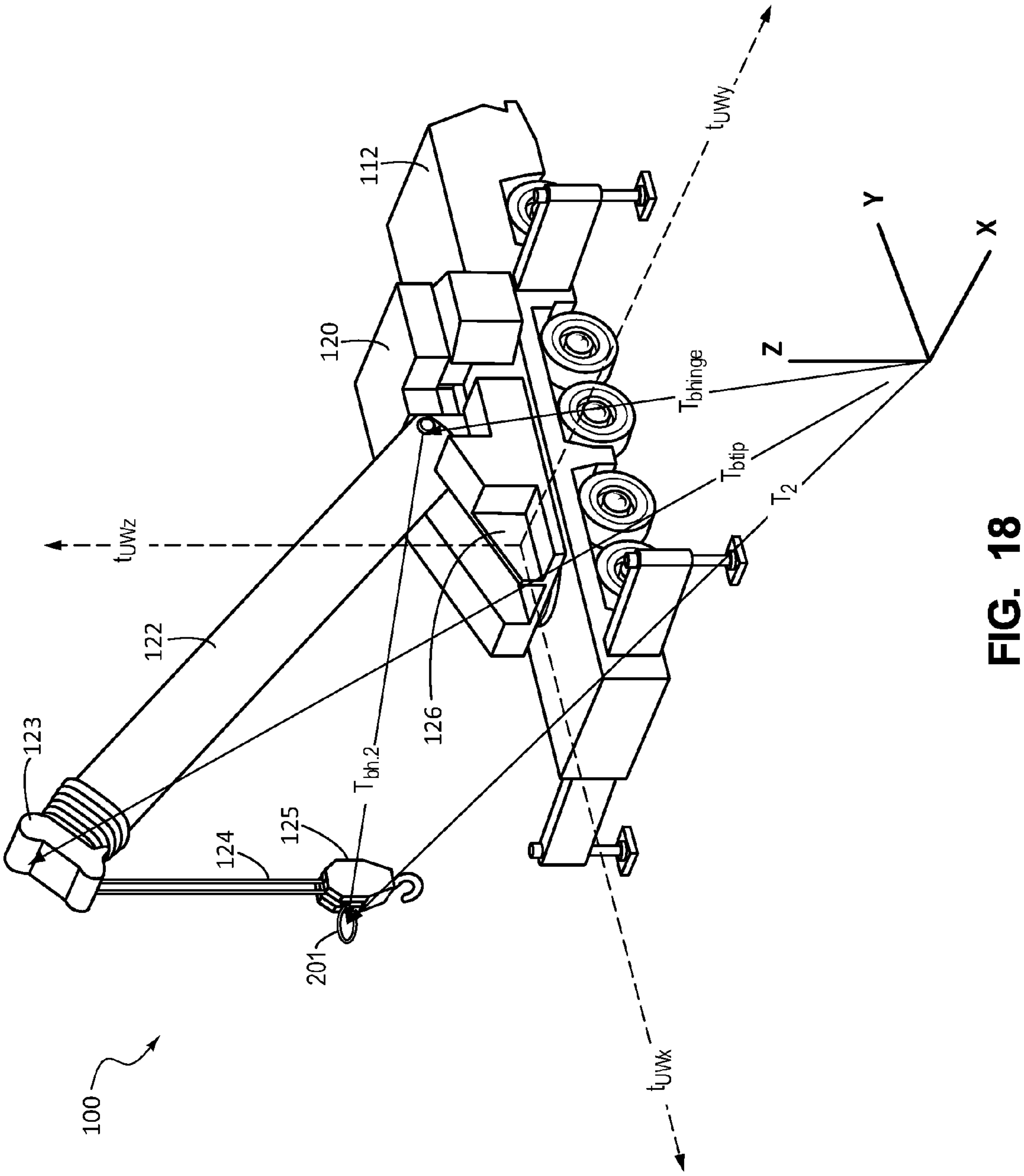
FIG. 18 is a perspective view of the crane of FIGS. 2A and 2B showing global vectors of the upperworks coordinate system based on a local coordinate system and on a positioning sensor on the hook, providing for tracking a moving boom tip based on the location of the hook and a known boom length.

The following variables and information are considered known inputs into the system 200 for Section V with initial reference to FIGS. 18-19.

(1) $\vec{T}_2$—Global vector to absolute tracking location on the crane hook. Refer to FIG. 19 for the endpoint in a 2D view. Refer to FIG. 18 for a 3D view.

(2) $\vec{T}_{bhinge}$—Global vector to boom hinge point. Refer to FIG. 19 for an endpoint in a 2D view. Refer to FIG. 18 for a 3D view.

(3) $r_s$—Sheave radius.

(4) L—Boom length starting from a boom hinge point and parallel to the boom central axis to a point desired to be the boom line segment endpoint. This boom length could be fixed (in the case of a lattice boom), or it could be a dynamic value from a length sensor (in the case of a telescopic boom).

(5) a—An offset from the boom tip sheave rotation axis (intersected with crane mid-plane) to the boom line segment endpoint. It is measured along the boom axis. A positive value is beyond the boom line segment endpoint. The example in FIG. 19 has a negative value for a.

(6) n—An offset from the boom tip sheave rotation axis (intersected with crane mid-plane) to the boom axis. Note that n is measured normal to the boom axis. A positive value is above the boom axis (or pointing in direction of positive boom angle). The example in FIG. 19 has a negative value for n.

(7) $\hat{t}_{UWx}$—Unit vector in global coordinate system for x axis of the UW coordinate system (FIG. 18). Refer to earlier sections for calculation methods.

(8) $\hat{t}_{UWy}$—Unit vector in global coordinate system for y axis of the UW coordinate system (FIG. 18). Refer to earlier sections for calculation methods.

(9) $\hat{t}_{UWz}$—Unit vector in global coordinate system for z axis of the UW coordinate system (FIG. 18). Refer to earlier sections for calculation methods.

The following variables are to be determined as outputs by the system 200 with reference to Section V, as follows:

(1) $\vec{T}_{btip}$—Global vector to boom tip endpoint. The endpoint of this vector corresponds to the boom line segment endpoint shown in FIG. 19 in a 2D view and in FIG. 18 in a 3D view.

(2) β—Boom angle (refer to FIGS. 1-2 and 19). This is not necessary for the geospatial abstraction, but it is often a desirable value from the computation.

The processing steps of Section V apply to any crane type with known boom length including that of a lattice boom, luffing tower crane, telescopic boom with fixed boom length, or a boom length sensor. A boom sheave central axis offset from the main boom axis is assumed to be below the main boom axis (value of n is negative). According to typical crane design, the boom luffing motion is realistically expected to approach the vertical direction, but not attain or exceed it. Furthermore, typical for crane operations, the boom angle is assumed to be non-zero and positive.

Calculations through Equation 5-3 of Section V may be executed by the system 200 offline, without necessarily performing them in real-time. The remainder of the calculations may be executed by the system 200 in real-time.

With initial reference to FIG. 19, the offset from the boom line segment endpoint to the sheave axis point is applied to the boom axis as follows:

$$L_a=L+a \quad \text{(Equation 5-1)}$$

The length from the boom hinge point to the sheave axis point is determined as follows:

$$L'=\sqrt{L_a^2+n^2} \quad \text{(Equation 5-2)}$$

The rotation angle from the boom axis to the direction from the boom hinge point to the sheave axis point is determined as follows:

$$\beta' = \cos^{-1}\left(\frac{L_a}{L'}\right) \quad \text{(Equation 5-3)}$$

To this point in the method, the previous calculations can be performed once for a given crane configuration and sensor installation. The remainder of the calculations may be executed in real-time using the absolute tracking sensor data.

With reference to FIG. 18, determine a vector from the boom hinge point to the absolute tracking location of the hook as follows:

$$\vec{T}_{bh,2}=\vec{T}_2-\vec{T}_{bhinge} \quad \text{(Equation 5-4)}$$

Determine the component distance from the location of the hook to the crane mid-plane as follows:

$$l_{sw}=\hat{t}_{UWy}\cdot\vec{T}_{bh,2} \quad \text{(Equation 5-5)}$$

Figure 20:
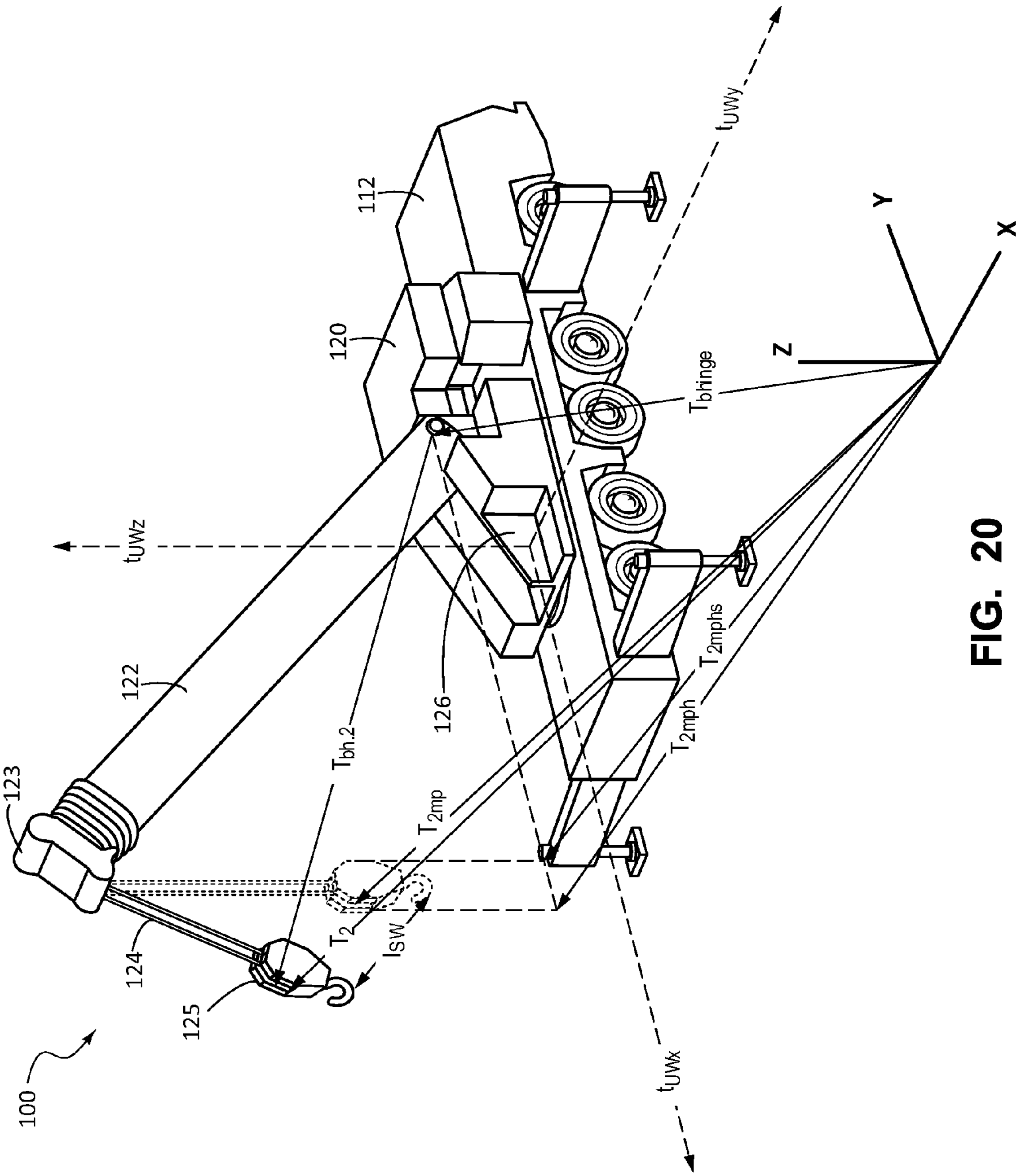
FIG. 20 is a perspective view of the crane of FIGS. 18-19 showing additional global vectors created to track the position of the hook when the hook sways.

Note that this distance will be zero if the UW coordinate system was determined with the method in Section I. FIG. 20 shows a case where the $l_{sw}$ distance is not zero due to hook sway.

With continued reference to FIG. 20, determine global position vector for the hook location projected to the crane mid-plane as follows:

$$\vec{T}_{2mp}=\vec{T}_2+l_{sw}\cdot\hat{t}_{UWy} \quad \text{(Equation 5-6)}$$

Determine global position vector for the hook location projected to the crane mid-plane, but in a horizontal plane at the elevation of the boom hinge point, as follows:

$$\vec{T}_{2mph,x}=\vec{T}_{2mp,x}$$

$$\vec{T}_{2mph,y}=\vec{T}_{2mp,y}$$

$$\vec{T}_{2mph,z}=\vec{T}_{2mp,z} \quad \text{(Equations 5-7)}$$

Determine a global position vector corresponding to $\vec{T}_{2mph}$, but at a point below the boom tip sheave axis. $\vec{T}_{2mph}$ is at the location based on the absolute tracking location which is not expected to be located with the hoist line hanging from the radial edge of a sheave since the sensor will not be coincident with the hoist line. Refer to FIG. 19 for a 3D view and also refer to "Endpoint of vector $T_{2mphs}$" in FIG. 19:

$$\vec{T}_{2mphs}=\vec{T}_{2mph}-r_s\cdot\hat{t}_{UWx} \quad \text{(Equation 5-8)}$$

Figure 21:
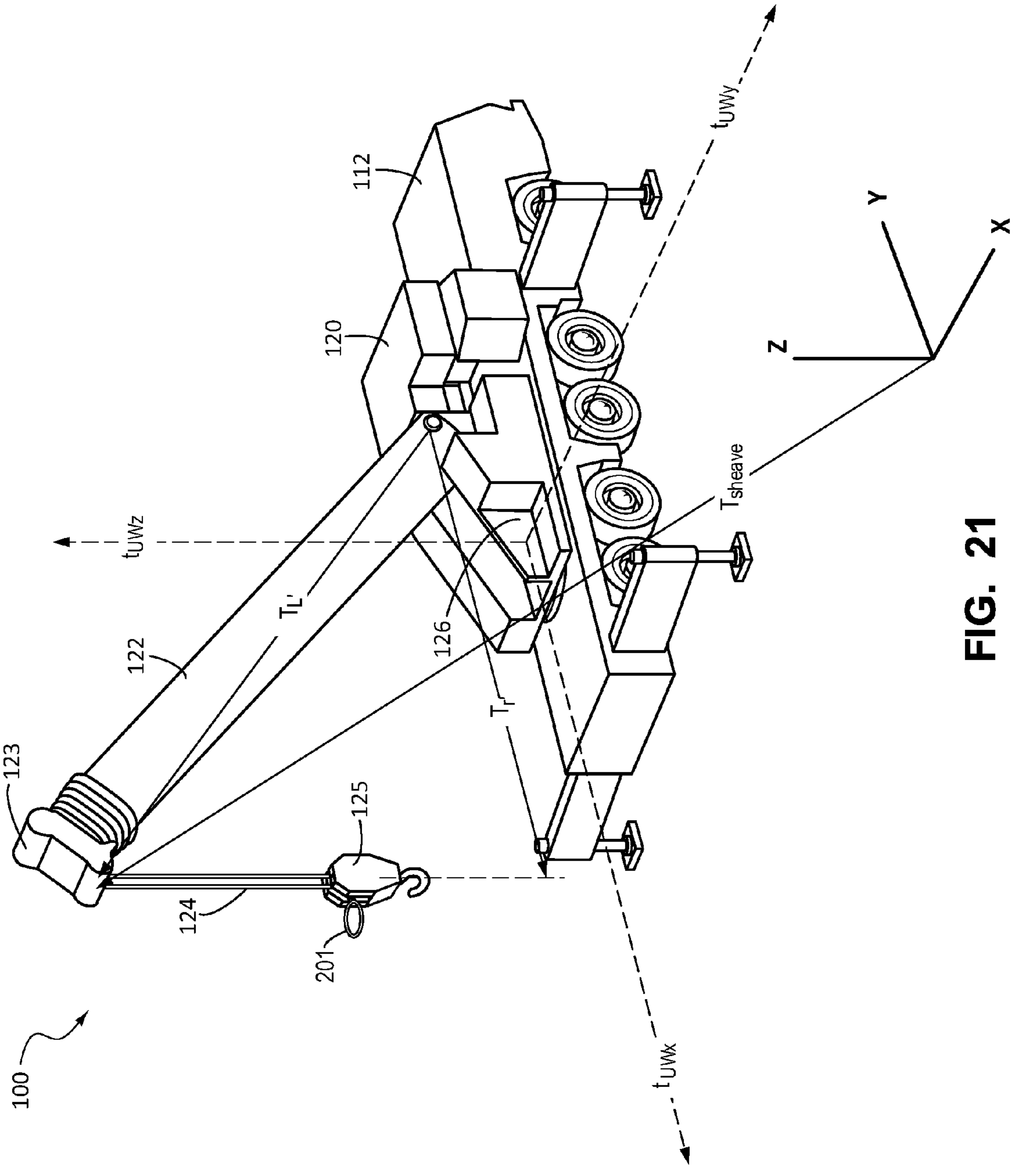
FIG. 21 is the perspective view of the crane of FIGS. 18-19 showing a vector determined between a boom hinge point and an endpoint of the crane mid-plane at the hook.

Determine a vector from the boom hinge point to the $\vec{T}_{2mphs}$ endpoint location as follows, referring to FIG. 21 for a 3D view:

$$\vec{T}_{r'}=\vec{T}_{2mphs}-\vec{T}_{bhinge} \quad \text{(Equation 5-9)}$$

This vector, $\vec{T}_{2mphs}$, also corresponds to the r' shown in FIG. 19. Calculate r' as follows:

$$r'=|\vec{T}_{r'}| \quad \text{(Equation 5-10)}$$

Calculate the height of the sheave axis with respect to the boom hinge point (h' shown in FIG. 19) as follows:

$$h'=\sqrt{L'^2-r'^2} \quad \text{(Equation 5-11)}$$

Note that in some operational cases such as when the boom angle is near zero and the hook is swaying longitudinally, r' might become greater than L'. In this case, the boom can just be assumed to be in a horizontal configuration, e.g., the boom angle is set to zero.

Determine global position vector corresponding to the boom tip sheave axis as follows (FIG. 21):

$$\vec{T}_{sheave}=\vec{T}_{2mphs}+h'\cdot\hat{k} \quad \text{(Equation 5-12)}$$

Determine a vector (corresponding to L' shown in FIG. 19) from the boom hinge point to the boom tip sheave axis point, as well as a unit vector for this direction, as follows (FIG. 20):

$$\vec{T}_{L'}=\vec{T}_{sheave}-\vec{T}_{bhinge} \quad \text{(Equation 5-13)}$$

$$\hat{t}_{L'}=\frac{\vec{T}_{L'}}{|\vec{T}_{L'}|}$$

Determine unit vector $\hat{t}_L$ corresponding to the L direction shown in FIG. 19 for the boom line segment by rotating $\hat{t}_{L'}$ about $\hat{t}_{UWy}$ by angle $-\beta'$.

Determine a global position vector for the boom tip endpoint as follows (FIG. 18):

$$\vec{T}_{btip}=\vec{T}_{bhinge}+L\cdot\hat{t}_L \quad \text{(Equation 5-14)}$$

The boom angle can be calculated as follows:

$$\beta=\cos^{-1}(\hat{t}_{UWx}\cdot\hat{t}_L) \quad \text{(Equation 5-15)}$$

VI. 3D Geospatial Abstraction—Moving Boom Tip Endpoint Based on Tracking Crane Hook and a Known Boom Angle In this section, the boom tip endpoint is determined in the global coordinate system using the absolute location sensor at the crane hook and a known boom angle such as would be acquired from a boom slope sensor.

The following variables and information are considered known inputs into the system 200 for Section VI with initial reference to FIGS. 18-19.

(1) $\vec{T}_2$—Global vector to absolute tracking location on the crane hook. Refer to FIG. 7 for the endpoint. Refer to FIG. 18 for a 3D view.

(2) $\vec{T}_{bhinge}$—Global vector to boom hinge point. Refer to FIG. 19 for endpoint. Refer to FIG. 18 for 3D view.

(3) $r_s$—Sheave radius.

(4) β—Boom angle (FIGS. 2A and 19).

(5) a—An offset from the boom tip sheave rotation axis (intersected with crane mid-plane) to the boom line segment endpoint (FIG. 19). It is measured along the boom axis. A positive value is beyond the boom line segment endpoint. The example in FIG. 19 indicates a negative value for a.

(6) n—An offset from the boom tip sheave rotation axis (intersected with crane mid-plane) to the boom axis. Note that n is measured normal to the boom axis. A positive value is above the boom axis (or pointing in a direction of positive boom angle). The example in FIG. 19 indicates a negative value for n. Note that the boom axis includes the hinge point and the boom axis is not necessarily the boom central axis in the center of the boom as seen in FIG. 19. In FIG. 2A, it can also be seen that the boom hinge point may not be on the boom central axis.

Figure 22:
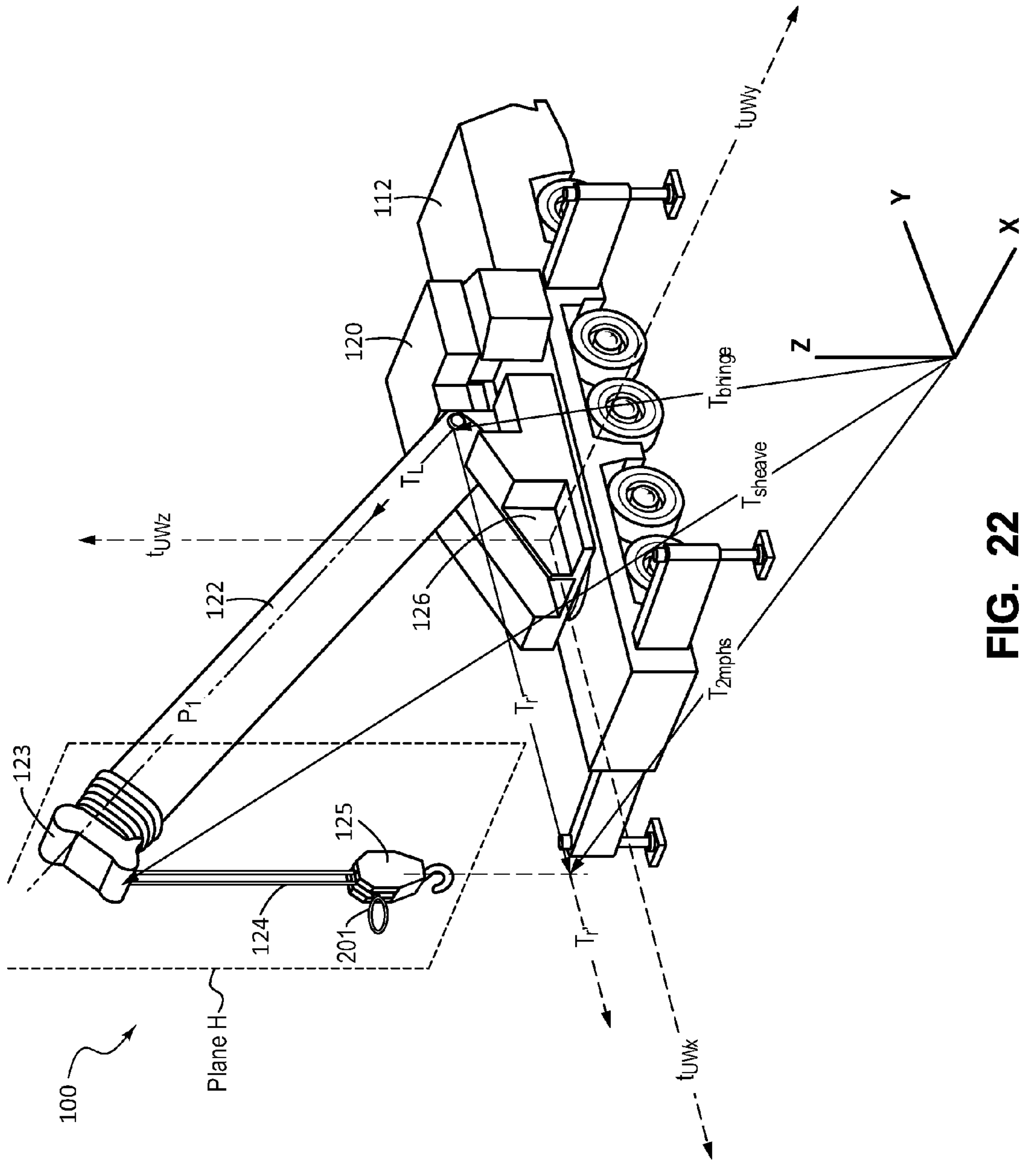
FIG. 22 is a perspective view of the crane of FIGS. 2A, 2B, and 8 showing global vectors of the upperworks coordinate system based on a local coordinate system and on positioning sensors on the hook and the hinge point of the boom, providing for tracking a moving boom tip based on the location of the hook and a known boom angle.

(7) $\hat{t}_{UWx}$—Unit vector in global coordinate system for x-axis of the UW coordinate system (FIG. 22).

(8) $\hat{t}_{UWy}$—Unit vector in global coordinate system for y-axis of the UW coordinate system (FIG. 22).

(9) $\hat{t}_{UWz}$—Unit vector in global coordinate system for z-axis of the UW coordinate system (FIG. 22). Refer to earlier sections for calculation methods for determining $\hat{t}_{UWx}$, $\hat{t}_{UWy}$ and $\hat{t}_{UWz}$.

The following variables are to be determined as outputs by the system 200 with reference to Section VI, as follows:

(1) $\vec{T}_{btip}$—Global vector to boom tip endpoint. The endpoint of this vector corresponds to the boom line segment endpoint shown in FIG. 19. Shown in FIG. 18 in 3D view.

(2) L—Boom length. This is not necessary for the geospatial abstraction, but it is often a desirable value from the computation.

The processing steps of Section VI apply to any crane type with a known boom angle including those having a lattice boom, luffing tower crane, and a telescopic boom with a boom angle sensor. However, it is most likely only to be applied to a crane having a telescopic boom. The boom sheave central axis being offset from main boom axis is assumed to be below the main boom axis, e.g., the value of n is always negative. According to typical crane design, the boom luffing motion is realistically expected to approach the vertical direction, but not attain or exceed it. Furthermore, typical for crane operations, the boom angle is assumed to be non-zero and positive.

The system 200 may determine the unknown variables by first applying the calculation procedure in Section V for Equations 5-1 through 5-9. The system 200 may also execute the following processing steps.

With reference to FIGS. 19 and 22, determine a unit vector for the direction from the boom hinge point to the boom tip sheave central axis point in the horizontal plane (at the elevation of the boom hinge point) which corresponds to r' shown in FIG. 19 as follows:

$$\hat{t}_{r'} = \frac{\vec{T}_{r'}}{|\vec{T}_{r'}|} \quad \text{(Equation 6-1)}$$

Determine the following unit vector (corresponding to L direction shown in FIG. 19) for the boom axis line by rotating $\hat{t}_{r'}$ about $\hat{t}_{UWy}$ by angle $-\beta$:

$$\hat{t}_L \quad \text{(Equation 6-2)}$$

Define a plane H shown in FIG. 22 in the global coordinate system (intersecting the crane mid-plane where h' is shown in FIG. 19) by the following:

Plane normal vector: $\hat{t}_{r'}$

Point on plane: $\vec{T}_{2mphs}$ (from Equation 5-8)

Define a line $P_1$ shown in FIG. 22 in the global coordinate system which includes the boom axis line by the following:

Unit vector: $\hat{t}_L$

Point on line: $\vec{T}_{bhinge}$

The following point, as a position vector in the global coordinate system, is determined by intersecting line $P_1$ with plane H (referring to "Endpoint of vector $T_{bts}$" in FIG. 19) as follows: $\vec{T}_{bts}$.

Determine a unit vector normal to the boom axis (such as along the direction of $n_1$ in FIG. 19) as follows:

$$\hat{t}_{btsn} = \hat{t}_{UWy} \times \hat{t}_L \quad \text{(Equation 6-3)}$$

Determine a global position vector to a point along the unit vector of Equation 6-3 at the distance of the offset of the sheave axis, n, as follows (referring to "Endpoint of vector $T_{btsn}$" in FIG. 19):

$$\vec{T}_{btsn} = \vec{T}_{bts} + n \cdot \hat{t}_{btsn} \quad \text{(Equation 6-4)}$$

Determine a unit vector along the boom axis, but in the opposite direction as follows:

$$\hat{t}'_L = -1 \cdot \hat{t}_L \quad \text{(Equation 6-5)}$$

Define a line $P_2$ in the global coordinate system by the following (referring to FIG. 19 for a 2D view):

Unit vector: $\hat{t}'_L$

Point on line: $\vec{T}_{btsn}$

Determine $\vec{T}_{sheave}$ as a position vector in the global coordinate system for the location of the boom tip sheave axis by intersecting line $P_2$ with plane H (FIG. 22). Determine a global position vector for the projection of the sheave axis to the boom axis as follows:

$$\vec{T}_{sheave'} = \vec{T}_{sheave} + n \cdot \hat{t}_{btsn} \quad \text{(Equation 6-6)}$$

Remember that n was indicated earlier as always negative for typical crane design; and, refer to FIG. 19 for the endpoint.

Determine a global position vector for the boom tip endpoint as follows (referring to FIG. 19 for the end point and to FIG. 18 for a 3D view):

$$\vec{T}_{btip} = \vec{T}_{sheave'} - a \cdot \hat{t}_L \quad \text{(Equation 6-7)}$$

Determine a vector from the boom hinge point to the boom tip point (along the boom axis), which corresponds to distance L of FIG. 19 as follows:

$$\vec{T}_L = \vec{T}_{btip} - \vec{T}_{bhinge} \quad \text{(Equation 6-8)}$$

Determine the boom length as follows (refer to FIG. 7):

$$L = |\vec{T}L| \quad \text{(Equation 6-9)}$$

VII. 3D Geospatial Abstraction—Boom Central Axis

The geospatial abstraction for the boom line segment is expected to be in the middle of the boom, or located at the boom central axis. In earlier sections, a 3D line segment has been determined by endpoints that are along a boom axis that includes the boom hinge point. For some typical crane designs, there is an offset between this boom axis and the boom central axis. Section VII presents the calculation procedure for determining the boom central axis.

Figure 23:
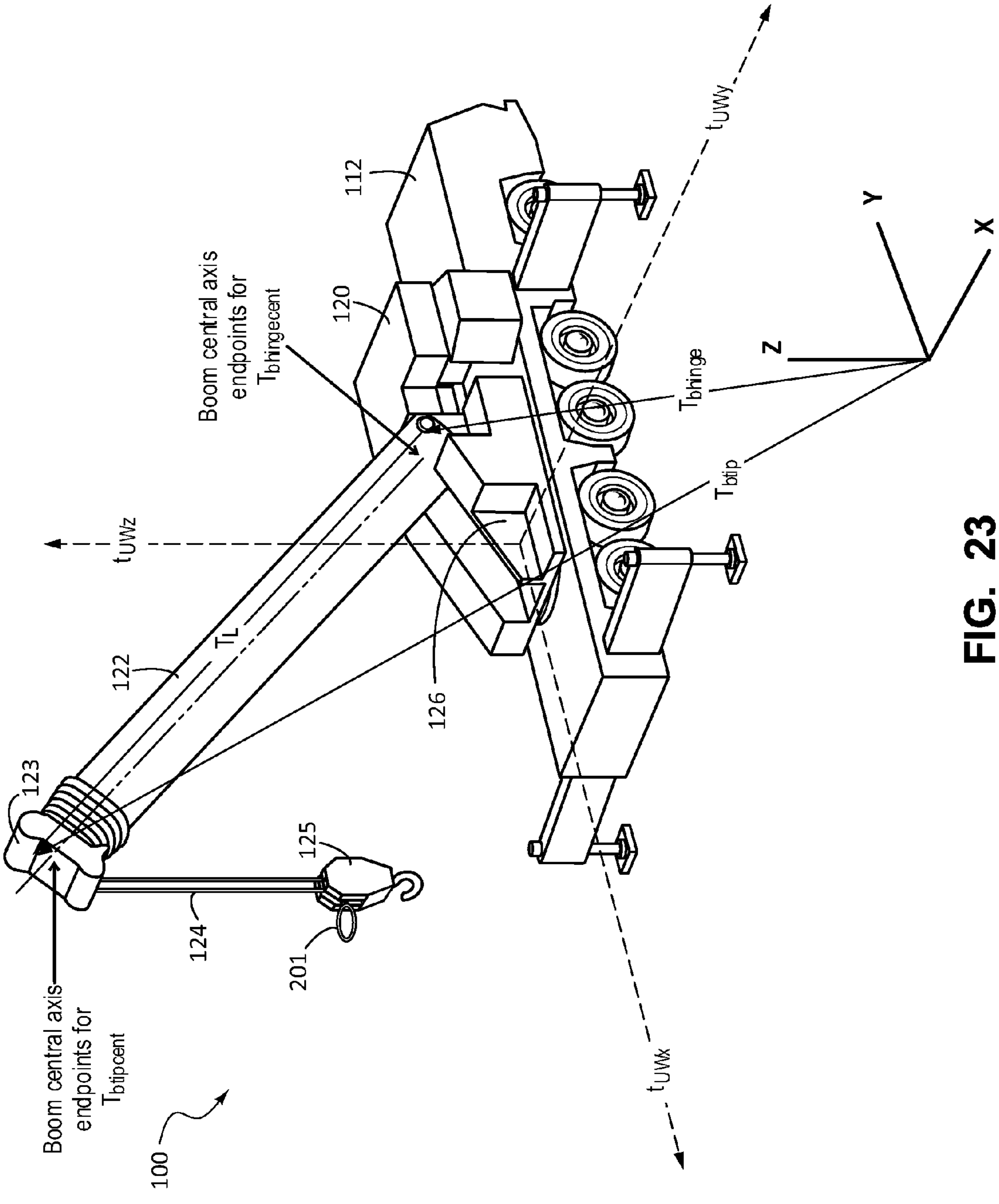
FIG. 23 is a perspective view of the crane of FIGS. 2A and 2B (including a 3D view of dimensions and vectors shown in FIG. 19) showing global position vectors of the upperworks coordinate system and variables for explaining the calculation of an offset between a boom axis and a central axis of the boom.

The following variables and information are considered known inputs into the system 200 for Section VII with initial reference to FIGS. 19 and 23.

(1) $\vec{T}_{bhinge}$—Global vector to boom hinge point. Refer to FIG. 19 for the endpoint and to FIG. 23 for a 3D view.

(2) $\vec{T}_{btip}$—Global vector to boom tip point. Refer to FIG. 19 for the endpoint and to FIG. 23 for a 3D view.

(3) $a_c$—Offset from the boom central axis to the boom hinge point. A positive value is used when the hinge point is above the boom central axis (in the crane mid-plane) when the boom is horizontal. This value in FIG. 19 is positive.

(4) $\hat{t}_{UWx}$—Unit vector in global coordinate system for x-axis of the UW coordinate system.

(5) $\hat{t}_{UWy}$—Unit vector in global coordinate system for y-axis of the UW coordinate system.

(6) $\hat{t}_{UWz}$—Unit vector in global coordinate system for z-axis of the UW coordinate system. Refer to earlier sections for calculation methods for determining $\hat{t}_{UWx}$, $\hat{t}_{UWy}$ and $\hat{t}_{UWz}$.

The following variables are to be determined as outputs by the system 200 with reference to Section VII, as follows:

(1) $\vec{T}_{bhingecent}$—Global vector to boom hinge central axis endpoint.

(2) $\vec{T}_{btipcent}$—Global vector to boom tip central axis endpoint.

The processing steps in Section VII apply to any crane type and may be executed by the system 200 according to the following.

With continued reference to FIG. 23, determine a vector from the boom hinge point to the boom tip as follows:

$$\vec{T}_L = \vec{T}_{btip} - \vec{T}_{bhinge} \quad \text{(Equation 7-1)}$$

Determine a unit vector for this direction as follows:

$$\hat{t}_L = \frac{\vec{T}_L}{|\vec{T}_L|} \quad \text{(Equation 7-2)}$$

Determine a unit vector normal to the boom axis as follows (noting that this direction corresponds to distance n in FIG. 19):

$$\hat{t}_n = \hat{t}_{UWy} \times \hat{t}_L \quad \text{(Equation 7-3)}$$

Determine a global position vector for the boom geospatial abstraction line segment endpoint for the boom central axis near boom hinge point as follows:

$$\vec{T}_{bhingecent} = \vec{T}_{bhinge} + a_c \cdot \hat{t}_n \quad \text{(Equation 7-4)}$$

Determine a global position vector for the boom geospatial abstraction line segment endpoint for the boom central axis near boom tip as follows:

$$\vec{T}_{btipcent} = \vec{T}_{btip} + a_c \cdot \hat{t}_n \quad \text{(Equation 7-5)}$$

VIII. 3D Geospatial Abstraction—Tower Crane Trolley Location

Figure 24:
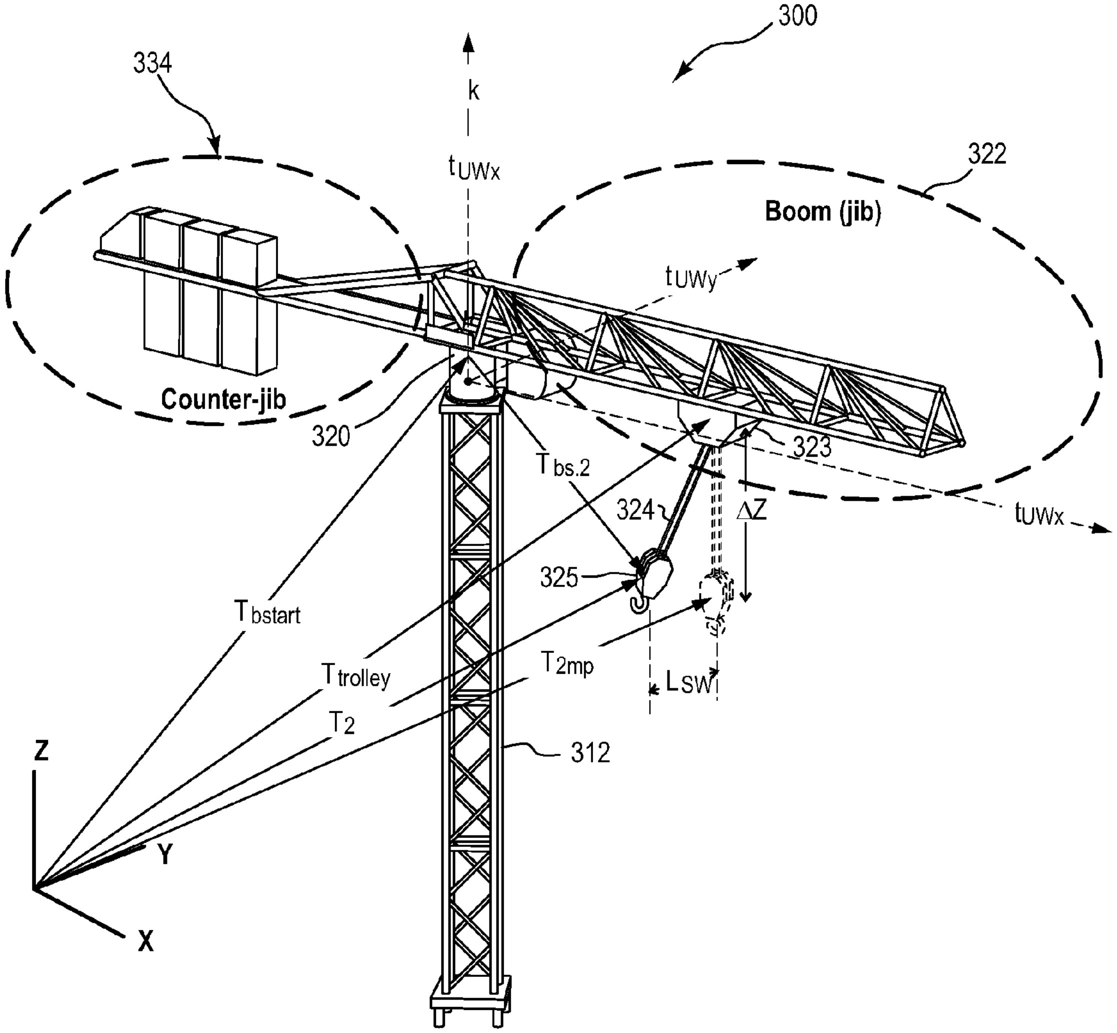
FIG. 24 is a perspective view of a tower crane showing positioning sensor tracking points (one on the upperworks and one on the crane hook) from which is determined a 3D upperworks coordinate system origin in global coordinates from local coordinates of the upperworks for determining a location of the trolley.

With reference to FIG. 24, as previously describe, a tower crane 300 may include similar components to that of the mobile crane 10 and the mobile telescopic boom crane 100, but with some differences as well.

The geospatial abstraction for the hoist line on the tower crane 300 with a trolley does not terminate at the boom tip since the hoist line does not attach to the boom tip. Additionally, the boom 322 and the counter-jib 334 are static upperworks (UW) components; the calculations in Section IV are used for boom modeling. However, the 3D line segment for the hoist line 324 would terminate at the trolley location. Section VIII presents the calculation procedure for determining the location of the trolley 323.

The following variables and information are considered known inputs into the system 200 for Section VIII with reference to FIG. 24.

(1) $\vec{T}_2$—Global vector to absolute tracking location on the crane hook.

(2) $\vec{T}_{bstart}$—Global vector to boom starting point (not hinge point).

(3) $\hat{t}_{UWx}$—Unit vector in global coordinate system for x-axis of the UW coordinate system.

(4) $\hat{t}_{UWy}$—Unit vector in global coordinate system for y-axis of the UW coordinate system.

(5) $\hat{t}_{UWz}$—Unit vector in global coordinate system for z-axis of the UW coordinate system. Refer to earlier sections for calculation methods for determining $\hat{t}_{UWx}$, $\hat{t}_{UWy}$ and $\hat{t}_{UWz}$.

The system 200 may determine the variable $\vec{T}_{trolley}$, a global vector to the trolley location, with reference to Section VIII as follows. Determine a vector from the boom start point to the absolute tracking location of the hook as follows:

$$\vec{T}_{bs.2}=\vec{T}_2-\vec{T}_{bstart} \quad \text{(Equation 8-1)}$$

Determine the component distance from the location of the hook to the crane mid-plane as follows:

$$l_{sw}=\hat{t}_{UWy}\cdot\vec{T}_{bs.2} \quad \text{(Equation 8-2)}$$

Note that this will be zero if the UW coordinate system was determined with the method in Section I.

Determine a global position vector for the hook tracking location projected to the crane mid-plane as follows:

$$\vec{T}_{2mp}=\vec{T}_2+l_{sw}\cdot\hat{t}_{UWy} \quad \text{(Equation 8-3)}$$

Determine the difference in elevation between the hook tracking location and the boom start point, which should be positive since the hook is dangling below the boom, as follows:

$$\Delta Z=\vec{T}_{bstart,z}-\vec{T}_{2mp,z} \quad \text{(Equation 8-4)}$$

Determine global position vector for the trolley location as follows:

$$\vec{T}_{trolley}=\vec{T}_{2mp}+\Delta Z\cdot\hat{k} \quad \text{(Equation 8-5)}$$

Figure 25:
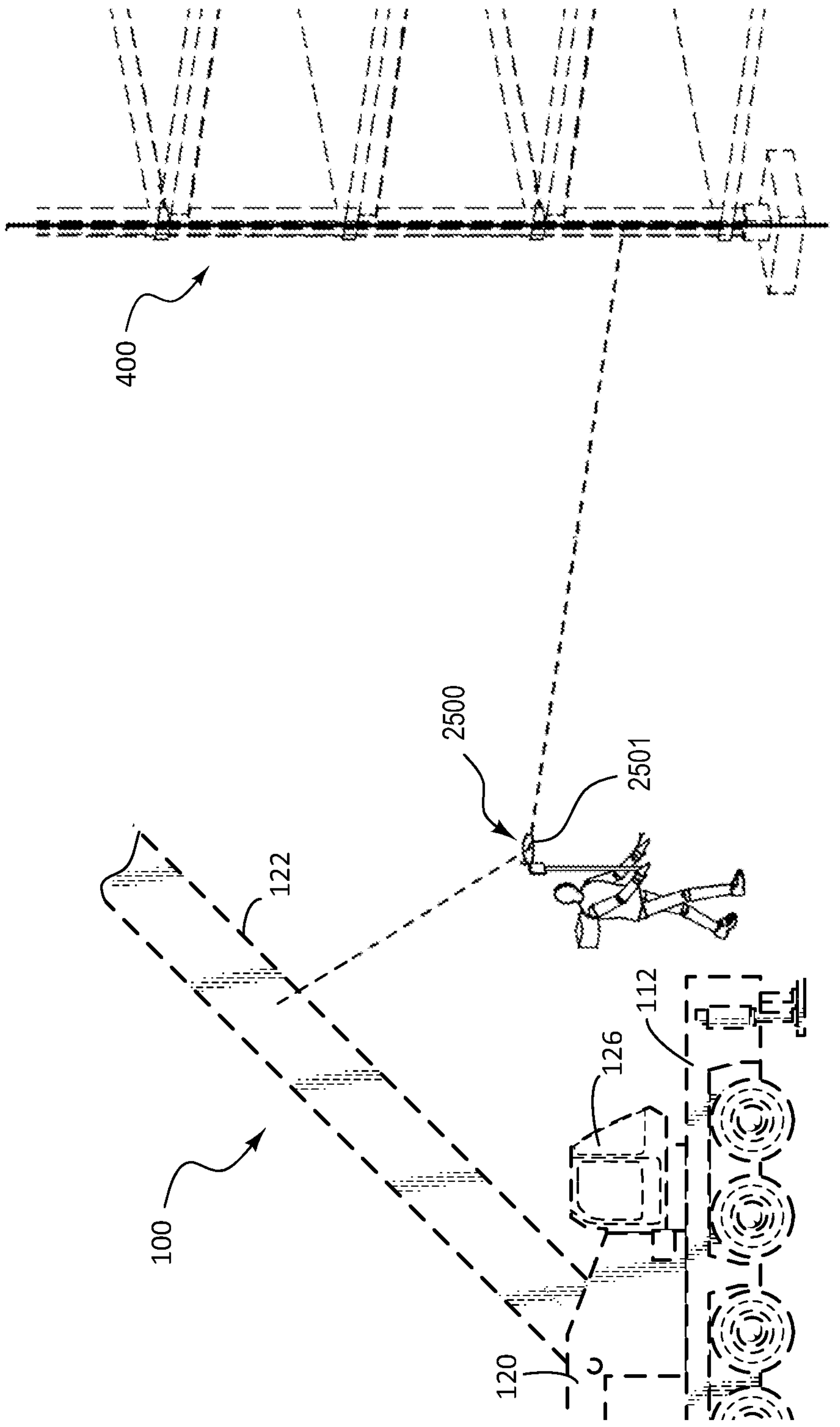
FIG. 25 is a perspective view of a jobsite in which the methods of present disclosure are executed to validate determined absolute positions with relation to known positions of components of construction equipment and other obstacles on the jobsite.

Another practical aspect of applying the jobsite modeling and tracking system 200 is to provide for dynamic model validation. As equipment can be rapidly deployed with the system 200 for modeling a jobsite as disclosed herein, it is helpful to also rapidly determine if the equipment—sensors, computing devices, and storage—is functioning properly. With reference to FIG. 25, once the jobsite model has been configured and the line segments for equipment and static objects such as buildings are known, a means of validating the model is envisioned. One method for validation is to have a portable validation device or system 2500 which includes a positioning sensor 2501 (which may be a global positioning system sensor) that validates the absolute position sensor system 200 that is already used on the crane hook and upperworks as well as other jobsite objects. The wireless network 202, and thus a computing device of the system 200, may recognize this portable sensor as a single point, and not as part of a jobsite object which would be expected to have line segments for their definition. The validation device 200 may be walked (or otherwise moved) around the jobsite and into the proximity of construction equipment and other objects desiring verification of location.

With the portable device position sensor 2501 recognized as a special point, the distance of this point from nearby line segments derived from actual jobsite elements such as cranes and buildings may be reported to the person operating the portable device (or some other personnel with access to the network 202). And, this distance may then be compared to actual measurements to validate the jobsite mathematical models.

Although the disclosed modeling approach considers the 3D space of the jobsite, a 2D system as seen in a plan view from above may simply be considered a subset of the disclosed modeling approach as executed by the system 200. In other words, the system 200 may project the upperworks 3D coordinate system to a 2D coordinate system and to track the exclusion zone with reference to the other tracked objects in the 2D coordinate system by removing the z-axis component of the 3D line segments corresponding thereto. The system 200 may also execute a combination of 2D and 3D modeling and tracking as disclosed herein and apparent to those skilled in the art.

More specifically, as shown in FIG. 2B, among other places, there is a coordinate system for the crane and jobsite that uses the X and Y axis as the ground or horizontal (X-Y) plane, with the Z-axis in the direction of gravity. As discussed, the system 200 may create 3D line segments within the jobsite space that represent various objects on a jobsite (FIG. 4B). However, if the Z components of the vectors that define the endpoints of the 3D line segments are set to zero, then a 2D simplification of the overall jobsite status may be created. The line segments then become 2D, and lie in the X-Y plane of the jobsite. With this 2D jobsite simplification, exclusion zones can be created that are actually areas (instead of volumes). Distances can be computed between the 2D line segments, and between the 2D line segments and exclusion zones.

The 2D jobsite simplification may be a desirable view of the jobsite for the equipment operators. In this case, it is only the graphical display that is showing the 2D view, but distances between objects are still actually values based on 3D line segments. The 2D jobsite simplification may also be used for the graphical display as well as the computation of distances between objects. Computing the distances with the 2D simplification may be desirable for faster computations of these distances as 2D computations are simpler and 3D computations, and thus the system 200 may analyze locations and mutual distances of objects on the jobsite more quickly.

In addition, 2D modeling simplifications could also be used to remove at least some of the computations that were described in the above sections and embodiments. For example, the computations shown in Section V relating to FIGS. 18-19 would be simplified if the tip of the boom in the Z direction were disregarded. To do so, the system 200 could disregard the Z-axis value from the absolute position sensor data from the sensor on the hook. The 2D line segment for the boom central axis could then simply start at the boom pivot point and end at the position of the absolute position sensor on the hook. This would negate the need for the boom slope or boom length sensors (as was previously discussed). This simplification could be desirable to facilitate faster computations, or to remove the need and expense from additional sensors. Naturally, this also would remove the ability to sense the proximity of the booms in the Z dimension (or the full 3-D model), and so employment of this simplified 2D model would have to be judiciously chosen after full consideration of safety factors.

Figure 26:
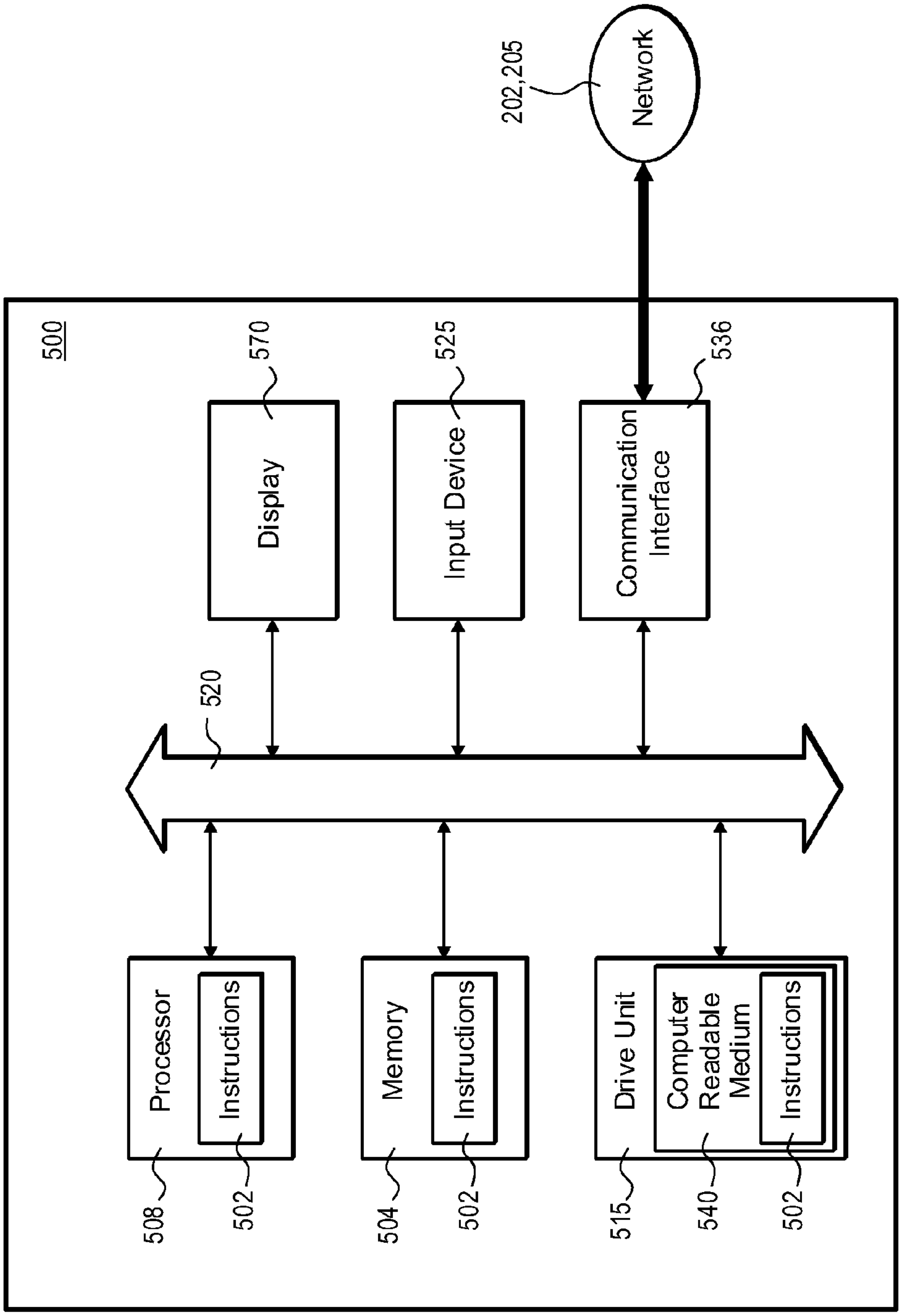
FIG. 26 illustrates a general computer system, which may represent any of the computing devices referenced herein or that may be executed by the system or systems of the present disclosure.

FIG. 26 illustrates a general computer system 500, which may represent the cab computing device 206, the wireless network computer 209, the office computer 213, or the mobile devices 215, or any other computing devices referenced herein or that may be executed by the system 100, such as, for instance, the positioning sensors 201, whether fixed or mobile. The computer system 500 may include an ordered listing of a set of instructions 502 that may be executed to cause the computer system 500 to perform any one or more of the methods or computer-based functions disclosed herein. For example, computer system 500 may be utilized to perform any of the methods described in the flow diagrams of FIGS. 27-30. The computer system 500 may operate as a stand-alone device or may be connected, e.g., using the network 202 and 205, to other computer systems or peripheral devices.

In a networked deployment, the computer system 500 may operate in the capacity of a server or as a client-user computer in a server-client user network environment, or as a peer computer system in a peer-to-peer (or distributed) network environment. The computer system 500 may also be implemented as or incorporated into various devices, such as a personal computer or a mobile computing device capable of executing a set of instructions 502 that specify actions to be taken by that machine, including and not limited to, accessing the Internet or Web through any form of browser. Further, each of the systems described may include any collection of sub-systems that individually or jointly execute a set, or multiple sets, of instructions to perform one or more computer functions.

The computer system 500 may include a memory 504 on a bus 520 for communicating information. Code operable to cause the computer system to perform any of the acts or operations described herein may be stored in the memory 504. The memory 504 may be a random-access memory, read-only memory, programmable memory, hard disk drive or any other type of volatile or non-volatile memory or storage device.

The computer system 500 may include a processor 508, such as a central processing unit (CPU) and/or a graphics processing unit (GPU). The processor 508 may include one or more general processors, digital signal processors, application specific integrated circuits, field programmable gate arrays, digital circuits, optical circuits, analog circuits, combinations thereof, or other now known or later-developed devices for analyzing and processing data. The processor 508 may implement the set of instructions 502 or other software program, such as manually-programmed or computer-generated code for implementing logical functions. The logical function or any system element described may, among other functions, process and/or convert an analog data source such as an analog electrical, audio, or video signal, or a combination thereof, to a digital data source for audio-visual purposes or other digital processing purposes such as for compatibility of computer processing.

The computer system 500 may also include a disk or optical drive unit 515. The disk drive unit 515 may include a computer-readable medium 540 in which one or more sets of instructions 502, e.g., software, can be embedded. Further, the instructions 502 may perform one or more of the operations as described herein. The instructions 502 may reside completely, or at least partially, within the memory 504 and/or within the processor 508 during execution by the computer system 500. Accordingly, the databases described above with reference to FIG. 6 may be stored in the memory 504 and/or the disk unit 515.

The memory 504 and the processor 508 also may include computer-readable media as discussed above. A "computer-readable medium," "computer-readable storage medium," "machine readable medium," or "non-transitory computer-readable storage medium" may include any device that includes, stores, communicates, propagates, or transports instructions for use by or in connection with an instruction executable system, apparatus, or device. The computer-readable storage medium may selectively be, but is not limited to, an electronic, magnetic, optical, electromagnetic, or semiconductor system, apparatus, or device.

Additionally, the computer system 500 may include an input device 525, such as a keyboard or mouse, configured for a user to interact with any of the components of system 500. It may further include a display 570, such as a liquid crystal display (LCD), a cathode ray tube (CRT), or any other display suitable for conveying information. The display 570 may act as an interface for the user to see the functioning of the processor 508, or specifically as an interface with the software stored in the memory 504 or the drive unit 515.

The computer system 500 may include a communication interface 536 that enables communications via the communications network 202 and 205. The network 202 and 205 may include wired networks, wireless networks, or combinations thereof. The communication interface 536 network may enable communications via any number of communication standards, such as 802.11, 802.17, 802.20, WiMax, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein. Such a programmed computer may be considered a special-purpose computer.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

Example Methods of Crane Maneuvering Assistance

FIGS. 27-30 illustrate flow diagrams 2700, 2800, 2900, and 3000 of some non-limiting example methods of crane maneuvering assistance. With respect to flow diagrams 2700-3000 and the accompanying description, it should be appreciated that, in some embodiments, not all of the procedures illustrated and described may be performed, additional procedures may be performed, and/or one or more procedures may be performed in a different order than depicted and/or described. Procedures described in one or more of flow diagrams 2700-3000 may be implemented as instructions that are disposed as part of a non-transitory computer-readable storage media. Such instructions, when executed, can cause a computing system, such as computing system 500, to perform a method described by the instructions.

FIG. 27 illustrates a flow diagram 2700, of an example method of crane maneuvering assistance.

At 2710 of flow diagram 2700, in one embodiment, a three-dimensional (3D) position of an origin of a 3D upperworks coordinate system for a crane is calculated based on local coordinates of the crane. The origin, in one embodiment, is located along an axis of rotation between an upperworks of the crane and a lowerworks of the crane. The lower works is rotatably coupled with the upperworks.

At 2720 of flow diagram 2700, in one embodiment, the 3D position of the origin is transformed from the local coordinates to global 3D coordinates using absolute position sensing data from a first positioning sensor coupled with the upperworks and a second positioning sensor located on a hook of the crane and global 3D coordinates specific to a jobsite where the crane is located.

At 2730 of flow diagram 2700, in one embodiment, positions of at least one movable component of the crane are computed with respect to a tracked object on the jobsite. In one embodiment, the tracked object is not a portion of the crane, but is instead another object on the jobsite.

Such computation of the positions of at least one movable component as part of 2730 may include calculating a 3D geospatial location of a boom hinge point where the boom is attached to the upperworks. This calculating is based on the 3D coordinate system for the upperworks. The computing may also involve generating a 3D line segment in relation to the upperworks 3D coordinate system that is aligned with a central axis of the boom based on a combination of the location of the boom hinge point and absolute position sensing data from the second positioning sensor. The computing may additionally involve using the 3D line segment to generate an exclusion zone in absolute space surrounding the boom for comparison with locations of the tracked object on the jobsite.

The 3D line segment and/or the exclusion zone may be provided for real-time display and viewing. For example, this may include generating, for real-time viewing, an image on a display in a cab of the crane of the 3D line segment and one or more line segments corresponding tracked object. The exclusion zone may similarly be generated as part of the image.

Such computation of the positions of at least one movable component as part of 2730 may include generating, for real-time viewing, an image on a display in a cab of the crane. In one embodiment, the image comprises planned motions of at least the boom in relation to the 3D line segment and the one or more line segments of the tracked object to the crane operator motions to take with the crane and the boom to avoid the crane contacting the tracked object. The image may be moving or still.

Such computation of the positions of at least one movable component as part of 2730 may include projecting the upperworks 3D coordinate system to a 2D coordinate system by removing a z-axis component of 3D line segments corresponding thereto and generating, for real-time viewing, on a display in a cab of the crane an image of the exclusion zone with reference the tracked object in the 2D coordinate system.

At 2740 of flow diagram 2700, in one embodiment, the computed positions are utilized to provide assistance in maneuvering the crane with respect to the tracked object.

At 2750 of flow diagram 2700, in one embodiment, the method as described by 2710-2740 further includes varying a size of the exclusion zone based on one or more conditions of the crane received by a computing system. In some embodiments, the one or more conditions may be one or more of: speed of the boom, type of crane, and location of the crane within the jobsite.

FIG. 28 illustrates a flow diagram 2800, of an example method of crane maneuvering assistance.

At 2810 of flow diagram 2800, in one embodiment, three-dimensional (3D) position of an origin of a 3D upperworks coordinate system for a crane is calculated based on local coordinates of the crane. In one embodiment, the origin is located along an axis of rotation between an upperworks of the crane and a lowerworks of the crane that is rotatably coupled with the upperworks. The crane includes a first positioning sensor attached to the upperworks and a second positioning sensor located on a hook of the crane.

At 2820 of flow diagram 2800, in one embodiment, a boom angle of a boom of the crane and a location of a boom tip of the boom are tracked during operation of the crane. The boom angle and boom tip location are tracked according to the 3D coordinate system for the upperworks based on absolute position sensing data from the at least the first and the second positioning sensors and a known length of the boom.

At 2830 of flow diagram 2800, in one embodiment, the boom tip location and boom angle are utilized to track movement of the boom to provide assistance in maneuvering the crane with respect to a tracked object on the job site. In one embodiment, the tracked object is not a portion of the crane, but is instead another object on the jobsite.

At 2840 of flow diagram 2800, in one embodiment, the method as described by 2810-2830 further includes utilizing information from a portable validation device to validate the origin and other locations of the upperworks 3D coordinate system. Portable validation device 2500 of FIG. 25 is one example of such a portable validation device.

Figure 29:
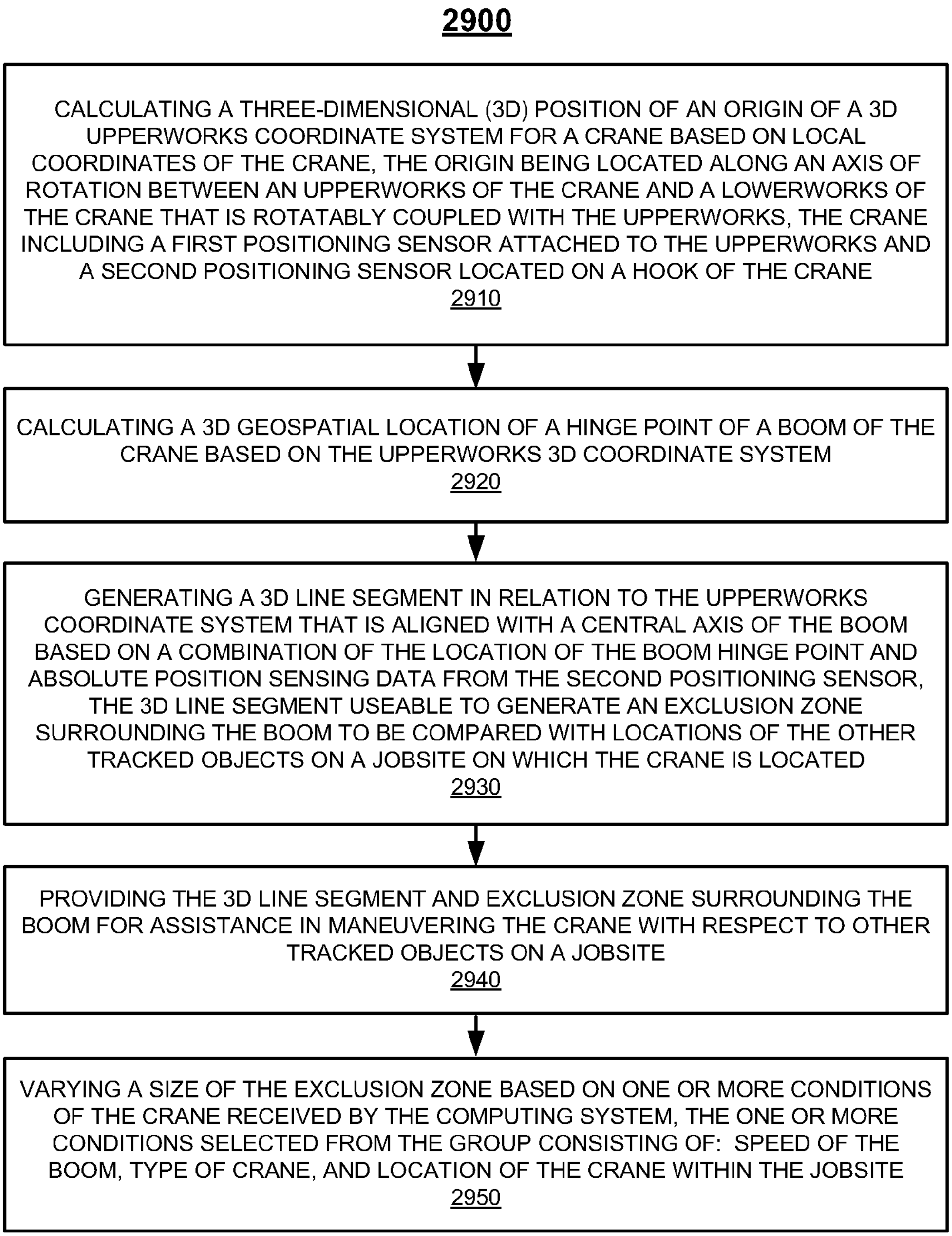
FIG. 29 illustrates a flow diagram 2900 of an example method of crane maneuvering assistance.

FIG. 29 illustrates a flow diagram 2900, of an example method of crane maneuvering assistance.

At 2910 of flow diagram 2900, in one embodiment, a three-dimensional (3D) position of an origin of a 3D upperworks coordinate system for a crane is calculated based on local coordinates of the crane. In one embodiment, the origin is located along an axis of rotation between an upperworks of the crane and a lowerworks of the crane that is rotatably coupled with the upperworks. In one embodiment, the crane includes a first positioning sensor attached to the upperworks and a second positioning sensor located on a hook of the crane.

At 2920 of flow diagram 2900, in one embodiment, a 3D geospatial location of a hinge point of a boom of the crane is calculated based on the upperworks 3D coordinate system.

At 2930 of flow diagram 2900, in one embodiment, a 3D line segment in relation to the upperworks coordinate system that is aligned with a central axis of the boom is generated based on a combination of the location of the boom hinge point and absolute position sensing data from the second positioning sensor. The 3D line segment is useable to generate an exclusion zone surrounding the boom. The exclusion zone is, or may be, compared with locations of one or more other tracked objects on a jobsite on which the crane is located. In some embodiments, some or all of the one or other tracked objects are not portions of the crane.

At 2940 of flow diagram 2900, in one embodiment, the 3D line segment and exclusion zone surrounding the boom are provided for assistance in maneuvering the crane with respect to other tracked objects on a jobsite.

Providing the 3D line segment and exclusion zone for assistance in maneuvering the crane may comprise generating, for real-time viewing, an image on a display in a cab of the crane. In one embodiment, the image includes the 3D line segment and line segments corresponding to the other tracked objects on the jobsite in relation to the upperworks 3D coordinate system. The image may be moving or still and may include a depiction of the exclusion zone in some embodiments.

Providing the 3D line segment and exclusion zone for assistance in maneuvering the crane may comprise generating, for real-time viewing, an image on a display in a cab of the crane. In one embodiment, the image comprises planned motions of at least the boom in relation to the 3D line segment and 3D line segments of the other tracked objects on the jobsite. In this manner, the image demonstrates motions to take with the crane and the boom to avoid the other tracked objects. The image may be moving or still.

Providing the 3D line segment and exclusion zone for assistance in maneuvering the crane may comprise projecting the upperworks 3D coordinate system to a 2D coordinate system by removing a z-axis component of 3D line segments corresponding thereto, and generating, for real-time viewing, on a display in a cab of the crane an image of the exclusion zone with reference the other tracked objects in the 2D coordinate system. The image may be moving or still.

Providing the 3D line segment and exclusion zone for assistance in maneuvering the crane may further comprise sending a warning to a crane operator when a second exclusion zone associated with one of the other tracked objects approaches the exclusion zone of the crane. Such a warning may be audible, visual, and capable of being felt (e.g., a vibration) and may be sent when the exclusion zones approach to within a predefined distance, intersect, and/or approach at a velocity which exceeds a predefined threshold. In some embodiments, in addition to sending a warning to a crane operator, motion of the boom may be controlled automatically to prevent a collision between the other object and the crane when the second exclusion zone of the other object approaches the exclusion zone of the crane. Controlling the motion of the boom may include slowing the motion of the boom, stopping the motion of the boom, and/or altering a direction of the motion of the boom.

At 2950 of flow diagram 2900, in one embodiment, the method as described by 2910-2940 further includes varying a size of the exclusion zone based on one or more conditions of the crane received by a computing system. In some embodiments, the one or more conditions may be one or more of: speed of the boom, type of crane, and location of the crane within the jobsite.

FIG. 30 illustrates a flow diagram 3000, of an example method of crane maneuvering assistance.

At 3010 of flow diagram 3000, in one embodiment, a three-dimensional (3D) position of an origin of a 3D upperworks coordinate system for a crane is calculated based on local coordinates of the crane. In one embodiment, the origin is located along an axis of rotation between an upperworks of the crane and a lowerworks of the crane. The lowerworks is rotatably coupled with the upperworks in some embodiments. In some embodiments, the crane includes a first positioning sensor attached to the upperworks and a second positioning sensor located on a hook of the crane.

At 3020 of flow diagram 3000, in one embodiment, a location of a trolley of the crane, according to the 3D coordinate system, is calculated based on absolute position sensing data from at least the second positioning sensor.

At 3030 of flow diagram 3000, in one embodiment, the trolley location is utilized to track movement of the hook and a hoist line coupled between the hook and the trolley. This tracking is performed in order to provide assistance in maneuvering the crane with reference to other tracked objects on a jobsite. The tracked location may be displayed on a display in the cab of a crane along with the relative locations of the other tracked objects. In one embodiment, some or all of the other tracked objects are not portions of the crane.

At 3040 of flow diagram 3000, in one embodiment, the method as described by 3010-3030 further includes generating a first 3D line segment in relation to the upperworks coordinate system and a second 3D line segment in relation to the upperworks coordinate system. The first 3D line segment is aligned with a central axis of the jib and the second 3D line segment is aligned with a central axis of the hoist line. The first and second 3D line segments are generated based, at least, on a combination of the location of the trolley and absolute position sensing data from the second positioning sensor. The generation of the second 3D line segment may also be based on position sensing data from a third positioning sensor located on a hook block of the hoist line. The 3D line segments are used for or useable for generating exclusion zones surrounding the jib and the hoist line. Either or both of the exclusion zones can be compared with locations of the other tracked objects on the jobsite to assist with maneuvering the crane and avoiding contact/collision with the other tracked objects on the jobsite.

In order to assist with maneuvering the crane, an image may be generated for real-time viewing on a display in a cab of the crane. In one embodiment, the image comprises the 3D line segment and line segments corresponding to the other tracked objects on the jobsite in relation to the upperworks 3D coordinate system.

In order to assist with maneuvering the crane, an image may be generated for real-time viewing on a display in a cab of the crane. The image may comprise planned motions of at least the jib in relation to the 3D line segment and 3D line segments of the other tracked objects on the jobsite in order to demonstrate motions to take with the crane and the jib to avoid the other tracked objects.

The order of the steps or actions of the methods described in connection with the disclosed embodiments may be changed as would be apparent to those skilled in the art. Thus, any order appearing in the Figures or described with reference to the Figures or in the Description of Embodiments is for illustrative purposes only and is not meant to imply a required order, except where explicitly required.

It should be understood that various changes and modifications to the presently preferred embodiments described herein will be apparent to those skilled in the art, some of which were already pointed out. Furthermore, components providing equivalent function may be substituted for various components in one of the cranes, even though different in structure. For instance, a luffing jib (not shown) may be attached to the end of the boom and thus the boom and luffing jib combination may be treated as a single boom for purposes of the calculations and steps of the methods disclosed herein. Such changes and modifications can be made without departing from the spirit and scope of the present embodiments and without diminishing its intended advantages. It is therefore intended that such changes and modifications be covered by the appended claims and their equivalents.

What is claimed is:

1. A system for determining a three-dimensional (3D) coordinate system for a crane to assist maneuvering the crane within a jobsite, the crane comprising movable components including an upperworks rotatably attached to a lowerworks, a boom attached to the upperworks, a hoist line extending over a sheave mounted on the boom, and a hook attached to the hoist line, the system comprising:
- a computing device including a processor and memory, and in the memory stored instructions for computing positions of at least one movable crane component with respect to other tracked objects on the jobsite, the processor configured to execute the instructions;
- a first positioning sensor attached to the upperworks, wherein the upperworks is rotatably attached to the lowerworks; and
- a second positioning sensor located on the hook;
- the processor operable to calculate a 3D geospatial location and orientation of a 3D coordinate system for the upperworks, the upperworks 3D coordinate system having an origin chosen along an axis of rotation between the upperworks and lowerworks, the processor operable to:
  - calculate a 3D position of the origin of the upperworks based on local coordinates; and
  - transform the 3D position of the origin of the upperworks from the local coordinates to global 3D coordinates using absolute position sensing data from the first and second positioning sensors and using global 3D coordinates specific to the jobsite where the crane is located, the upperworks 3D coordinate system being useable to track the at least one moveable component for maneuvering assistance with reference to the other tracked objects.

2. The system of claim 1, the processor further operable to:
- calculate a first distance between locations of the first and second positioning sensors in global 3D coordinates;
- calculate a second distance and a direction between a location of the first positioning sensor toward a mid-plane of the crane in 3D global coordinates based on the location of the first positioning sensor, the first distance, and an intersection point with the mid-plane of the crane, where the mid-plane of the crane is determined based on a heading of the boom and the location of the second positioning sensor; and
- offset a distance to the origin in the global 3D coordinates in at least one of the three dimensions based on a vector created from the second distance and corresponding direction to the mid-plane of the crane.

3. The system of claim 1, the processor further operable to:
- calculate a 3D geospatial location of a boom hinge point where the boom is attached to the upperworks based on the 3D coordinate system for the upperworks; and
- generate a 3D line segment in relation to the upperworks 3D coordinate system that is aligned with a central axis of the boom based on a combination of the location of the boom hinge point and absolute position sensing data from the second positioning sensor, the 3D line segment useable to generate an exclusion zone in absolute space surrounding the boom to be compared with locations of the other tracked objects on the jobsite.

4. The system of claim 3, where the computing device is coupled with a display in a cab of the crane, the processor further operable to create an image on the display of the 3D line segment and line segments corresponding to the other tracked objects on the jobsite in relation to the upperworks 3D coordinate system for real-time viewing by a crane operator.

5. The system of claim 3, where the computing device is coupled with a display in a cab of the crane, the processor further operable to create an image on the display for viewing by a crane operator of planned motions of at least the boom in relation to the 3D line segment and 3D line segments of the other tracked objects on the jobsite to demonstrate to the crane operator motions to take with the crane and the boom to avoid the crane from contacting the other tracked objects.

6. The system of claim 3, the processor further operable to:
- vary a size of the exclusion zone based on one or more conditions of the crane received by the computing device, the one or more conditions selected from the group consisting of: speed of the boom, type of crane, and location of the crane within the jobsite.

7. The system of claim 3, where the other tracked objects also include 3D line segments, the processor further operable to project the upperworks 3D coordinate system to a 2D coordinate system and to track the exclusion zone with reference to the other tracked objects in the 2D coordinate system by removing the z-axis component of the 3D line segments corresponding thereto.

8. The system of claim 1, further comprising a portable validation device useable to validate the origin and other locations of the upperworks 3D coordinate system.

9. The system of claim 1, where the second positioning sensor is attached to a second location of the upperworks, the processor further operable to:
- determine a local vector and a unit vector between the first and second locations of the upperworks;
- calculate an angle between the unit vector and an x-axis of the local coordinates;
- calculate an angle of angular rotation useable to rotate the unit vector about a local z-axis to produce an x-axis direction of the upperworks 3D coordinate system; and
- determine a direction of the y-axis of the upperworks 3D coordinate system based on the x-axis direction.

10. The system of claim 9, the processor further operable to:
- determine a second local vector that originates from the first location and points to the origin of the 3D coordinate system; and
- determine a global position vector of the UW coordinate system by transforming the second local vector from local to global 3D coordinates using the x-axis and y-axis directions.

11. The system of claim 1, where the origin is chosen at an intersection of rotation and a plane formed between the upperworks and the lowerworks.

12. A system for determining a three-dimensional (3D) coordinate system for a crane to assist maneuvering the crane within a jobsite, the crane comprising movable components including an upperworks rotatably attached to a lowerworks, and a boom attached to the upperworks, the system comprising:
- a computing device including a processor and memory, and in the memory stored instructions for computing positions of at least one movable crane component with respect to other tracked objects on the jobsite, the processor configured to execute the instructions;
- a first positioning sensor attached to a first location on the upperworks, wherein the upperworks is rotatably attached to the lowerworks;
- a second positioning sensor attached to a second location on the upperworks different than the first location; and
- a third positioning sensor attached to a third location on the upperworks different than the first and second locations;

the processor operable to calculate a 3D geospatial location and orientation of a 3D coordinate system for the upperworks, the upperworks 3D coordinate system having an origin chosen along an axis of rotation between the upperworks and lowerworks, the processor operable to:

calculate a 3D position of the origin of the upperworks based on local coordinates; and transform the 3D position of the origin of the upperworks from the local coordinates to global 3D coordinates using absolute position sensing data from the first, the second, and the third positioning sensors and using global 3D coordinates specific to the jobsite where the crane is located, the upperworks 3D coordinate system being useable to track the at least one moveable component for maneuvering assistance with reference to the other tracked objects.

13. The system of claim 12, the processor further operable to:

determine a first local vector between the first and second positioning sensors;

determine a second local vector between the first and third positioning sensors;

calculate a plane spanned between the first and second local vectors;

determine a third local vector as a vector normal to the plane; and determine a set of unit vectors to model a preliminary 3D coordinate system aligned with the plane.

14. The system of claim 13, the processor further operable to:

determine a third local vector pointing from the first positioning sensor to the origin of the 3D coordinate system; and transform the third local vector into the preliminary 3D coordinate system.

15. The system of claim 14, the processor further operable to:

determine a first global position vector pointing from the first location to the second location;

determine a second global position vector pointing from the first location to the third location;

calculate a third global position vector normal to a second plane formed between the first and second global position vectors;

determine a set of unit vectors that models global 3D coordinates that are aligned with the second plane; and determine an orientation of the global 3D coordinate system by transforming the first, second, and third local units vectors into, respectively, x-axis, y-axis, and z-axis components of the origin of the 3D coordinate system using the preliminary 3D coordinate system and the first, second, and third global position vectors.

16. The system of claim 14, further comprising a portable validation device useable to validate the origin and other locations of the upperworks 3D coordinate system.

17. The system of claim 12, where the origin is chosen at an intersection of rotation and a plane formed between the upperworks and the lowerworks.

18. A system for tracking movable crane components of a crane to assist maneuvering the crane within a jobsite, the movable crane components including an upperworks attached to a lowerworks, a boom rotatably attached to the upperworks, a hoist line extending over a sheave mounted on the boom, and a hook attached to the hoist line, the system comprising:

a computing device including a processor and memory, and in the memory stored instructions for computing positions of at least one movable crane component with respect to other tracked objects on the jobsite, the processor configured to execute the instructions;

at least a first positioning sensor attached to a location on the upperworks, wherein the upperworks attached to the lowerworks and the boom is rotatably attached to the upperworks; and a second positioning sensor located on the hook; the processor operable to:

calculate a 3D geospatial location and orientation of a 3D coordinate system for the upperworks using absolute position sensing data from at least the first positioning sensor, the upperworks 3D coordinate system having an origin chosen along an axis of rotation between the upperworks and the lowerworks; and track a location of a boom tip and a boom angle of the boom during operation of the crane according to the 3D coordinate system for the upperworks based on absolute position sensing data from the at least the first and the second positioning sensors and a known length of the boom, the boom tip and boom angle being useable to track movement of the boom for maneuvering assistance with reference to the other tracked objects.

19. The system of claim 18, where the origin is chosen at an intersection of rotation and a plane formed between the upperworks and the lowerworks, the processor further operable to:

offset the length of the boom along a boom axis with a radius of the sheave to form a revised boom length;

calculate a second length of the boom from a boom hinge point to an axis of the sheave; and calculate a rotation angle from the boom axis to a vector formed between the boom hinge point and the sheave axis point using the revised boom length and the second length of the boom.

20. The system of claim 19, where the at least first positioning sensor includes two positioning sensors located at two different locations of the upperworks, the processor further operable to:

project a location for the hook during operation to a mid-plane of the crane;

determine a first global position vector for the hook location projected to the crane mid-plane in a horizontal plane at an elevation of the boom hinge point;

determine a second global position vector from the sheave axis to a location vertically below the sheave axis in the horizontal plane using the absolute position sensing data from the second positioning sensor;

determine a third global position vector from the boom hinge point to an end point of the second global position vector;

determine a fourth global position vector to the sheave axis;

determine a fifth global position vector and corresponding unit vector between the fourth global position vector and the boom axis hinge point;

determine a sixth global position vector to the boom tip by:

rotating the unit vector corresponding to the fifth global position vector by the rotation angle and taking the inner product thereof with the boom length to generate a revised fifth global position vector and length of the boom along the boom axis for adding to the location of the boom hinge point in the 3D coordinate system; and determine the boom angle as the arc-cosine of: the x-axis component of the first global position vector taken as an inner product with the unit vector corresponding to the fifth global position vector.

21. The system of claim 18, further comprising a portable validation device useable to validate the origin and other locations of the upperworks 3D coordinate system.

22. A system for tracking movable crane components of a crane to assist maneuvering the crane within a jobsite, the movable crane components including an upperworks attached to a lowerworks, a telescopic boom rotatably attached to the upperworks, a hoist line extending over a sheave mounted on the boom, and a hook attached to the hoist line, the system comprising:

a computing device including a processor and memory, and in the memory stored instructions for computing positions of at least one movable crane component with respect to other tracked objects on the jobsite, the processor configured to execute the instructions;

at least a first positioning sensor attached to the upperworks, wherein the upperworks attached to the lowerworks, the telescopic boom rotatably attached to the upperworks; and a second positioning sensor located on the hook;

a boom angle sensor operable to send a boom angle to the processor, the processor operable to:

calculate a 3D geospatial location and orientation of a 3D coordinate system for the upperworks using absolute position sensing data from at least the first positioning sensor, the upperworks 3D coordinate system having an origin chosen along an axis of rotation between the upperworks and the lowerworks; and track a location of a boom tip and a boom length during operation of the crane according to the 3D coordinate system for the upperworks based on absolute position sensing data from the at least the first and the second positioning sensors and the boom angle, the boom tip and boom length being useable to track movement of the boom for maneuvering assistance with reference to the other tracked objects.

23. The system of claim 22, where the origin is chosen at an intersection of rotation and a plane formed between the upperworks and the lowerworks, the processor further operable to:

offset the length of the boom along a boom axis with a radius of the sheave to form a revised boom length;

calculate a second length of the boom from a boom hinge point to an axis of the sheave; and calculate a rotation angle from the boom axis to a vector formed between the boom hinge point and the sheave axis point using the revised boom length and the second length of the boom.

24. The system of claim 23, where the at least first positioning sensor includes two positioning sensors located at two different locations of the upperworks, the processor further operable to:

project a location for the hook during operation to a mid-plane of the crane;

determine a first global position vector for the hook location projected to the crane mid-plane in a horizontal plane at an elevation of the boom hinge point;

determine a second global position vector from the sheave axis to a location vertically below the sheave axis in the horizontal plane using the absolute position sensing data from the second positioning sensor;

determine a third global position vector from the boom hinge point to an end point of the second global position vector;

determine a first unit vector for the boom axis by rotating the boom axis line about a y-axis component of the first global position vector by the rotation angle;

determine a second unit vector normal to the boom axis;

determine a fourth global position vector to a point along the second unit vector at a distance of an offset of the sheave axis;

determine a fifth global position vector as a projection from the sheave axis to the boom axis;

calculate a position in the 3D coordinate system to a tip of the boom based at least in part on the fifth global position vector;

determine a sixth global position vector between the boom hinge point to the boom tip based at least in part on the fifth global position; and determine the length of the boom as the absolute magnitude of the sixth global position vector.

25. The system of claim 22, further comprising a portable validation device useable to validate the origin and other locations of the upperworks 3D coordinate system.

26. A system for tracking movable crane components of a crane to assist maneuvering the crane within a jobsite, the movable crane components including an upperworks rotatably attached to a lowerworks, a boom attached to the upperworks, a hoist line extending over a sheave mounted on the boom, and a hook attached to the hoist line, the system comprising:

a computing device including a processor and memory, and in the memory stored instructions for computing positions of at least one movable crane component from other tracked objects on the jobsite, the processor configured to execute the instructions;

a first positioning sensor attached to the upperworks, wherein the upperworks is rotatably attached to the lowerworks; and a second positioning sensor located on the hook; the processor operable to:

calculate a 3D geospatial location and orientation of a 3D coordinate system for the upperworks using absolute position sensing data from at least the first positioning sensor, the upperworks 3D coordinate system having an origin chosen along an axis of rotation between the upperworks and the lowerworks;

calculate a 3D geospatial location of a boom hinge point based on the upperworks 3D coordinate system; and generate a 3D line segment in relation to the upperworks coordinate system that is aligned with a central axis of the boom based on a combination of the location of the boom hinge point and absolute position sensing data from the second positioning sensor, the 3D line segment useable to generate an exclusion zone surrounding the boom to be compared with locations of the other tracked objects on the jobsite.

27. The system of claim 26, where the origin is chosen at an intersection of rotation and a plane formed between the upperworks and the lowerworks, and where the 3D coordinate system for the upperworks is located and oriented based on global coordinates derived from a 3D coordinate system for a jobsite where the crane is located.

28. The system of claim 26, where the computing device is coupled with a display in a cab of the crane, the processor further operable to create an image on the display of the 3D line segment and line segments corresponding to the other tracked objects on the jobsite in relation to the upperworks 3D coordinate system for real-time viewing by a crane operator.

29. The system of claim 26, where the computing device is coupled with a display in a cab of the crane, the processor further operable to create an image on the display for viewing by a crane operator of planned motions of at least the boom in relation to the 3D line segment and 3D line segments of the other tracked objects on the jobsite to demonstrate to the crane operator motions to take with the crane and the boom to avoid the other tracked objects.

30. The system of claim 26, the processor further operable to:

vary a size of the exclusion zone based on one or more conditions of the crane received by the computing device, the one or more conditions selected from the group consisting of: speed of the boom, type of crane, and location of the crane within the jobsite.

31. The system of claim 26, where the other tracked objects also include 3D line segments, the processor further operable to project the upperworks 3D coordinate system to a 2D coordinate system and to track the exclusion zone with reference to the other tracked objects in the 2D coordinate system by removing the z-axis component of the 3D line segments corresponding thereto.

32. The system of claim 26, further comprising a portable validation device useable to validate the origin and other locations of the upperworks 3D coordinate system.

33. The system of claim 26, where the other tracked objects are either static or in motion and include respective second exclusion zones, further comprising the processor operable to:

send a warning to a crane operator through a display or audio device coupled with the computing device when the second exclusion zone of one of the other tracked objects approaches the exclusion zone of the crane.

34. The system of claim 33, further comprising:

a controller controllable by the processor to control the motion of the boom to prevent a collision between the other object and the crane when the second exclusion zone of the other object approaches the exclusion zone of the crane.

35. The system of claim 26, the processor further operable to:

vary a size of the exclusion zone based on one or more conditions of the crane received by the computing device, the one or more conditions selected from the group consisting of: speed of the boom, type of crane, and location of the crane within the jobsite.

36. A system for tracking a location of a trolley of a tower crane trolley to assist maneuvering the tower crane within a jobsite, the tower crane including a tower, an upperworks attached to the top of the tower, a jib attached to the upperworks, where the trolley is attached to the jib, a hoist line extending over a sheave mounted on the trolley, and a hook attached to the hoist line, the system comprising:

a computing device including a processor and memory, and in the memory stored instructions for computing positions of at least one crane component with respect to other tracked objects on the jobsite, the processor configured to execute the instructions;

a first positioning sensor attached to the upperworks, wherein the upperworks is attached to the top of the tower; and a second positioning sensor located on the hook; the processor operable to:

calculate a 3D geospatial location and orientation of a 3D coordinate system for the upperworks using absolute position sensing data from at least the first positioning sensor, the upperworks 3D coordinate system having an origin chosen along an axis of rotation between the upperworks and the tower; and calculate a location of the trolley according to the 3D coordinate system based on absolute position sensing data from at least the second positioning sensor, the trolley location being useable to track movement of the hook and the hoist line for maneuvering assistance with reference to the other tracked objects.

37. The system of claim 36, the processor further operable to:

determine a vector from a jib start point to the location of the second positioning sensor;

determine a distance from the location of the second positioning sensor to a mid-plane of the crane, the mid-plane of the crane cutting through a center of the jib;

determine a first global position vector for the location of the second positioning sensor to the crane mid-plane based on the distance and the absolute position sensing data from the second positioning sensor;

determine a difference in elevation between the location of the second positioning sensor and the jib start point; and determine a second global position vector for the trolley location as the first global position vector plus the difference in elevation taken along the crane mid-plane.

38. The system of claim 36, the processor further operable to:

generate a first 3D line segment in relation to the upperworks coordinate system that is aligned with a central axis of the jib and a second 3D line segment in relation to the upperworks coordinate system that is aligned with a central axis of the hoist line, the 3D line segments based on a combination of the location of the trolley and absolute position sensing data from the second positioning sensor, the 3D line segments useable to generate exclusion zones surrounding the jib and the hoist line to be compared with locations of the other tracked objects on the jobsite.

39. The system of claim 38, where the computing device is coupled with a display in a cab of the crane, the processor further operable to create an image on the display of the 3D line segments and line segments corresponding to the other tracked objects on the jobsite in relation to the upperworks 3D coordinate system for real-time viewing by a crane operator.

40. The system of claim 38, where the computing device is coupled with a display in a cab of the crane, the processor further operable to create an image on the display for viewing by a crane operator of planned motions of at least the jib in relation to the 3D line segments and 3D line segments of the other tracked objects on the jobsite to demonstrate to the crane operator motions to take with the crane and the jib to avoid the other tracked objects.

41. The system of claim 36, further comprising a portable validation device useable to validate the origin and other locations of the upperworks 3D coordinate system.

42. The system of claim 36, where the origin is chosen at an intersection of rotation and a plane formed between the upperworks and the tower.

43. A non-transitory computer readable storage medium having instructions embodied thereon which, when executed, cause a computing system to perform a method of crane maneuvering assistance, the method comprising:

calculating a three-dimensional (3D) position of an origin of a 3D upperworks coordinate system for a crane based on local coordinates of the crane, the origin being located along an axis of rotation between an upperworks of the crane and a lowerworks of the crane that is rotatably coupled with the upperworks;

transforming the 3D position of the origin from the local coordinates to global 3D coordinates using absolute position sensing data from a first positioning sensor coupled with the upperworks and a second positioning sensor located on a hook of the crane and global 3D coordinates specific to a jobsite where the crane is located;

computing positions of at least one movable component of the crane with respect to a tracked object on the jobsite, wherein the tracked object is not a portion of the crane; and utilizing the computed positions to provide assistance in maneuvering the crane with respect to the tracked object.

44. The non-transitory computer readable storage medium of claim 43, further comprising instructions for:

varying a size of the exclusion zone based on one or more conditions of the crane received by the computing system, the one or more conditions selected from the group consisting of: speed of the boom, type of crane, and location of the crane within the jobsite.

45. The non-transitory computer readable storage medium of claim 43, wherein the computing positions of at least one movable component of the crane with respect to a tracked object on the jobsite further comprises:

calculating a 3D geospatial location of a boom hinge point where the boom is attached to the upperworks based on the 3D coordinate system for the upperworks;

generating a 3D line segment in relation to the upperworks 3D coordinate system that is aligned with a central axis of the boom based on a combination of the location of the boom hinge point and absolute position sensing data from the second positioning sensor; and using the 3D line segment to generate an exclusion zone in absolute space surrounding the boom for comparison with locations of the tracked object on the jobsite.

46. The non-transitory computer readable storage medium of claim 43, wherein utilizing the computed positions to provide assistance in maneuvering the crane with respect to the tracked object comprises:

generating, for real-time viewing, an image on a display in a cab of the crane of the 3D line segment and one or more line segments corresponding tracked object.

47. The non-transitory computer readable storage medium of claim 43, wherein utilizing the computed positions to provide assistance in maneuvering the crane with respect to the tracked object comprises:

generating, for real-time viewing, an image on a display in a cab of the crane, the image comprising planned motions of at least the boom in relation to the 3D line segment and the one or more line segments of the tracked object to the crane operator motions to take with the crane and the boom to avoid the crane contacting the tracked object.

48. The non-transitory computer readable storage medium of claim 43, wherein utilizing the computed positions to provide assistance in maneuvering the crane with respect to the tracked object comprises:

projecting the upperworks 3D coordinate system to a 2D coordinate system by removing a z-axis component of 3D line segments corresponding thereto; and generating, for real-time viewing, on a display in a cab of the crane an image of the exclusion zone with reference the tracked object in the 2D coordinate system.

49. The non-transitory computer readable storage medium 44, further comprising instructions for:

utilizing information from a portable validation device to validate the origin and other locations of the upperworks 3D coordinate system.

50. A non-transitory computer readable storage medium having instructions embodied thereon which, when executed, cause a computing system to perform a method of crane maneuvering assistance, the method comprising:

calculating a three-dimensional (3D) position of an origin of a 3D upperworks coordinate system for a crane based on local coordinates of the crane, the origin being located along an axis of rotation between an upperworks of the crane and a lowerworks of the crane that is rotatably coupled with the upperworks, the crane including a first positioning sensor attached to the upperworks and a second positioning sensor located on a hook of the crane;

tracking a boom angle of a boom of the crane and a location of a boom tip of the boom during operation of the crane according to the 3D coordinate system for the upperworks based on absolute position sensing data from the at least the first and the second positioning sensors and a known length of the boom; and utilizing the boom tip location and boom angle to track movement of the boom to provide assistance in maneuvering the crane with respect to a tracked object on the job site, wherein the tracked object is not a portion of the crane.

51. A non-transitory computer readable storage medium having instructions embodied thereon which, when executed, cause a computing system to perform a method of crane maneuvering assistance, the method comprising:

calculating a three-dimensional (3D) position of an origin of a 3D upperworks coordinate system for a crane based on local coordinates of the crane, the origin being located along an axis of rotation between an upperworks of the crane and a lowerworks of the crane that is rotatably coupled with the upperworks, the crane including a first positioning sensor attached to the upperworks and a second positioning sensor located on a hook of the crane;

calculating a 3D geospatial location of a hinge point of a boom of the crane based on the upperworks 3D coordinate system;

generating a 3D line segment in relation to the upperworks coordinate system that is aligned with a central axis of the boom based on a combination of the location of the boom hinge point and absolute position sensing data from the second positioning sensor, the 3D line segment useable to generate an exclusion zone surrounding the boom to be compared with locations of the other tracked objects on a jobsite on which the crane is located; and providing the 3D line segment and exclusion zone surrounding the boom for assistance in maneuvering the crane with respect to other tracked objects on a jobsite.

52. The non-transitory computer readable storage medium of claim 51, further comprising instructions for:

varying a size of the exclusion zone based on one or more conditions of the crane received by the computing system, the one or more conditions selected from the group consisting of: speed of the boom, type of crane, and location of the crane within the jobsite.

53. The non-transitory computer readable storage medium of claim 51, wherein providing the 3D line segment and exclusion zone surrounding the boom for assistance in maneuvering the crane comprises:

generating, for real-time viewing, an image on a display in a cab of the crane, the image comprising the 3D line segment and line segments corresponding to the other tracked objects on the jobsite in relation to the upperworks 3D coordinate system.

54. The non-transitory computer readable storage medium of claim 51, wherein providing the 3D line segment and exclusion zone surrounding the boom for assistance in maneuvering the crane comprises:

generating, for real-time viewing, an image on a display in a cab of the crane, the image comprising planned motions of at least the boom in relation to the 3D line segment and 3D line segments of the other tracked objects on the jobsite to demonstrate motions to take with the crane and the boom to avoid the other tracked objects.

55. The non-transitory computer readable storage medium of claim 51, wherein providing the 3D line segment and exclusion zone surrounding the boom for assistance in maneuvering the crane:

projecting the upperworks 3D coordinate system to a 2D coordinate system by removing a z-axis component of 3D line segments corresponding thereto; and generating, for real-time viewing, on a display in a cab of the crane an image of the exclusion zone with reference the other tracked objects in the 2D coordinate system.

56. The non-transitory computer readable storage medium of claim 51, wherein providing the 3D line segment and exclusion zone surrounding the boom for assistance in maneuvering the crane comprises:

sending a warning to a crane operator when a second exclusion zone associated with one of the other tracked objects approaches the exclusion zone of the crane.

57. The non-transitory computer readable storage medium of claim 56, further comprising instructions for:

controlling motion of the boom to prevent a collision between the other object and the crane when the second exclusion zone of the other object approaches the exclusion zone of the crane.

58. A non-transitory computer readable storage medium having instructions embodied thereon which, when executed, cause a computing system to perform a method of crane maneuvering assistance, the method comprising:

calculating a three-dimensional (3D) position of an origin of a 3D upperworks coordinate system for a crane based on local coordinates of the crane, the origin being located along an axis of rotation between an upperworks of the crane and a lowerworks of the crane that is rotatably coupled with the upperworks, the crane including a first positioning sensor attached to the upperworks and a second positioning sensor located on a hook of the crane;

calculating a location of a trolley of the crane according to the 3D coordinate system based on absolute position sensing data from at least the second positioning sensor; and utilizing the trolley location to track movement of the hook and a hoist line coupled between the hook and the trolley in order to provide assistance in maneuvering the crane with reference to other tracked objects on a jobsite.

59. The non-transitory computer readable storage medium of claim 58, further comprising instructions for:

generating a first 3D line segment in relation to the upperworks coordinate system that is aligned with a central axis of the jib and a second 3D line segment in relation to the upperworks coordinate system that is aligned with a central axis of the hoist line, the 3D line segments based on a combination of the location of the trolley and absolute position sensing data from the second positioning sensor, the 3D line segments useable to generate exclusion zones surrounding the jib and the hoist line to be compared with locations of the other tracked objects on the jobsite.

60. The non-transitory computer readable storage medium of claim 59, further comprising instructions for:

generating, for real-time viewing, an image on a display in a cab of the crane, the image comprising the 3D line segments and line segments corresponding to the other tracked objects on the jobsite in relation to the upperworks 3D coordinate system.

61. The non-transitory computer readable storage medium of claim 59, further comprising instructions for:

generating, for real-time viewing, an image on a display in a cab of the crane, the image comprising planned motions of at least the jib in relation to the 3D line segments and 3D line segments of the other tracked objects on the jobsite to demonstrate motions to take with the crane and the jib to avoid the other tracked objects.

* * * * *